(12) United States Patent (10) Patent No.: US 7,707,495 B2
Hosotsubo (45) Date of Patent: Apr. 27, 2010

(54) LAYOUT PROCESSING METHOD, LAYOUT PROCESSING APPARATUS, AND LAYOUT PROCESSING PROGRAM FOR DYNAMICALLY CHANGING A LAYOUT OF A TEMPLATE HAVING A PLURALITY OF A DATA REGIONS IN ACCORDANCE WITH CONTENT DATA INSERTED INTO THE DATA REGIONS

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1139 days.

(21) Appl. No.: 11/299,559

(22) Filed: Dec. 12, 2005

(65) Prior Publication Data

US 2006/0156227 A1 Jul. 13, 2006

(30) Foreign Application Priority Data

Dec. 14, 2004 (JP) ............................. 2004-361482

(51) Int. Cl.
 *G06F 17/00* (2006.01)
(52) U.S. Cl. ...................... 715/243; 715/234; 715/246; 715/255; 715/788
(58) Field of Classification Search ................ 715/255, 715/200, 202, 204, 205, 207, 210, 231, 234, 715/243, 244, 245, 246, 247, 251, 252, 253, 715/273, 788
See application file for complete search history.

(56) References Cited

U.S. PATENT DOCUMENTS

| | | | | |
|---|---|---|---|---|
| 5,060,170 A * | 10/1991 | Bourgeois et al. ........... 715/788 |
| 5,499,369 A * | 3/1996 | Atkinson .................... 719/315 |
| 5,710,928 A * | 1/1998 | Atkinson .................... 717/162 |
| 5,717,922 A * | 2/1998 | Hohensee et al. ........... 707/100 |
| 5,813,020 A * | 9/1998 | Hohensee et al. ........... 715/234 |
| 5,845,303 A * | 12/1998 | Templeman ................ 715/255 |
| 6,026,417 A * | 2/2000 | Ross et al. .................. 715/210 |
| 6,317,762 B1 * | 11/2001 | Okawa et al. ............... 715/246 |
| 6,880,122 B1 * | 4/2005 | Lee et al. .................... 715/209 |
| 7,010,745 B1 * | 3/2006 | Shimada et al. ............ 715/205 |
| 7,143,344 B2 * | 11/2006 | Parker et al. ................ 715/236 |
| 7,281,210 B2 * | 10/2007 | Ohashi et al. ............... 715/247 |
| 7,325,196 B1 * | 1/2008 | Covington et al. .......... 715/251 |
| 7,325,197 B1 * | 1/2008 | Massena et al. ............. 715/251 |
| 7,424,672 B2 * | 9/2008 | Simske et al. ............... 715/243 |
| 2004/0034829 A1 * | 2/2004 | Ohashi et al. ............ 715/500.1 |
| 2004/0225961 A1 * | 11/2004 | Ohashi et al. ............... 715/517 |
| 2005/0179947 A1 * | 8/2005 | Kobashi et al. ............. 358/1.18 |

(Continued)

FOREIGN PATENT DOCUMENTS

CN 1223731 A 7/1999

(Continued)

*Primary Examiner*—Laurie Ries
*Assistant Examiner*—Maikhanh Nguyen
(74) *Attorney, Agent, or Firm*—Canon U.S.A. Inc., I.P. Division

(57) ABSTRACT

In a layout processing method for adjusting the amount of change in the sizes of containers, a link that associates a plurality of containers with each other is set so as to extend between a plurality of pages. Accordingly, it is determined whether to insert content data into a predetermined page or into a page different from the predetermined page depending on the content data.

9 Claims, 38 Drawing Sheets

U.S. PATENT DOCUMENTS

2006/0026512 A1* 2/2006 Hays et al. .................. 715/525
2006/0190811 A1* 8/2006 Ohno ......................... 715/507
2006/0282442 A1* 12/2006 Lennon et al. .............. 707/100

FOREIGN PATENT DOCUMENTS

| | | |
|---|---|---|
| CN | 1530855 A | 9/2004 |
| JP | 7-129658 A | 5/1995 |
| JP | 2003-271325 A | 9/2003 |
| WO | 97/43720 A1 | 11/1997 |

\* cited by examiner

FIG. 25

| | LAYOUT METHOD | KIND OF CONTAINER | FIXED/ UNFIXED | VARIABLE RANGE | CONTAINER SIZE | INITIAL PAGE | FONT SIZE | FONT VARIABLE RANGE | SET NO. |
|---|---|---|---|---|---|---|---|---|---|
| CONTAINER 1705 | IMMOVABLE | TEXT | UNFIXED | VERTICAL 3 TO 8 HORIZONTAL 8 TO 10 | VERTICAL 3 HORIZONTAL 8 | 1701 | 12 | 12 TO 15 | 1 |
| CONTAINER 1706 | IMMOVABLE | TEXT | UNFIXED | VERTICAL 3 TO 8 HORIZONTAL 5 TO 8 | VERTICAL 5 HORIZONTAL 5 | 1701 | 10 | 8 TO 10 | 1 |
| CONTAINER 1707 | MOVABLE | IMAGE | UNFIXED | VERTICAL 5 TO 10 HORIZONTAL 5 TO 12 | VERTICAL 4 HORIZONTAL 10 | 1701 | | — | 1 |
| CONTAINER 1708 | MOVABLE | TEXT | UNFIXED | VERTICAL 3 TO 12 HORIZONTAL 5 TO 12 | VERTICAL 6 HORIZONTAL 10 | 1702 | 10 | 8 TO 12 | 1 |
| CONTAINER 1709 | IMMOVABLE | TEXT | UNFIXED | VERTICAL 4 TO 10 HORIZONTAL 4 TO 12 | VERTICAL 6 HORIZONTAL 10 | 1702 | 8 | 8 TO 12 | 1 |

FIG. 27
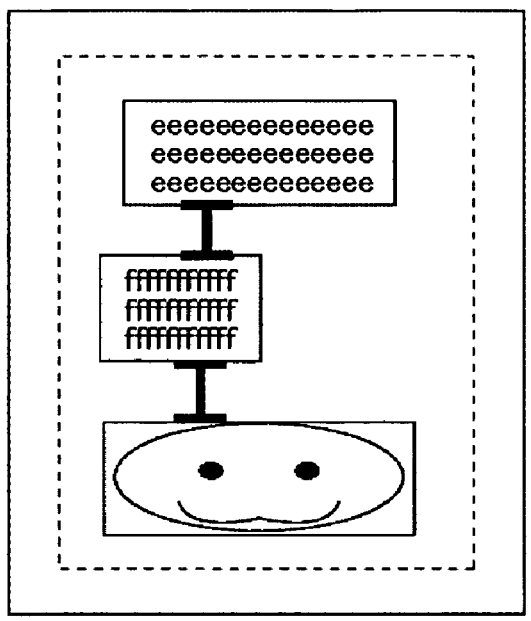
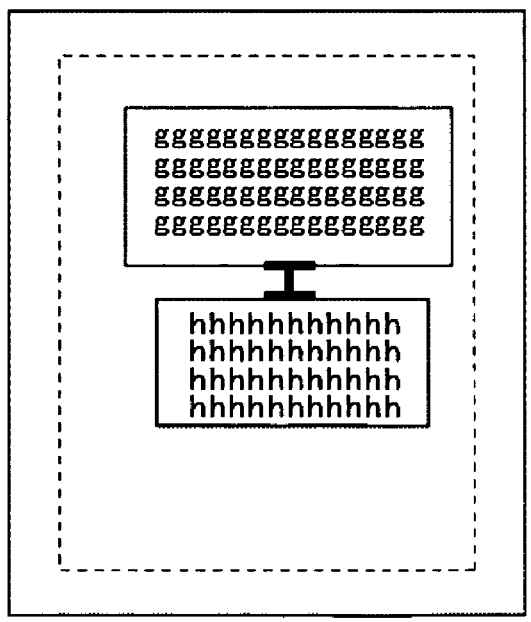

|  | ASSOCIATED CONTAINERS | INTER-PAGE ON/OFF | FLEXIBLE/ FIXED |
|---|---|---|---|
| LINK 1710 | 1705 TO 1706 | OFF | FIXED |
| LINK 1711 | 1706 TO 1707 | OFF | FIXED |
| LINK 1801 | 1707 TO 1708 | ON | FIXED |
| LINK 1712 | 1708 TO 1709 | OFF | FIXED |

FIG. 34

| | ASSOCIATED CONTAINERS | INTER-PAGE ON/OFF | FLEXIBLE/ FIXED | GUIDE |
|---|---|---|---|---|
| LINK 1710 | 1705 TO 1706 | OFF | FIXED | NO |
| LINK 1711 | 1706 TO 1707 | OFF | FIXED | NO |
| LINK 1801 | 1707 TO 1708 | ON | FIXED | NO |
| LINK 1712 | 1708 TO 1709 | OFF | FIXED | NO |
| LINK 3303 | 1707 TO 3301 | OFF | FIXED | YES |
| LINK 3305 | 1708 TO 3304 | OFF | FIXED | NO |

3701

Attribute of container #5 is set to "movable between pages in layout".

LAYOUT PROCESSING METHOD, LAYOUT PROCESSING APPARATUS, AND LAYOUT PROCESSING PROGRAM FOR DYNAMICALLY CHANGING A LAYOUT OF A TEMPLATE HAVING A PLURALITY OF A DATA REGIONS IN ACCORDANCE WITH CONTENT DATA INSERTED INTO THE DATA REGIONS

CROSS REFERENCE TO RELATED APPLICATIONS

This application claims the benefit of Japanese Application No. 2004-361482 filed Dec. 14, 2004, which is hereby incorporated by reference herein in its entirety.

BACKGROUND OF THE INVENTION

1. Field of the Invention

The present invention relates to an apparatus and a medium for use in an automatic layout system and a layout method.

2. Description of the Related Art

Recently, product lifecycles have been reduced due to greater product variations and there have been growing demands for customized services since the Internet has become popular. Accordingly, Customer Relationship Management (CRM) and one-to-one marketing have been attracting attention. These methods are extremely effective for increasing customer satisfaction and locking in customers.

One-to-one marketing is one type of database marketing. Personal attribute information including age, gender, hobbies, likes, purchase history, etc., is stored in a database for each customer, and is analyzed to make suggestions that meet the customer's needs. A typical approach of this type of marketing is variable printing. Due to the recent progress of desktop publishing (DTP) technologies and the widespread use of digital printers, variable printing systems that output documents customized for each customer have been developed. Accordingly, there are demands to determine a suitable layout of contents that differ for each customer.

In a typical variable printing system, when a customized document is produced, containers are arranged on the document. A container is an object defined as a rectangular region (also called a field) for drawing contents stored in a database. In the variable printing system, the containers are arranged on the document, and then the containers are associated in one-to-one correspondence with the contents of the database to produce the customized document.

In the variable printing system, the container size is fixed. Therefore, in the process of inserting data of each content stored in the database into the corresponding container, if the amount of content data is large relative to the container size, an overflow will occur in which a part of the content data will be lost. Conversely, if the amount of content data is small relative to the container size, a blank space will be left in the container.

In order to solve the above-described problems, a system for dynamically changing the container layout depending on the contents may be applied. The system for dynamically changing the layout can solve the above-described problems of overflow and blank space by determining the container size in accordance with the amount of content data, such as text data and image data, to be inserted into the container.

More specifically, the container size is set to be variable and is increased depending on the amount of content data that is inserted into the container. In addition, with regard to the text data, the font size in the container is set to be variable and is reduced depending on the amount of content data inserted therein. Accordingly, even if the amount of text data inserted into the container is too large to be fitted therein, all of the text data can be displayed in the container.

A layout system in which a part of the above-described technique is achieved is disclosed in Japanese Patent Laid-Open No. 7-129658.

According to Japanese Patent Laid-Open No. 7-129658, characters are successively input to a container of a predetermined size. If the number of characters is too large to fit all the characters in the container, the size of the container into which the characters are being input is increased while the size of an adjacent container is reduced.

In the above-described layout system, as the amount of text data input to the container is increased, the size of the container for receiving the text data is increased and the size of the adjacent container is reduced as long as the data-inputting process continues. Therefore, the size of the adjacent container is continuously reduced and a balanced layout cannot be obtained. In addition, the above-described layout system does not have a concept of variable printing or inserting contents into corresponding containers.

On the other hand, in a conventional layout method applied to variable data printing, a fixed container is created and content data is inserted into the fixed container. However, when a container with a fixed size is used, overflow occurs if the size of the content data is larger than the container size. In addition, if the content data is inserted into the container by reducing the font size, there is a risk that the font size will become excessively small.

The above-described problems can be solved by a layout method in which a balance between sizes of a plurality of unfixed containers that are associated with each other is taken into account. More specifically, the size of each container is changed in accordance with the size of content data inserted therein, and the amount of change in the container size is adjusted between the containers associated with each other. Accordingly, a layout with a good balance in container size can be obtained.

The above-described layout method may be applied to a plurality of pages. More specifically, containers for receiving the content data are set in advance in a plurality of pages. The content data is inserted into the containers set in a plurality of pages, and the above-described layout method is applied to each page.

However, in the above-described layout method, when, for example, containers A and B are set on first and second pages, respectively, and content data are inserted into the containers A and B, there is a possibility that the size of the content data inserted into the container A is small enough to provide a space for arranging the container B filled with the content data in the first page.

Even in such a case, the above-described layout method simply adjusts the container size in the predetermined pages. Therefore, there is a risk that the appearance of the layout will be degraded and waste pages will be produced.

SUMMARY OF THE INVENTION

In light of the above-described problems, the present invention is directed to automatic layout processing in which an inter-page link that extends over a plurality of pages to associate a plurality of containers with each other can be set to determine whether the containers are to be arranged in predetermined pages or in other pages depending on the content data inserted therein, thus providing a balanced layout over a plurality of pages.

According to an aspect of the present invention, a layout processing method for dynamically changing a layout of a template having a plurality of data regions in accordance with content data inserted into the data regions includes: an attribute setting step of setting an attribute of a data region associated with another data region by a link; an adjusting step of adjusting the layout of the data regions in accordance with the content data inserted into the data regions; a judging step of judging whether the data region associated with another data region by the link protrudes from a predetermined page region based on the layout of the data regions adjusted in the adjusting step; and a determining step of determining, if it is judged in the judging step that the data region protrudes from the predetermined page region, a page region in which the data region is to be arranged based on the attribute of the data region set in the attribute setting step. When the attribute of the data region set in the attribute setting step allows the data region to be arranged over different page regions, the data region is divided to be arranged in a plurality of page regions.

According to another aspect of the present invention, a layout processing apparatus for dynamically changing a layout of a template having a plurality of data regions in accordance with content data inserted into the data regions includes: an attribute setting unit configured to set an attribute of a data region associated with another data region by a link; an adjusting unit configured to adjust the layout of the data regions in accordance with the content data inserted into the data regions; a judging unit configured to judge whether the data region associated with another data region by the link protrudes from a predetermined page region based on the layout of the data regions adjusted by the adjusting unit; and a determining unit configured to determine, if the judging unit judges that the data region protrudes from the predetermined page region, a page region in which the data region is to be arranged based on the attribute of the data region set by the attribute setting unit. When the attribute of the data region set by the attribute setting unit allows the data region to be arranged over different page regions, the data region is divided to be arranged in a plurality of page regions.

According to another aspect of the present invention, a computer-readable layout processing program for dynamically changing a layout of a template having a plurality of data regions in accordance with content data inserted into the data regions includes: an attribute setting step of setting an attribute of a data region associated with another data region by a link; an adjusting step of adjusting the layout of the data regions in accordance with the content data inserted into the data regions; a judging step of judging whether the data region associated with another data region by the link protrudes from a predetermined page region based on the layout of the data regions adjusted in the adjusting step; and a determining step of determining, if it is judged in the judging step that the data region protrudes from the predetermined page region, a page region in which the data region is to be arranged based on the attribute of the data region set in the attribute setting step. When the attribute of the data region set in the attribute setting step allows the data region to be arranged over different page regions, the data region is divided to be arranged in a plurality of page regions.

Further features of the present invention will become apparent from the following description of exemplary embodiments with reference to the attached drawings.

BRIEF DESCRIPTION OF THE DRAWINGS

FIG. 25 is a diagram illustrating container information.

FIG. 27 is a diagram illustrating a result of layout in which movement between pages is not allowed.

FIG. 34 is a diagram illustrating a link attribute according to the third embodiment.

DESCRIPTION OF THE EMBODIMENTS

Exemplary embodiments of the present invention will be described below.

First Embodiment

Before describing the embodiments, a system structure and an application structure to which the present invention can be applied will be described.

System Structure

Figure 1A:
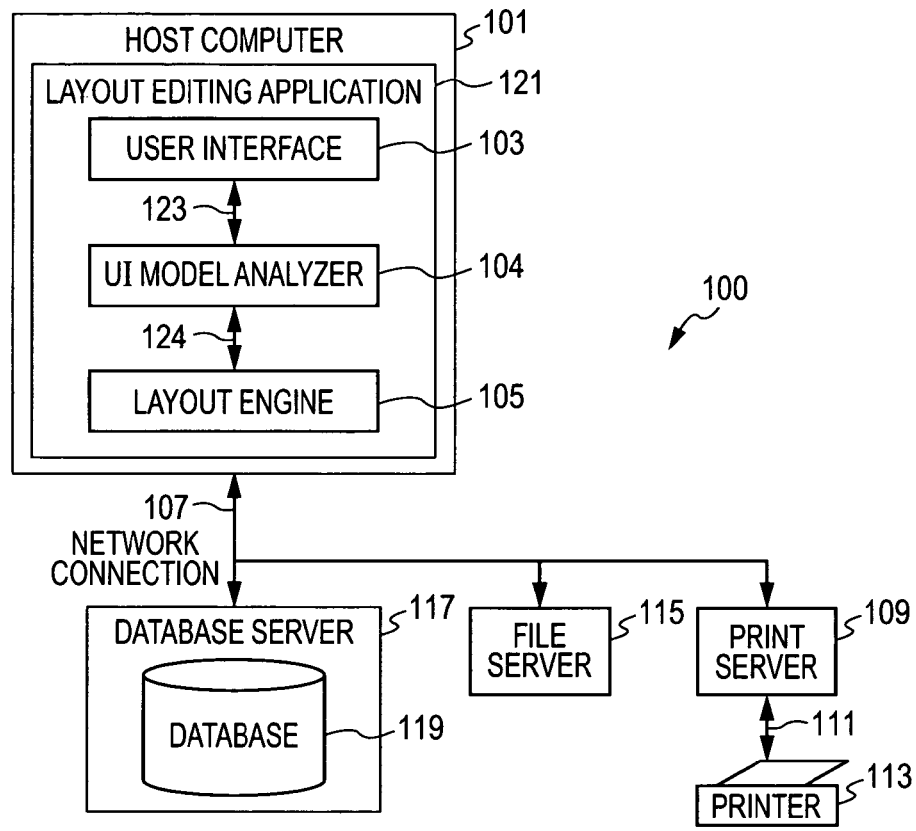
FIG. 1A is a diagram illustrating the structure of a computer system according to an embodiment of the present invention.
Figure 1B:
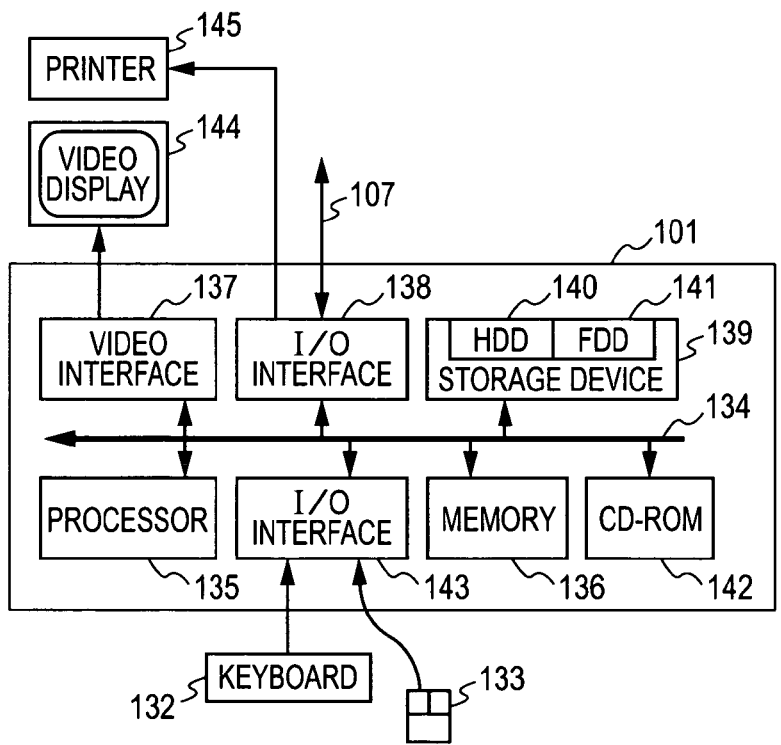
FIG. 1B is a diagram illustrating a computer module shown in FIG. 1A.

The structure of an automatic layout system including a host computer (information processing device) according to an embodiment of the present invention will be described below with reference to FIGS. 1A and 1B. FIG. 1A is a block diagram illustrating an example of the structure of an automatic layout system 100. FIG. 1B is a block diagram illustrating a detailed structure of a host computer (information processing device) 101 shown in FIG. 1A.

A layout editing process and an automatic layout process according to the present embodiment are performed by the host computer 101 (including a general computer module). A layout editing application program 121 can be executed in the automatic layout system 100, and a part or all of this software is executed by the host computer 101. Thus, the above-mentioned layout editing process and the automatic layout process are performed.

The layout editing application program 121 is stored in a computer readable medium, and is loaded into a memory 136 of the host computer 101 from the computer readable medium. The computer readable medium in which the software and computer programs are stored is a computer program product. A device suitable for producing a document or printing the produced document is obtained by using the computer program product in a computer.

The computer module 101 couples to input devices such as a keyboard 132 and a pointing device such as a mouse 133, and to output devices including a display device 144 and optionally a local printer 145. An input/output interface 138 enables coupling the computer module 101 to other computing devices of the system 100 via a network connection 107. The network connection 107 is typically a Local Area Network (LAN) or a Wide Area Network (WAN).

The computer module 101 typically includes at least one processor unit 135, a memory unit 136, for example formed from semiconductor random access memory (RAM) and read only memory (ROM), input/output (I/O) interfaces including a video interface 137, and an I/O interface 143 for the keyboard 132 and the mouse 133. A storage device 139 is provided and typically includes a hard disk drive 140 and a floppy disk drive 141. A magnetic tape drive (not illustrated) may also be used. A compact disk-ROM (CD-ROM) drive 142 is typically provided as a non-volatile source of data. The computer module 101 utilizes an operating system, such as GNU®/Linux® or Microsoft Windows®, and the components 135 to 143 of the computer module 101, typically communicate via an interconnected bus 134 according to the operating system and in a manner which results in a conventional mode of operation of the computer system formed, known to those in the relevant art. Examples of computers on which the described arrangements can be practiced include IBM®-PCs (Personal Computers) and compatibles, Sparc® Station produced by Sun Microsystems®, Inc., or like computer systems evolved therefrom.

Typically the layout editing application program 121 is resident on the hard disk drive 140 and read and controlled in its execution by the processor 135. Intermediate storage of the program 121 and any data fetched from the network may be accomplished using the semiconductor memory 136, possibly in concert with the hard disk drive 140. In some instances, the application program 121 may be supplied to the user encoded on a CD-ROM or floppy disk and read via the corresponding drive 142 or 141, or alternatively may be read by the user from the network connection 107. Still further, the software can also be loaded into the computer module 101 from other suitably sized computer readable media including magnetic tape, a ROM or integrated circuit, a magneto-optical disk, a radio or infra-red transmission channel between the computer module 101 and another device, a computer readable card such as a Personal Computer Memory Card International Association (PCMCIA) card, and the Internet and Intranets including email transmissions and information recorded on websites and the like. The foregoing is merely exemplary of relevant computer readable media. Other computer readable media may be used.

The layout editing application 121 causes the computer to perform the automatic layout process and the layout editing process, and includes three software components.

The first of these components is a layout engine 105 that reads data from the database 119 for each document in accordance with settings of the size and position of each container, which is a rectangular region. The layout engine 105 performs the automatic layout process in which the size, position, etc., of each container that receives the read data are calculated on the basis of the data read by the layout engine 105 and the settings of the container. The layout engine 105 according to the present embodiment also performs a process of drawing the data assigned to the containers to generate a document image. However, the present invention is not limited to this, and the layout engine 105 may also operate as an application for determining the size and position of each rectangular region (container). In such a case, the layout engine 105 outputs drawing information to a printer driver (not shown), and the printer driver performs an image drawing process of the document to generate print data.

The second component is a user interface 103 that allows the user to perform the layout editing process. The user creates and moves containers using the user interface 103 to produce a document template. In addition, the user interface 103 provides a mechanism for associating each container in the document template with data.

The third component is a user interface (UI) model analyzer 104 that converts the user interface elements including the containers, anchors, sliders, and links provided by the user interface 103 and attributes thereof into an internal format that can be recognized by the layout engine 105. More specifically, the UI model analyzer 104 allows the user interface 103 to be changed to user interfaces with other input or display formats without making any changes in the layout engine 105. The links serve to associate the containers with each other.

The user interface 103, the UI model analyzer 104, and the layout engine 105 communicate with each other via communication channels 123 and 124.

A data source for document generation is typically a database 119 that is hosted on a database server 117, generally formed by another computer upon which a database application is running. The host computer 101 communicates with the database server 117 via the network connection 107. The layout editing application program 121 generates document templates that can be saved to the host computer 101 or to a file server 115, generally formed by another computer. The layout editing application program 121 also produces documents, formed by the document template merged with data. These documents can be saved to the local file system on the host computer 101, saved on the file server 115 or sent to a printer 113 directly for printing. A print server 109 is a computer which provides a network capability to printers that cannot be networked directly. The print server 109 and the printer 113 are connected via a typical communications channel 111.

Figure 2:
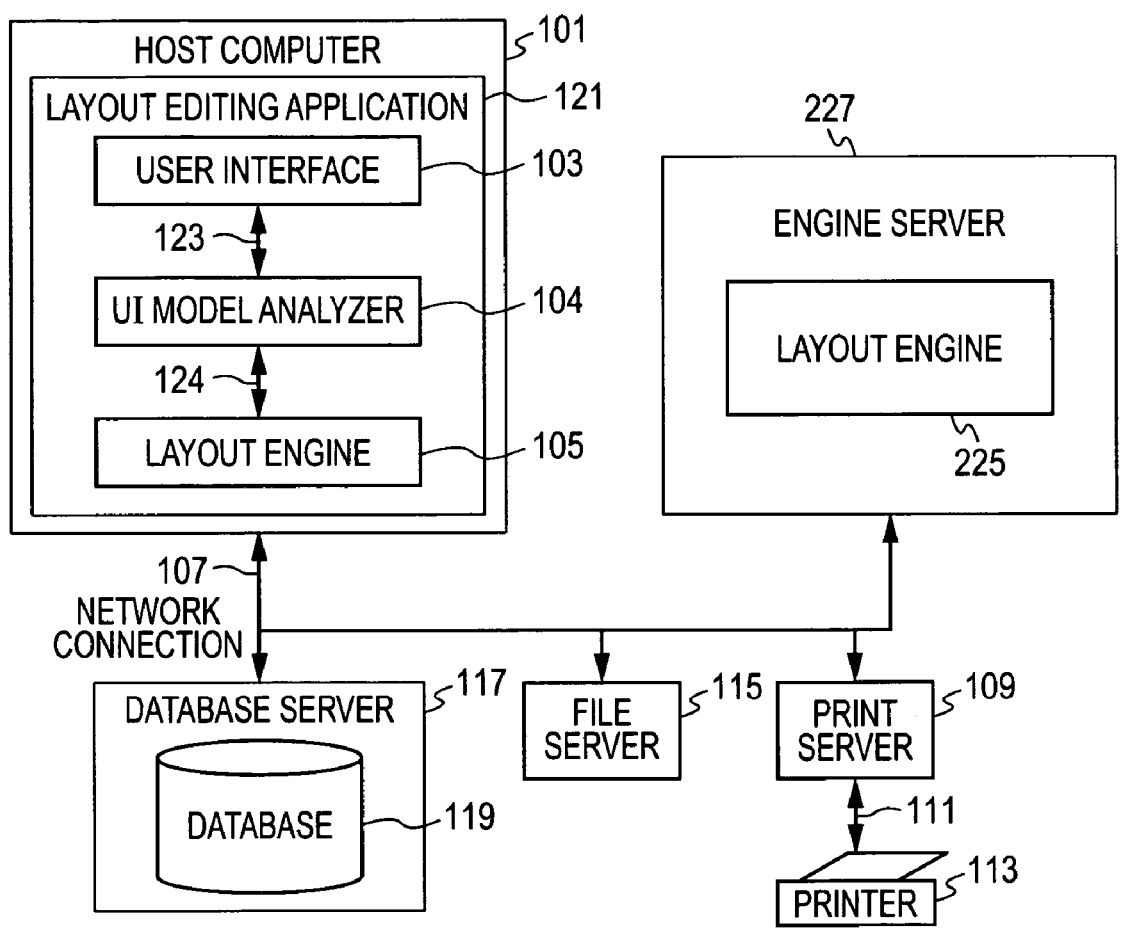
FIG. 2 is a diagram illustrating the structure in which an engine server is attached to the computer system shown in FIG. 1A.

FIG. 2 is similar to FIGS. 1A and 1B except for the addition of the engine server 227 containing a separate version 225 of the layout engine 105. The engine server 227 is another typical computer. Document templates stored on the file server 115 can be combined with data stored in the database 119 to generate documents for printing or other purposes by the layout engine 225. Such operation may be requested via the user interface 103, or a request to print a specific record may be issued.

Application Structure

Main Window

Figure 3:
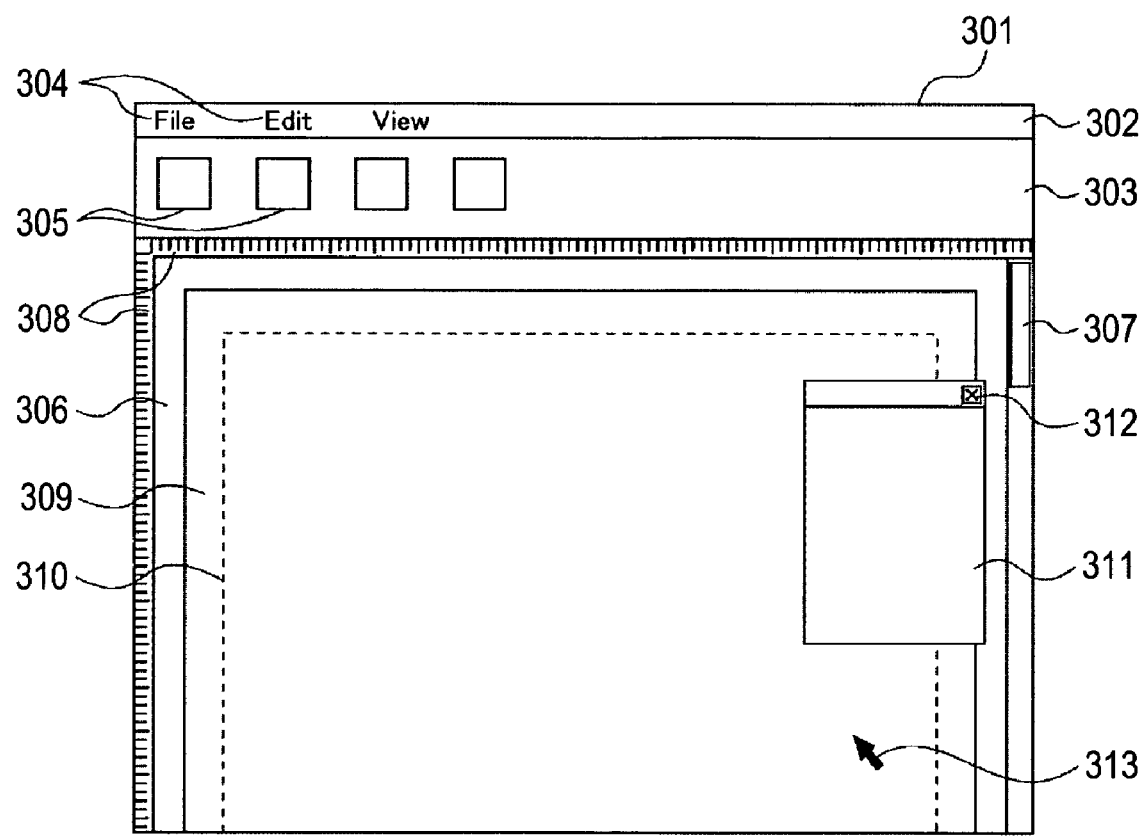
FIG. 3 is a diagram illustrating an example of a main window of an application.

Referring to FIG. 3, the user interface 103 includes a user interface formed by an application window 301 which, when operating, is displayed on the video display 144. The window 301 features a menu bar 302, a tool bar 303 that in some implementations can be detached and moved to various locations on the screen, a work area 306, an optional palette 311 and a cursor/pointer device 313, whose location is typically associated with a position or movement of the mouse 133.

The menu bar 302 has a number of menu items 304 which, when activated, expand into a hierarchy of menu options as is common in the present art.

The tool bar 303 has a number of tool buttons or widgets 305, each of which can be hidden or shown depending on the particular mode of the application.

Optional rulers 308 are used to indicate the position of the pointer, pages, lines, margins guides, containers or other objects in the work area.

The palette 311 can be used to access additional functions such as the variable data library. The palette 311 has its own window controls 312 allowing it to be moved, resized or closed. The palette 311 optionally remains in front of the work area at all times, or is hidden behind other objects. The palette 311 can be constrained to appear only within the extents of the application window 301, or be allowed to appear partially or wholly outside of the application window 301.

Figure 4:
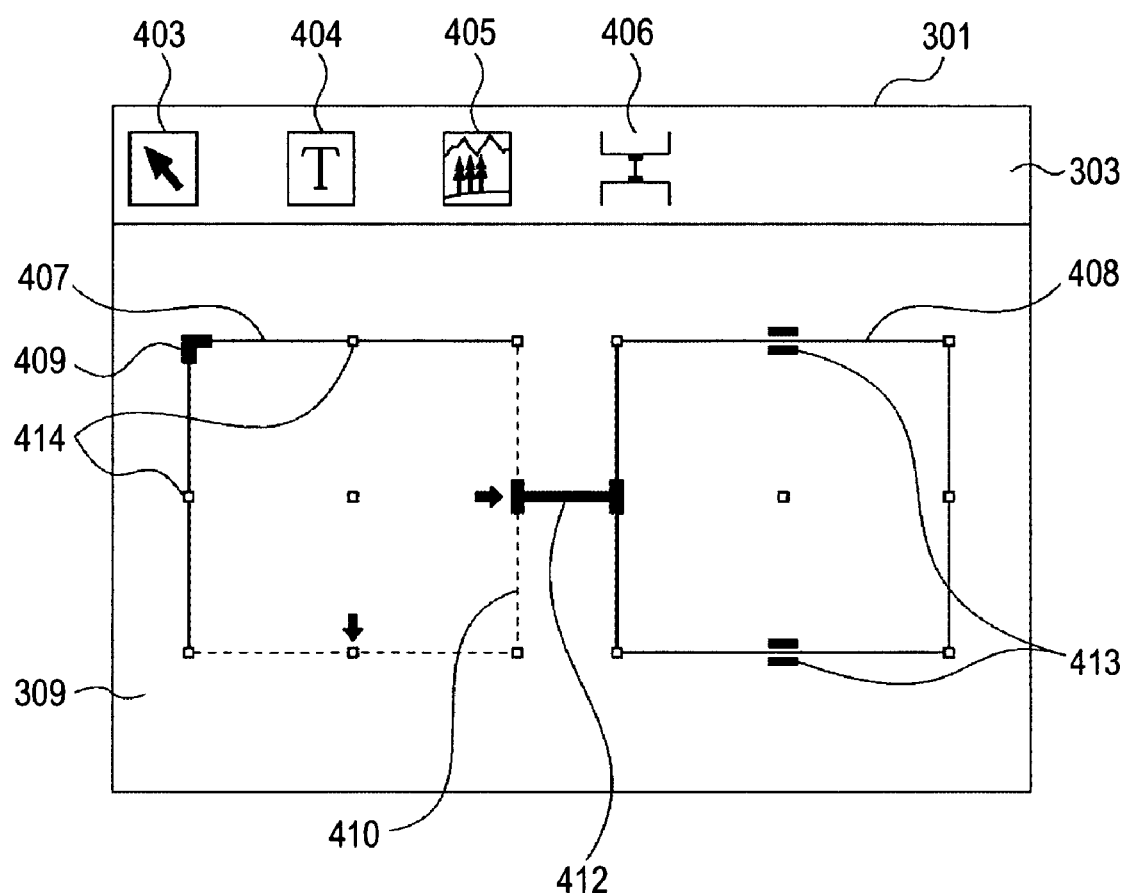
FIG. 4 is a diagram illustrating an example of a window in which container conditions are set.

Referring to FIG. 4, the tool bar 303 has at least the following user selectable "tool buttons".

(1) Selection Tool button 403: used to select, move, scale, resize and lock/unlock container edges. Containers can also be multiple selected by dragging a selection box around containers or holding down a control key while selecting containers.

(2) Image Container Tool button 405: used to create containers for holding static or variable images.

(3) Text Container Tool button 404: used to create containers for holding static or variable text.

(4) Link tool button 406: used to control the distance between containers.

These buttons can be implemented with context sensitive tooltip icons, as is well known in the art.

Document Template

The work area 306 is used to view and edit the design of a document template. This allows the user to design the printed appearance of the documents under preparation and understand how each merged document varies based on the amount and size of variable data being merged with the document template.

If an external data source has been linked to the template, variable text and images are displayed in their containers so that users can preview the current document as they work.

Visual clues that describe the structure of a document and the behavior of its variable data containers are displayed whenever the user rolls the cursor over or selects a container.

The work area 306 features a scroll bar 307, optional rulers 308 and the document template 309. The document template 309 can show a plurality of pages.

The page size for a given document template is specified by the user. The actual number of pages in each document varies depending on the content data to be merged. Additional pages are automatically created to display data if all does not fit onto one page.

Within each page boundary is an optional page margin guide 310 indicating the maximum extents of printable objects on the page.

Also illustrated in FIG. 4 is an example of a plurality of objects that could appear on a page of the document template 309, those being: a multiplicity of containers 407 and 408, an optional anchor icon 409, unfixed edges 410, a link 412, and sliders 413.

Containers

A container is a partial region (data region) within a document template into which static or dynamic content data (text or image) obtained from the database is placed. A plurality of containers are arranged together in the document template 309, as shown in FIG. 4. The containers are moved, scaled and reshaped by the user's command set via the user interface screen using the mouse 133. The following are the definition of a container.

(1) A container (also called a data field) is associated with a static or dynamic content. The dynamic content is dynamic in the sense that it comes from a data source and differs for different documents, that is, for different records. The dynamic content in the present embodiment is not intended to include animated or content otherwise changing with time.

Similarly the static content will appear the same in all documents produced using this container, although due to the action of the dynamic content, the static content may be placed differently for each document if a link to dynamic content is set.

(2) A container has cosmetic features, such as a background color, a border, and text settings such as fonts and styles, which apply to the content of the container. This setting is called container information. The container information can be set for each container. The setting can also be done such that a container has the same container information as another container.

(3) A container is merged with data from a data source when producing a document. The cosmetic features are typically visible in printed output, as are any static content. The dynamic content will result in the appearance of particular data from the data source. This representation of a container could be printed, for example, or displayed on the screen (display) 144, or both.

(4) A container has a user interface as the visual clues, as shown in FIG. 4. For example, an interactive graphical user interface (GUI) is provided for editing the container or setting the display. Each element of the GUI is displayed on the screen 144, but is not printed as a document. The user interface 103 of the layout editing application 121 displays some of the cosmetic features, such as the background color and font, of the container. The user interface 103 also has a function of editing or displaying container settings.

Container Constraints

A container has several constraints which control how associated contents may be displayed in each document. These constraints, together with means of associating static and dynamic content with the container, are the primary method by which a user controls the generation of multiple documents from a single document template. An example of a constraint is "this container's content may be a maximum of four inches tall". Another constraint might be "the left edge of this container's content must appear in the same horizontal location in each document". Described herein is a set of methods for displaying and editing such constraints using the GUI.

Content placeholders that specify the locations of the static content, such as an image having some defined location on a page, are well known in the digital printing arts. The containers may have a position and size that are displayed and edited in manners similar to those known in the art. The present discussion focuses on the display and editing methods particular to variable data printing.

Containers allow a user to specify the size and position of each content in documents. Since several documents are generated from a single document template, a container must have a user interface for specifying and displaying a multitude of possibilities and constraints.

The edges of a container define a virtual boundary within which the associated content will appear in documents. Thus, in this patent specification, discussing the left edge of a container is equivalent to discussing the left-most edge of where the associated content can be displayed in any documents produced. Similarly, discussing the height of a container is understood as discussing the constraint on the height of the associated content in any documents produced. Where this patent specification discusses the edge or size of a container with reference to the user interface 103, this distinction will be made clear.

In the following discussion, the term "fixed" that defines some values used to control the appearance of content is the same in all documents.

(1) If a width of a container is fixed, the width allowed for the associated content will be the same in all documents.

(2) If a height of a container is fixed, the height allowed for the associated contents will be the same in all documents.

(3) If a distance (link length) constraint is fixed, the specified distance is applied to all documents.

(4) If a left or right edge of a container is fixed, this means the horizontal position of that edge is the same for all documents relative to the page, but the height or vertical position of the container may change. For example, if the left edge of a container is fixed, the associated content can appear near the top of the page in one document and near the bottom of the page in another, but the left edge will have the same horizontal position in all cases.

(5) If a top or bottom edge of a container is fixed, this means the vertical position of the edge is the same for all documents relative to the page, but its width or horizontal position of the container may change.

(6) The vertical axis of a container is an imaginary vertical line positioned half-way between and parallel to the left and right edges of the container. If the vertical axis of a container is fixed, then the average of the horizontal positions of the left and right edges of the container will be the same for all documents. With this constraint, a container's width may vary, thus both the left and right edges may be farther from or closer to the vertical axis in different documents, but the axis remains in the same horizontal position for all documents. The container's height and vertical position are unaffected by this constraint.

(7) Similarly, if the horizontal axis is fixed, then the average of the vertical positions of the top and bottom edges of the container will be the same for all documents, although the width and horizontal position are unaffected by this constraint.

(8) If both the horizontal and vertical axes are fixed, this means the central point of a container is fixed, but its width and height are unaffected by this constraint.

(9) If a corner of a container, the mid-point of an edge of the container, or the central point of the container is fixed, that point appears in the same location in all documents. For example, if the top-left corner of a container is fixed, this means the location of the top-left point of the container is the same for all documents.

(10) A vertical edge or axis can be fixed relative to the left hand edge of the page, the right hand edge of the page, the left page margin, the right page margin, or some other horizontal position. Similarly, a horizontal edge or axis can be fixed relative to the top or bottom edges or margins of the page, or some other vertical position. These refinements of the term "fixed" are only significant if page sizes may vary between documents, since if the page size is the same for all documents these possibilities yield no difference in the documents produced.

The opposite of "fixed" is "unfixed" which means the edge, the axis, the corner, the mid-point, or the document constraints may vary between documents (records). For example, in a page, the layout is expected to dynamically change depending on the size or amount of variable data. However, the user may want that the size or position of a specific container is fixed, or the four corners of a container at a corner of the page are fixed. For this purpose, the layout editing application 121 can appropriately set, for each container (partial region), whether to fix or unfix the edge, the axis, the corner, the mid-point, etc. Hence, the user can produce a desired basic layout of the document template 309.

Displaying and Editing Container (Method for Creating New Container)

Two classes of container are described: text containers and image containers. A text container holds a text and embedded images. An image container only holds images.

Referring to FIG. 4, new text containers and image containers can be created in the document template 309 by clicking on the text container tool 404 or the image container tool 405 respectively, using the mouse 133, and then dragging a rectangle in the template 309. Alternatively a container may be created simply by clicking in the document template 309 after activating the appropriate tool 404 or 405. Either a container of a default size is inserted, or a dialog box or another prompt is provided for entering the dimensions of the new container. Some containers may be automatically created and placed according to some pre-defined or calculated scheme. Other alternatives may be devised.

When the generated container is selected by an input device such as the mouse and its properties are designated by clicking on the right button of the mouse, a container property dialog is displayed so that constraints for the container can be set. In the container property dialog UI, which corresponds to partial region setting, various kinds of constraints described above can be set. In the container property dialog, the size (width and height) and position of the container can be set. To set a variable size, the basic pattern (basic size and reference position) of the container is set. In addition, the maximum container size (width and height) and the minimum container size (width and height) can be set.

Method for Displaying Containers

FIGS. 5A to 5D illustrate rules for displaying a container.

The layout editing application program 121 draws edges as solid lines 503 or dashed lines 504 and also features anchors (drawn on or near an edge and composed of lines, shapes and/or icons) 506, 507, and 509, handles (control points drawn on or near an edge or shape to allow it to be moved or modified) 502, sliders (short parallel lines drawn on either side of an edge) 413 (of FIG. 4), growth icons 505, and colors.

The rules for the container display method of FIGS. 5A to 5D are described below.

(1) For each fixed edge, draw that edge solid.
(2) If the width is fixed, draw the left and right edges solid.
(3) If the height is fixed, draw the top and bottom edges solid.
(4) Axes are not drawn.
(5) All edges not yet drawn in (1) to (3) are drawn dashed with a growth icon drawn near each edge.
(6) For each fixed edge, draw a slider at the center of the edge if no anchors have been drawn anywhere on that edge.
(7) For each pair of perpendicular edges and/or axes, draw a handle at their intersection if no anchor or slider has been drawn in that location.

With regard to the anchors, for each pair of perpendicular edges and/or axes, an anchor may be drawn at their intersection if both are fixed.

Lines defined by rules (1), (2), and (3) are drawn solid since they are fixed or constrained as described above. Lines defined by rule (5) are drawn dashed. Rules (6) and (7) ensure that some fixed edges display sliders and others display handles.

In the above rules, latest constraints set by the user are applied. When different constraints are set later, the display of solid and dashed lines is changed if the set constraints affect the edges being drawn. Icons may be drawn differently or omitted if, for example, the container is very small and the icons would overlap each other or obscure other features of the representation.

The exact location where unfixed edges are drawn may depend on the content of the container. "Live proofing" is used, which means the content merged with the document template is visible in the user interface. An alternate implementation can use the container's content area averaged over all documents, or some other means of deciding where unfixed edges should be placed in the user interface.

These representations of containers provide a graphical method of displaying container edge states. The interpretation of the representations is described below.

(1) A dashed line 410 (FIG. 4) means the position of that edge in documents depends on the content of the container.
(2) A solid line 414 means the edge is constrained, either because the edge is fixed or the width or height of the container is fixed (both are fixed in the container 408).
(3) An anchor means the edges and/or axes which intersect at that anchor are fixed. Hence, the anchor point will appear in the same horizontal and vertical position in all documents. An anchor is therefore, by definition, fixed. The icon 409 in FIG. 4 is an example of an anchor icon which indicates the intersecting edges 414 are fixed.
(4) A slider means the associated edge is fixed but the container can move in parallel. For example, in FIG. 4, the sliders 413 indicate the content of the container 408 may appear in a document to the left or right of the position seen in that particular diagram.

Some or all of these icons or edges may be drawn or not drawn depending on which tool or which containers are selected, highlighted or otherwise activated. Container edges and icons are, in general, not drawn in a printed document since they are an aid to the design of a document template.

As described above, settings such as minimum and maximum width and height of the container can be displayed in the dialog window.

Figure 5A:
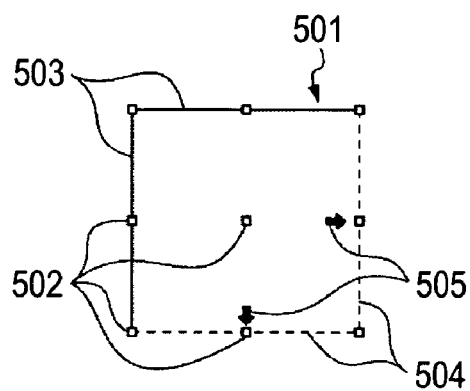
FIGS. 5A to 5D are diagrams illustrating container rules.

In FIG. 5A, a container 501 is unfixed in both width and height. Fixed edges 503 are represented by solid lines. Unfixed edges 504 are represented by broken lines. Growth icons 505 indicate that the adjacent edges 504 are unfixed.

Figure 5B:
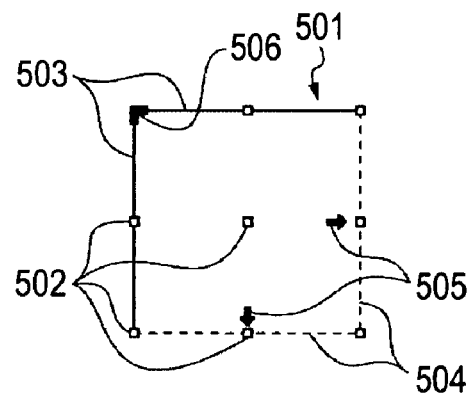

In FIG. 5B, a container 501 is unfixed in both width and height. An anchor icon 506 indicates that both edges 503 intersecting at the icon are fixed.

Figure 5C:
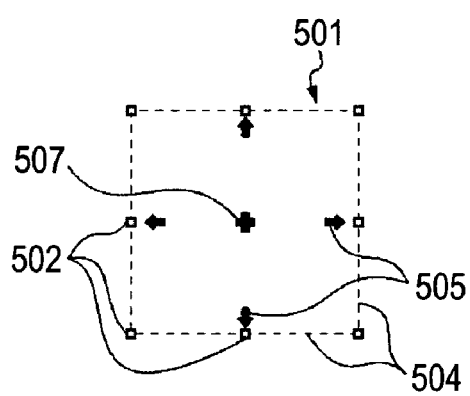

In FIG. 5C, a container 501 is unfixed in both width and height, with expansion or contraction of the container occurring equally around the center point as indicated by an anchor icon 507.

Figure 5D:
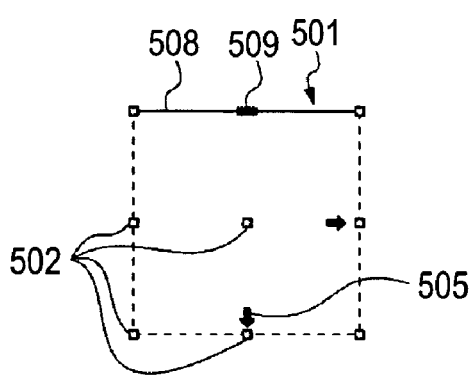

In FIG. 5D, a container 501 is unfixed in both width and height, except that the top edge 508 is fixed. An anchor icon 509 indicates that the top edge 508, in the center of which the icon is located, is fixed, and also indicates that the container's left and right edges expand or contract around a central axis line drawn vertically through the icon (the vertical axis).

Link

A link is used to connect containers with each other. The connection between the containers includes a distance between the containers. The layout of each container is calculated under the influence of layout changes of other containers associated therewith. FIG. 4 shows a link 412 that associates containers 407 and 408 with each other. A method for setting the link and a method for calculating the layout of the containers associated with each other by a link will be described below.

Method for Setting a Link

A method for setting a link for associating containers with each other will be described below.

Figure 6:
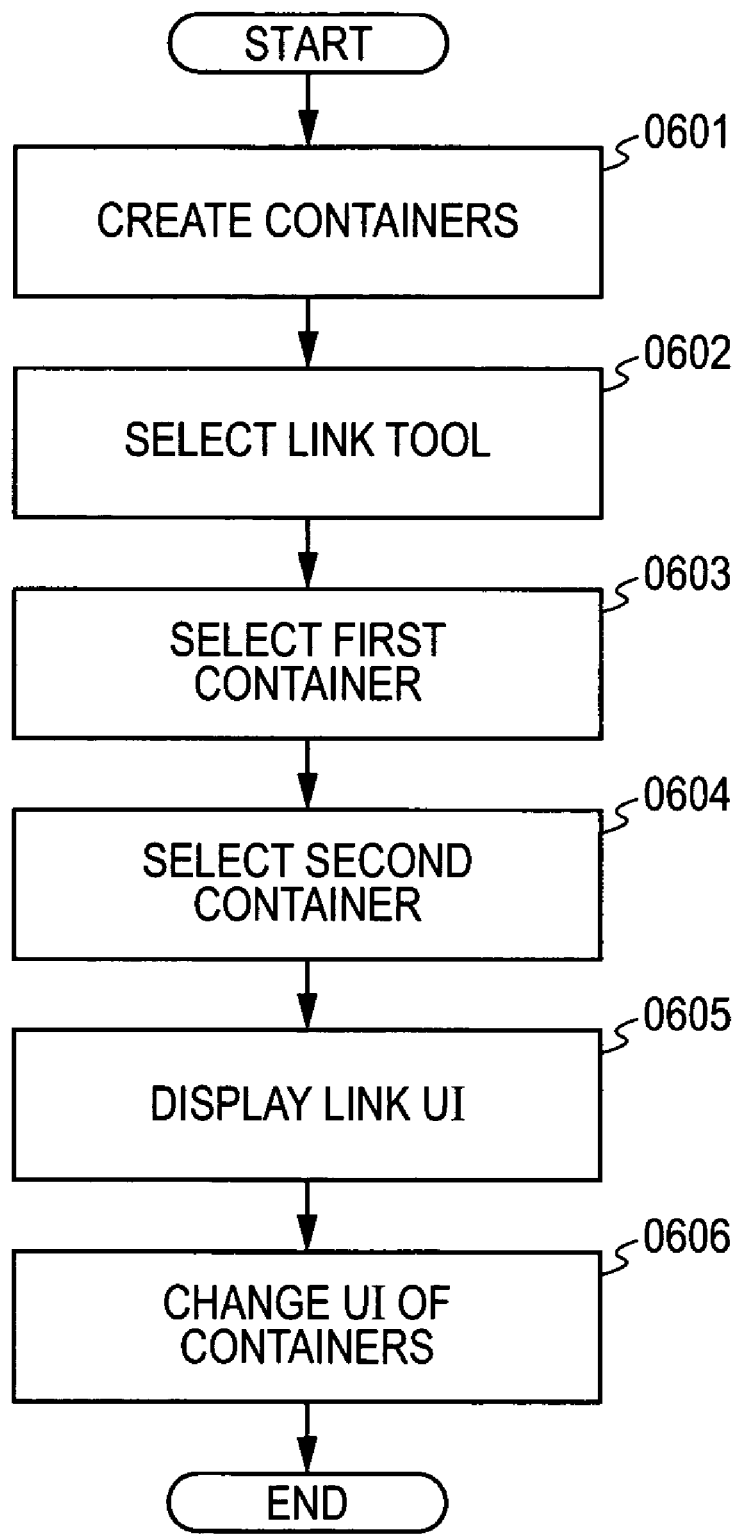
FIG. 6 is a flowchart of a link-setting process.

FIG. 6 is a flowchart showing a link-setting process according to the first embodiment the present invention. FIGS. 7A to 7C illustrate an example of the manner in which a user interface changes when a link is formed. A method for setting a link between containers will be described below with reference to FIGS. 6 and 7A to 7C.

First, in step 0601, the layout editing application 121 displays a document template to be edited on the work area 306 of the user interface. In order to set a link, at least two containers between which a link is to be set must be provided on the document template. FIGS. 7A to 7C shows an example of the manner in which the user interface changes when a link is set.

Next, in step 0602, the layout editing application 121 selects the link tool by clicking on the button 406 shown in FIG. 4. In FIG. 7A, all the edges of the containers 0701 and 0702 are fixed. Anchors similar to the anchor 409 shown in FIG. 4 are denoted by 0703 and 0704, and a mouse pointer is denoted by 0705.

While the link tool is selected, the user selects one of the two containers between which a link is to be set (container 0701 in this case) by clicking on the container. Accordingly, the user interface 103 of the layout editing application 121 recognizes that a first container has been selected (step 0603) and obtains information for identifying the selected container.

Then, a trajectory indicating the movement of the mouse cursor after the selection of the first container is displayed on the screen. For example, a line 0706 shown in FIG. 7B connects a click point in the state shown in FIG. 7A and a current position of the mouse pointer 0705. Accordingly, the UI shows the position at which the link is set to the user.

Next, as shown in FIG. 7B, the user moves the mouse pointer 0705 to the other container (container 0702) and clicks on the container. Accordingly, the user interface 103 recognizes that a second container is selected (step 0604) and obtains information for identifying the selected container.

The layout editing application 121 sets a link between the first container selected in step 0603 and the second container selected in step 0604.

Then, the link 0707 set between the two selected containers 0701 and 0702 is displayed (step 0605). Accordingly, a display state shown in FIG. 7C is obtained (step 0606).

More specifically, the UI of the containers is changed automatically since the link is set. The edges connected with the link become unfixed, and are therefore shown by the dashed lines. In FIG. 7C, the edges 0708 are shown by dashed lines which means that they are unfixed, as indicated by arrows 0709 and described above.

Method of Layout Calculation (Overall Flow)

Figure 8:
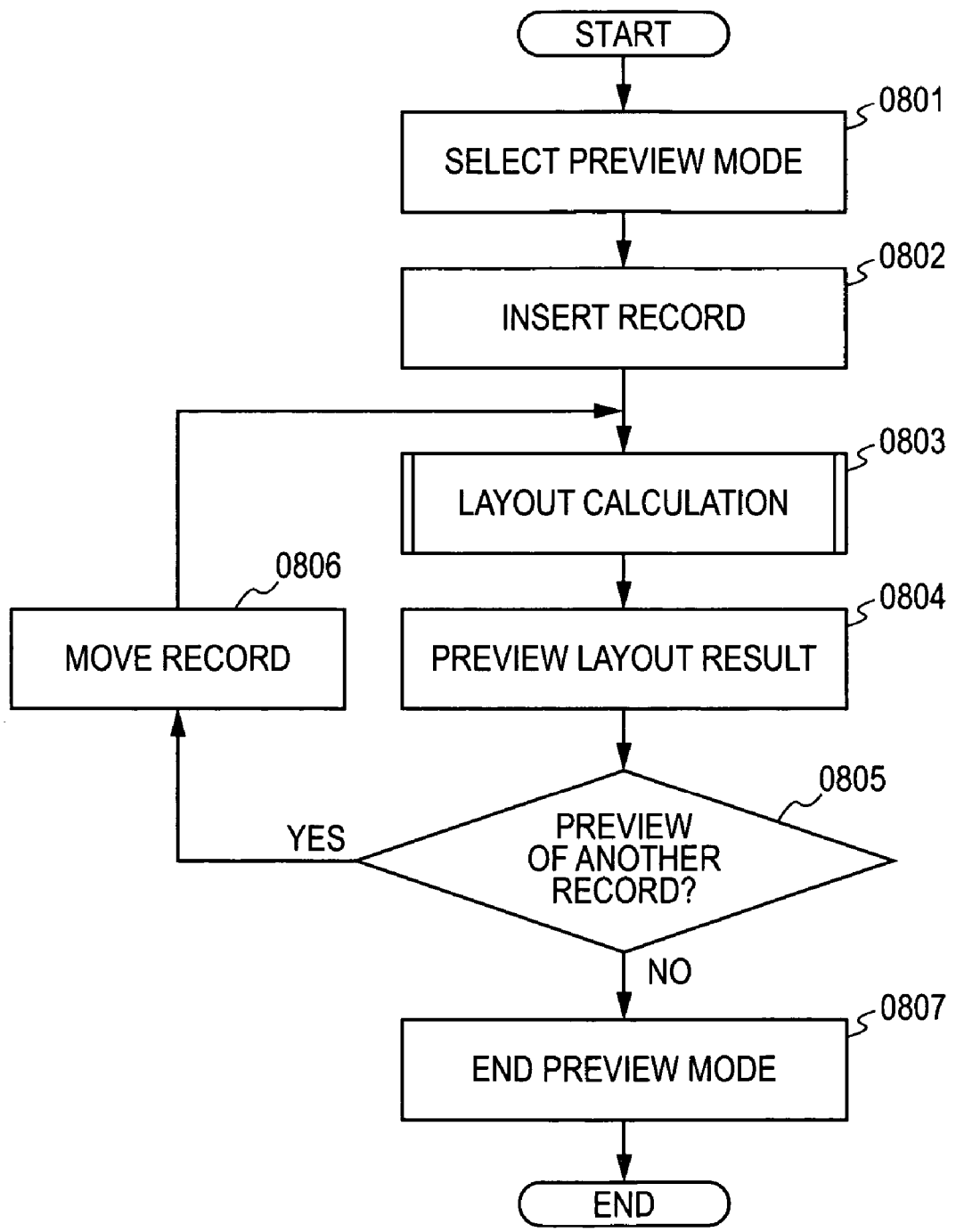
FIG. 8 is a flowchart of a layout calculation process performed by a layout engine according to the embodiment.

FIG. 8 shows the flow of layout calculation. In the process shown in the flowchart, calculations and information input/output operations are performed under the control of the processor 135 included in the host computer.

The layout editing application 121 according to the first embodiment performs either a layout mode operation or a preview mode operation. In the layout mode, a layout is produced by creating containers using the user interface 103 and associating the containers with each other (setting links). In the preview mode, a record in the data source is inserted into the layout produced by the layout engine 105 and the layout result in which the record is inserted is displayed.

In the preview mode, the layout is calculated by inserting the actual record. The layout calculation in the preview mode is for display. For printing, the layout engine 105 calculates the layout by inserting data into each container by a calculation method similar to that in the preview mode.

FIG. 8 is a flowchart of a layout calculation process according to the first embodiment of the present invention.

First, the layout editing application 121 recognizes that the preview mode is selected (step 0801). In the preview mode, the layout editing application 121 causes the user to select a record to be previewed from the data source, and inserts each field data in the selected record into the corresponding container (step 0802).

When the content data is inserted into each container, the layout editing application 121 performs the layout calculation for arranging the content data, and performs layout adjustment as necessary (step 0803). The layout calculation performed in step 0803 will be described in detail later. The layout adjustment is executed together with the layout calculation in accordance with the result of the layout calculation.

Then, in step 0804, the layout editing application 121 displays (previews) the layout calculated in step 0803. Then, the layout editing application 121 determines whether or not to display another record on the basis of the user's instruction (step 0805). If it is determined that it is not necessary to display another record (NO in step 0805), the preview mode ends (step 0807).

If it is determined that another record is to be previewed (YES in step 0805), the layout editing application 121 selects another record, performs the layout calculation again, and displays the result (step 0806). On the other hand, if it is determined that another record is not to be previewed (NO in step 0805), the preview mode is ended (step 0807).

If printing is to be performed instead of the preview mode, the layout calculation is successively performed for all the records to be printed. Therefore, step 0804 is not performed, and it is determined whether or not all the records to be printed are processed in step 0805. The result of layout calculation obtained in step 0803 is output to the printer driver, which generates corresponding print data. Then, the print data is output to the printer. In this case, the process ends when print data for all the records (records designated to be printed) is output.

Method of Layout Calculation (Detailed Flow)

Figure 9:
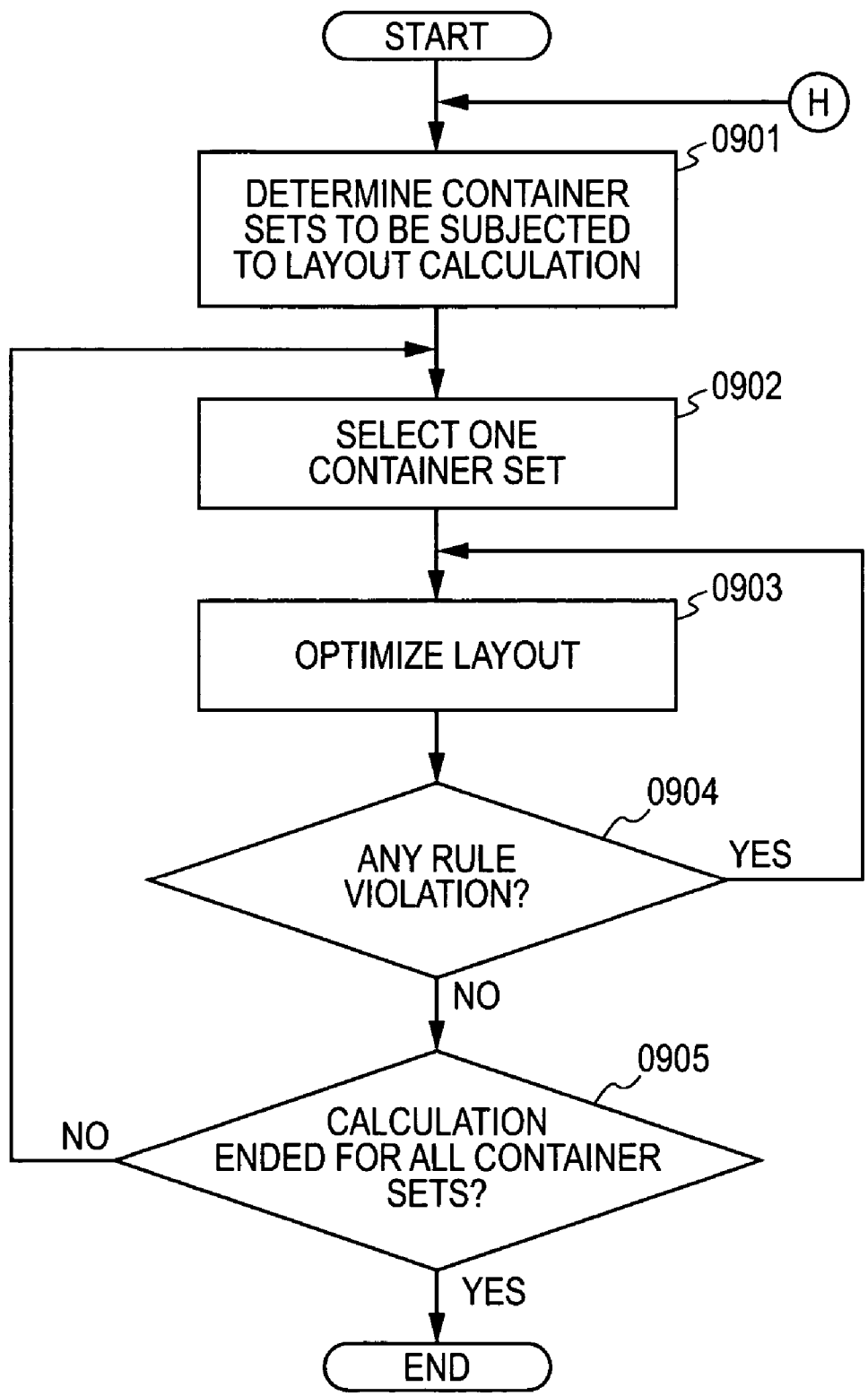
FIG. 9 is another flowchart of the layout calculation process performed by the layout engine according to the embodiment.

FIG. 9 shows the flow of the detailed layout calculation process.

First, the layout editing application program 121 determines container sets to be subjected to layout calculation (step 0901). The layout calculation is executed for each set of containers associated with each other. For example, referring to FIG. 11, four containers are arranged on a page, each container having a link to another container. In this case, containers A and B are associated with each other by a link, and containers C and D are associated with each other by a link. The containers A and B belong to Set 1, and the containers C and D belong to Set 2. As described above, reference numeral 1101 denotes an anchor, 1102 denotes a fixed edge, 1103 denotes a controller, 1104 denotes an arrow indicating the change direction of the unfixed edges, 1105 denotes an unfixed edge, 1106 denotes a link, and 1107 denotes a slider.

Next, in step 0902, the layout editing application 121 selects a container set to be subjected to the layout calculation from the container sets set in step 0901. Then, the layout calculation for the selected container set is started.

First, sizes of the two containers A and B, which are variable elements belonging to the selected container set, when there are no constraints are calculated on the basis of the image size or the amount of text of the data to be inserted therein.

More specifically, the layout editing application 121 determines whether the container A is an image data container or a text container. The determination is performed on the basis of the container information that is set for each container as described above. The container information is stored in the memory 136 in the format shown in FIG. 25.

Next, the layout editing application 121 reads out the data to be inserted into the container A. When the container A is an image data container, the size of the container A when there are no constraints is determined as the size of the image data (the number of pixels along the width and height and resolution).

When the container A is a text container, the layout editing application 121 calculates the amount of data to be inserted into the container A on the basis of the number of characters included in the text data and character information including the font type, the font size, the character pitch, and the line pitch that are designated in the container information of the container A.

When the container A is a text container, the aspect ratio cannot be determined without a constraint. Therefore, a constraint is applied. In the example shown in FIG. 11, the container A has anchors 1101 at the top-left and bottom-left corners, which means that the height (vertical direction) is fixed. Accordingly, the layout editing application 121 determines whether or not the calculated amount of data (amount of text) can be inserted within a width (horizontal direction) set as the basic pattern of the container A.

If it is determined that all the characters can be inserted, the size (width and height) of the container A is not changed from the basic pattern. If it is determined that it is not possible to insert all the characters, the container A is extended in the horizontal direction since the height thereof is fixed by the anchors. At this time, the layout editing application 121 calculates the amount of increase in the width of the container A required for inserting the calculated amount of text content, thus calculating the size of the container A.

Next, the layout editing application 121 optimizes the layout to make the difference between the size of each container when the content data is inserted and the actual content size as small as possible (step 0903). The layout optimization is performed such that the difference between the content size and the layout size is the same or as close as possible in the containers that are associated with each other to have dynamically variable sizes.

The layout editing application 121 calculates the size of the container set optimized in step 0903, that is, the total size of the containers A and B and the link 1106 (fixed link in this embodiment) that has been changed by the insertion of the contents. Then, a difference between the total size and the size of the container set according to the basic layout (the size corresponding to the distance between the anchor icons in the containers A and B in the example shown in FIG. 11) is calculated. The difference is generated when the widths of the containers A and B are increased according to the calculation. The layout editing application 121 adjusts the layout by evenly distributing this difference among the elements of the container set.

Next, the layout editing application 121 determines whether or not the layout optimization violates any layout rule (step 0904). If the optimization does not violate any of the rules (NO in step 0904), the process proceeds to step 0905. If the optimization violates a rule (YES in step 0904), the process returns to step 0903 and performs the calculation again to avoid any violation of the rules.

The rules are constraints set by the user when the layout is created. For example, the position of each container, the variable range of the container size, and a change in link length of a flexible link are limited by constraints. When the layout is calculated without violating any rules, the layout of the container set is completed. The flexible link will be described later.

Then, steps 0902 to 0904 are performed for all the container sets on the page, and the layout editing application 121 determines whether or not the layout calculation is performed for the entire page (step 0905). If the calculation is not finished (NO in step 0905), the process returns to step 0902. If the calculation is finished (YES in step 0905), the process ends.

Figure 10A:
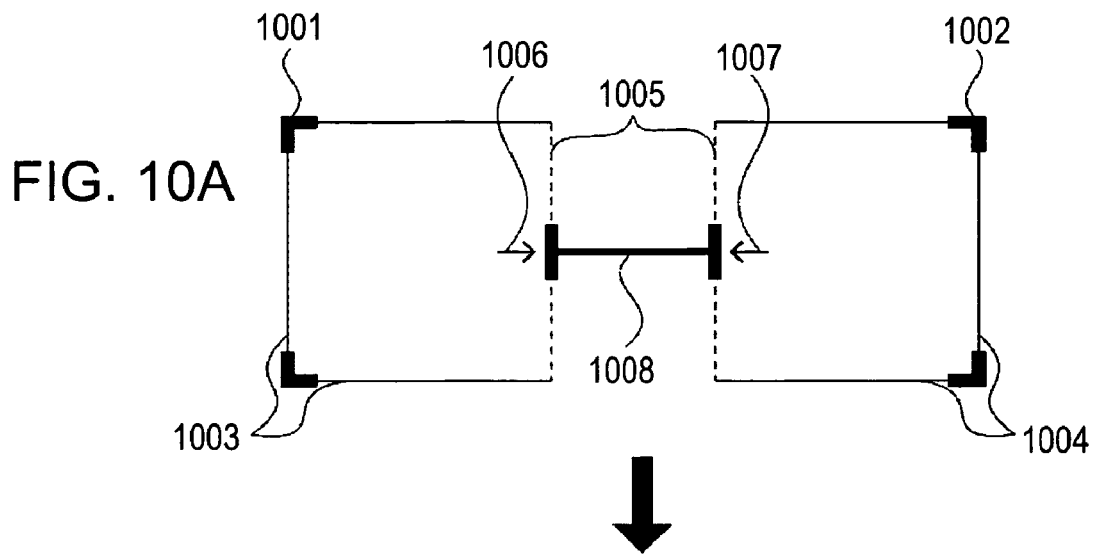
FIGS. 10A to 10C are diagrams illustrating the layout calculation process according to the embodiment.
Figure 10B:
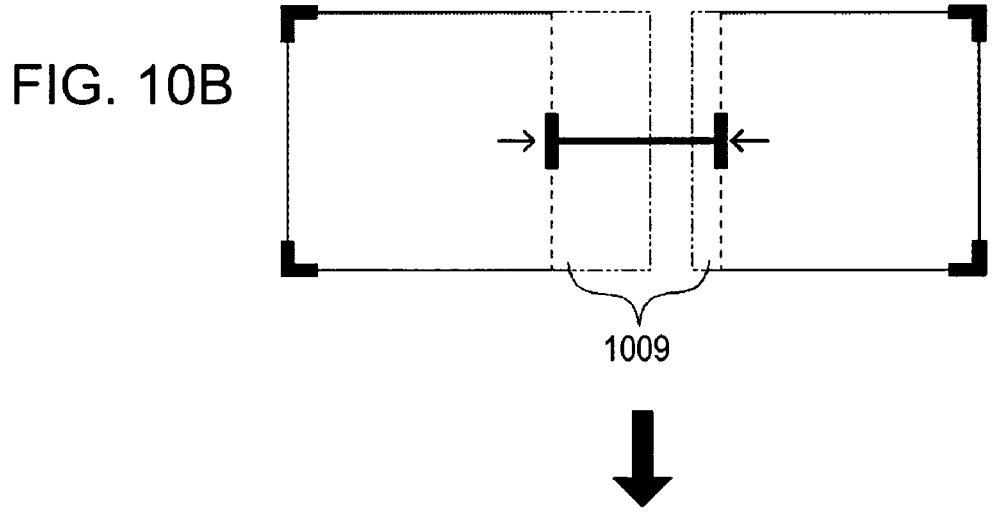
Figure 10C:
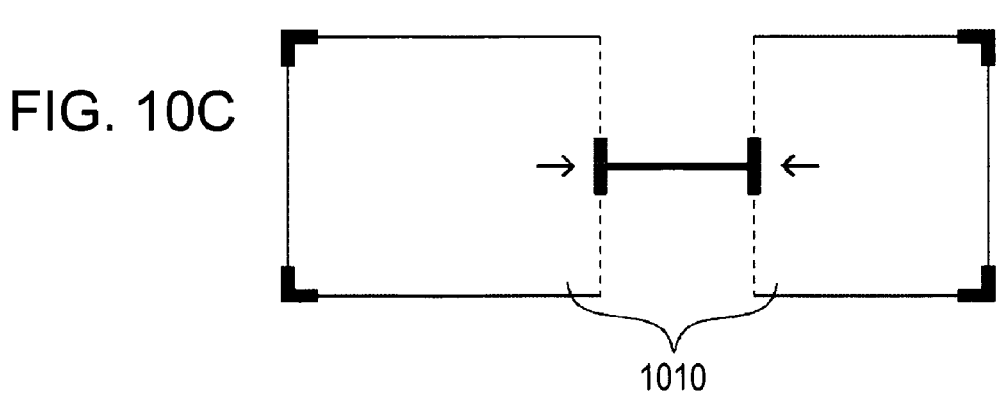

FIGS. 10A to 10C illustrate an example of a UI display in the layout calculation process according to the first embodiment of the present invention.

FIG. 10A shows the state in which a certain record is inserted and a layout is determined. Reference numerals 1001 and 1002 denote anchors, 1003 and 1004 denote fixed edges, 1005 denotes unfixed edges, 1006 and 1007 denote arrows indicating the direction in which the unfixed edges can be moved, and 1008 denotes a link. In this state, content data elements included in the record are successively inserted into the containers.

In FIG. 10B, the sizes of the content data elements to be inserted next are superimposed on the display. Reference numeral 1009 denotes the sizes of content data elements to be inserted into the containers. In FIG. 10B, the sizes of the content data elements are too large to fit the content data elements into the containers, and therefore the layout calculation is performed for adjusting the layout between the containers.

FIG. 10C shows the result of the layout calculation. The sizes of the containers are calculated such that the difference between the calculated container size and the actual content size is the same in each container. As shown in FIG. 10C, calculated content sizes 1010 have the same difference to the corresponding content sizes 1009 shown in FIG. 10B.

Setting Flexible Link

Figure 12:
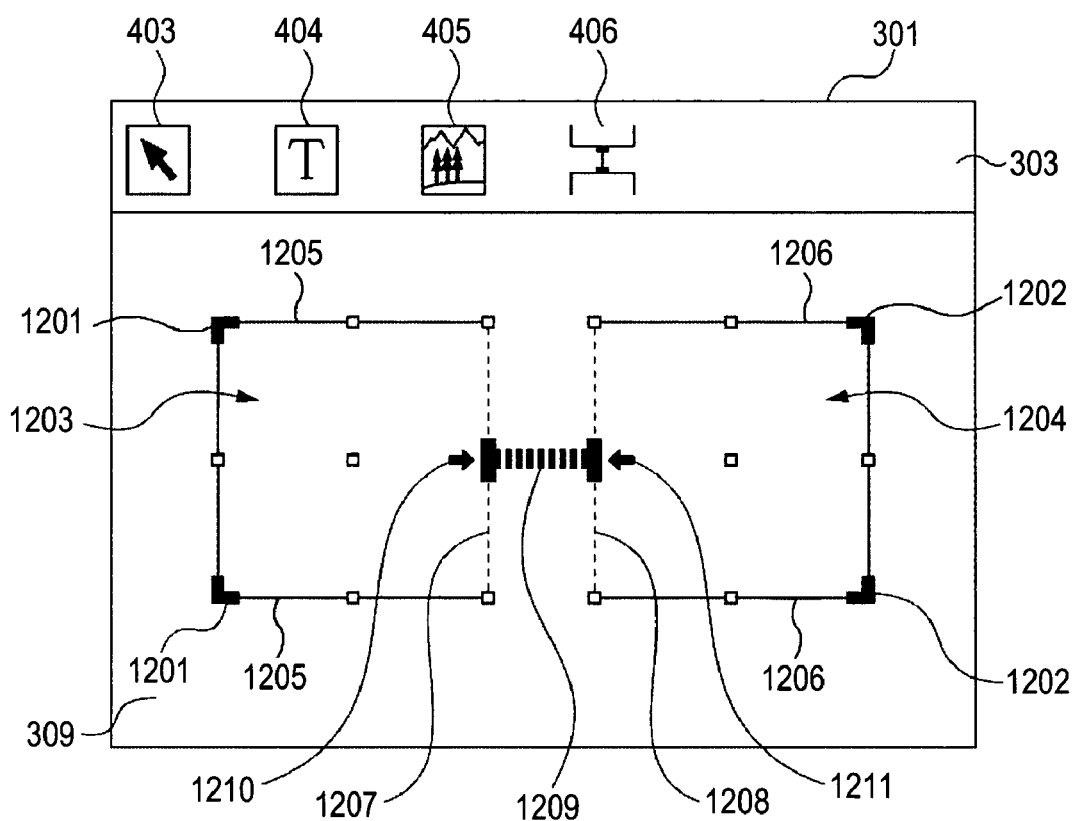
FIG. 12 is a diagram illustrating a display example of the user interface in which containers associated with each other by a flexible link are arranged.

FIG. 12 illustrates a state in which a typical flexible link is set. Similar to FIG. 4, the application window 301 and the tool bar 303 are shown, and containers 1203 and 1204 are placed on the document template 309. The containers are typically defined by anchor icons 1201 and 1202 and fixed edges 1205 and 1206. The containers 1203 and 1204 are connected with each other by a flexible link 1209 placed therebetween. Since the link is set between the containers 1203 and 1204, a right edge 1207 and a left edge 1208 are drawn with dashed lines. Accordingly, indicators 1210 and 1211 indicating that the edges 1207 and 1208 are unfixed are shown on the containers.

Figure 14:
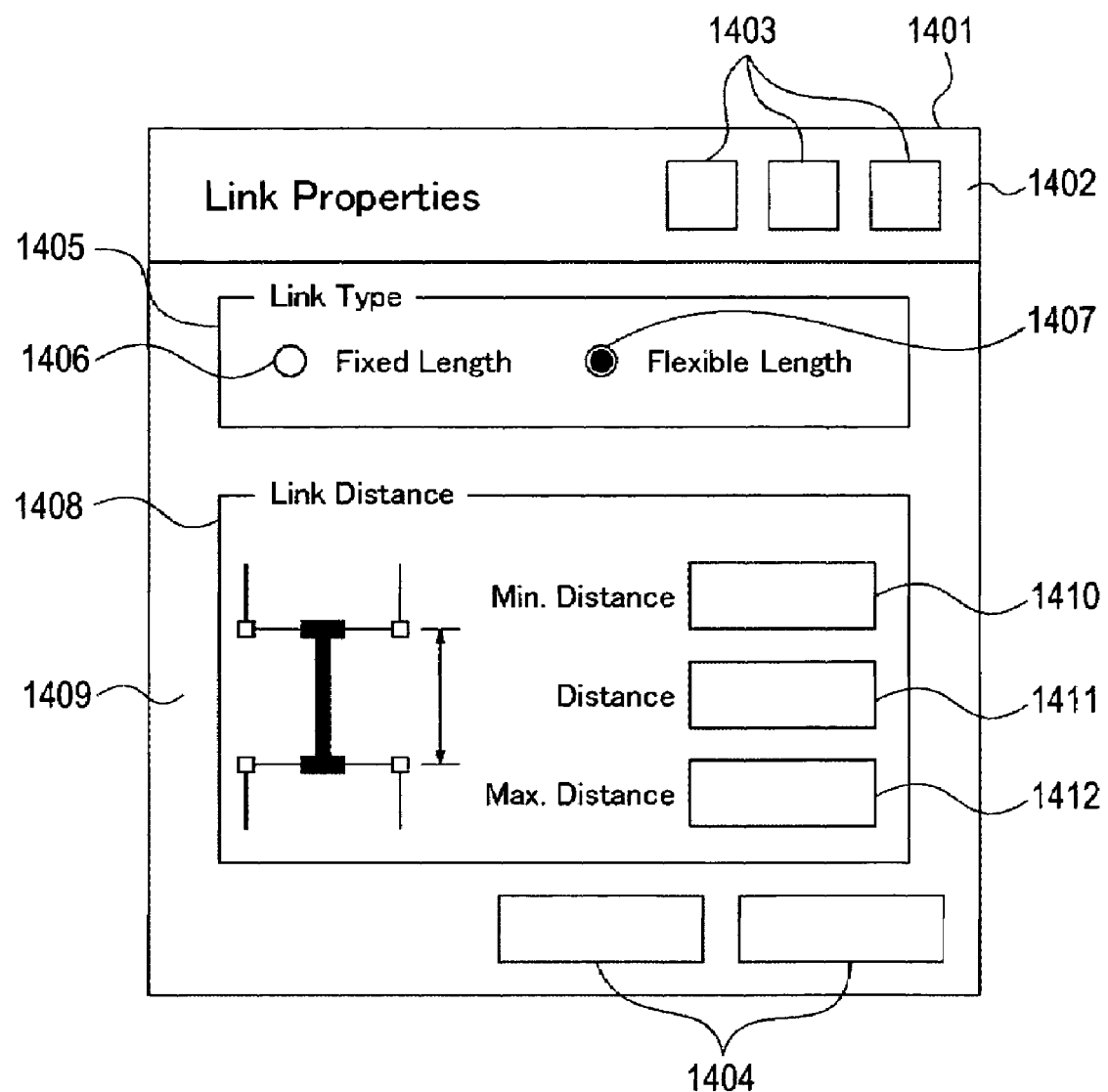
FIG. 14 is a diagram illustrating a setting dialog window according to the embodiment.

FIG. 14 shows an example of a dialog window 1401 for setting information of the link 1209. This dialog typically includes a title bar 1402, tool buttons 1403, buttons 1404 for opening/closing the dialog window, and an area 1409 for setting various information. The dialog window is used for selecting the link type from flexible 1407 and fixed 1406 and setting a minimum link distance 1410, a maximum link distance 1412, and a reference distance 1411 when the link type is flexible.

Figure 13:
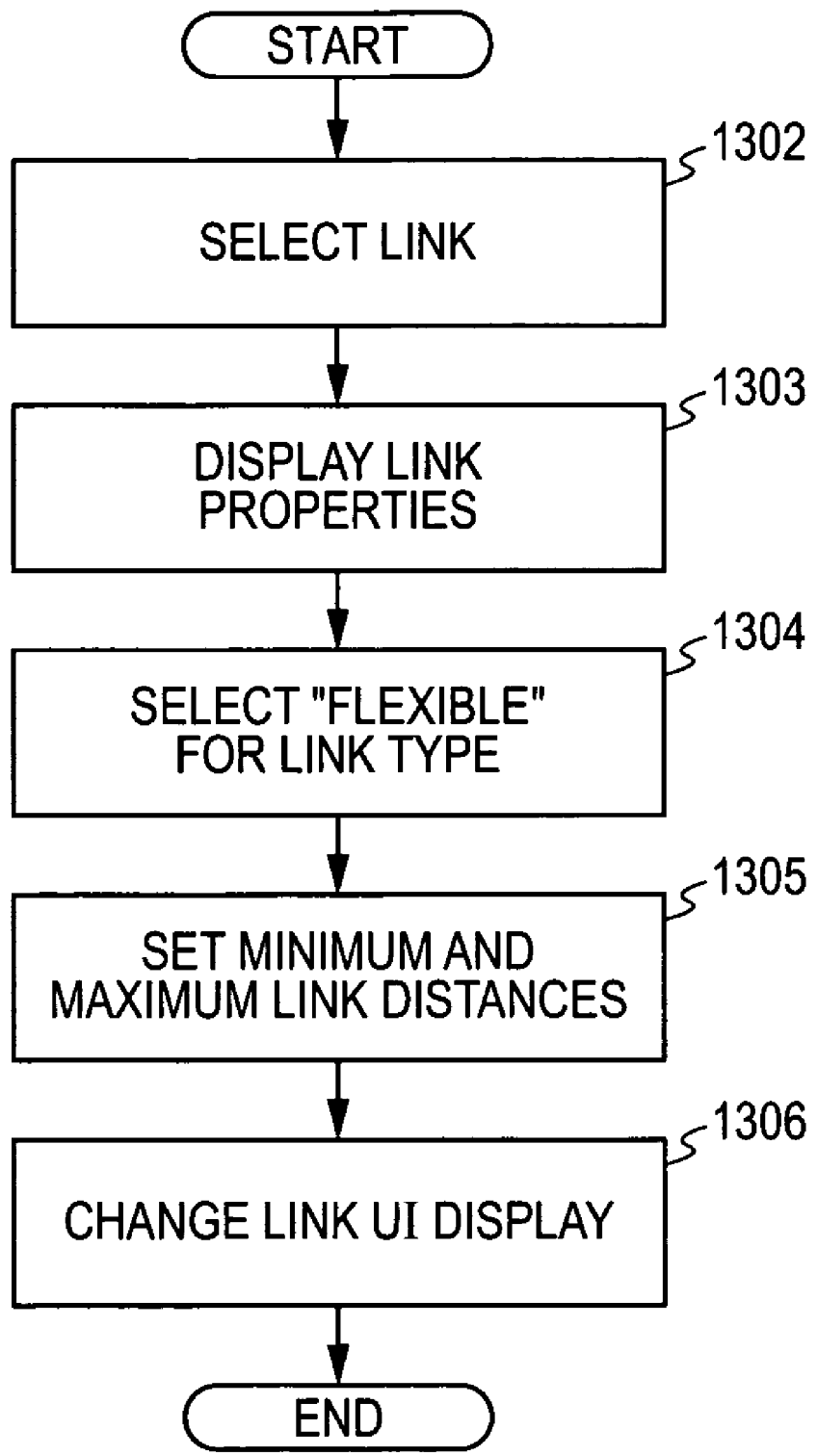
FIG. 13 is a flowchart of a process for setting a flexible link using the user interface according to the embodiment.

FIG. 13 is a flowchart of a method for setting a flexible link. The process is performed by the processor 135 included in the host computer.

Figure 7:
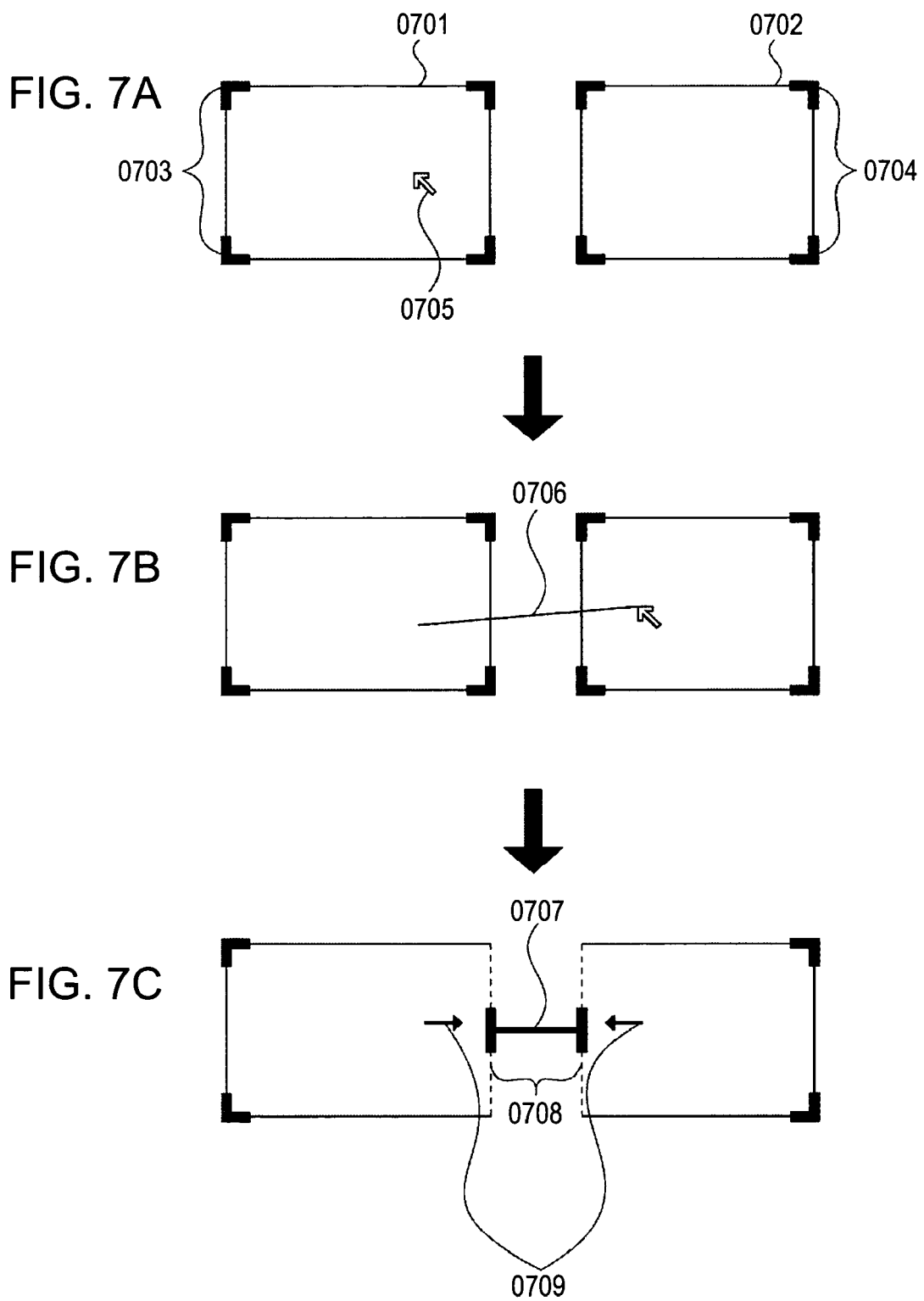
FIGS. 7A to 7C are diagrams illustrating an example of the manner in which a user interface changes when a link is formed.
Figure 11:
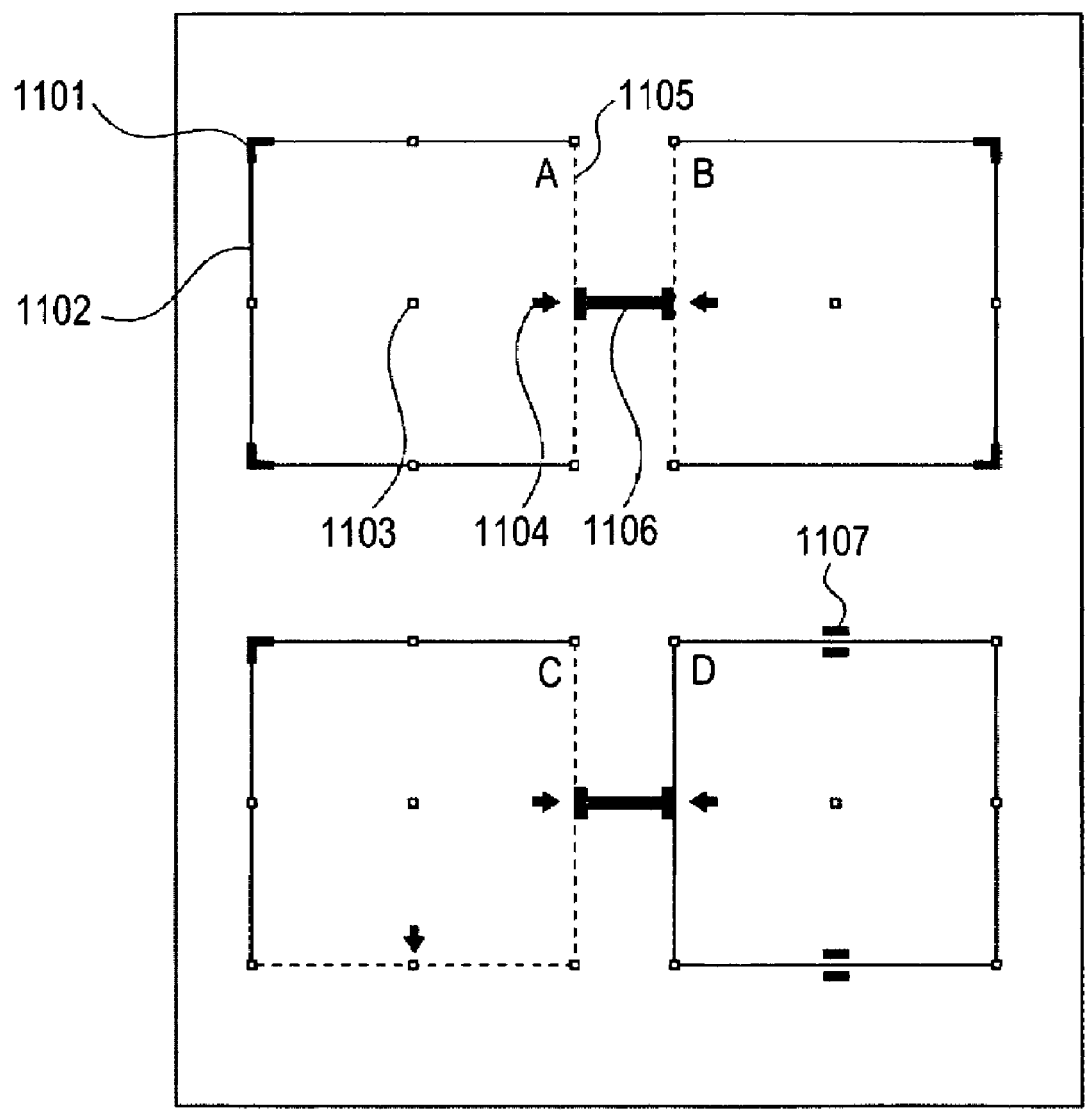
FIG. 11 is a diagram illustrating container sets processed in the layout calculation according to the embodiment.

For example, when a link is set between the containers A and B shown in FIG. 11 by the link-setting process explained with reference to FIGS. 6 and 7, a link with a fixed size is set. Then, when the process shown in FIG. 13 is performed after selecting this link, the link is changed from the link 1106 with a fixed size (FIG. 11) to a link 1209 with a flexible size (FIG. 12).

First, the layout editing application 121 sets a link selected by the mouse (for example, the link 1106 in FIG. 11) to a selected state (step 1302). Then, when a predetermined operation for displaying link properties is performed, the user interface 103 in the layout editing application 121 displays the dialog window 1401 (FIG. 14) corresponding to the state of the selected link (hereafter called a target link) (step 1303). Similar to the process of setting the basic pattern of the container, the selection of the link may be performed by, for example, clicking on the right button of the mouse 133 or operating a predetermined key on the keyboard 132. The displayed dialog window 1401 shows the current state of the selected link. In the present example, the link 1106 is selected. Accordingly, the link size is fixed at this time and the fixed length 1406 is selected in a link type field 1405. Although the flexible length 1407 is selected in FIG. 14 since FIG. 14 shows the state after the flexible link is set, the fixed length 1406 is selected at the time when the link 1106 is selected.

The layout editing application 121 checks the state of selection from the fixed/flexible link in the dialog window 1401 performed by the mouse or the like, and recognizes that the flexible length 1407 is selected (step 1304). Accordingly, a maximum distance field 1412, a minimum distance field 1410, and a reference distance field 1411 arranged in a link distance field 1408 are activated such that numeric values can be set. The user inputs a maximum distance of the flexible link into the maximum distance field 1412, a minimum distance of the flexible link into the minimum distance field 1410, and a current value of the flexible link into the reference field 1411. Then, the layout editing application 121 recognizes the input values (step 1305).

After the setting process, the user enters a command to apply the settings using a typical dialog window open/close button 1404. The user interface 103 detects this command and updates the settings for the target link. As a result, the UI display for the link is changed to the link 1209 in FIG. 12 (step 1306). The process then ends.

The setting information in the dialog window 1401 is stored in, for example, the memory 136.

Next, an example of a layout result will be described with reference to FIGS. 15 and 16.

Figure 15:
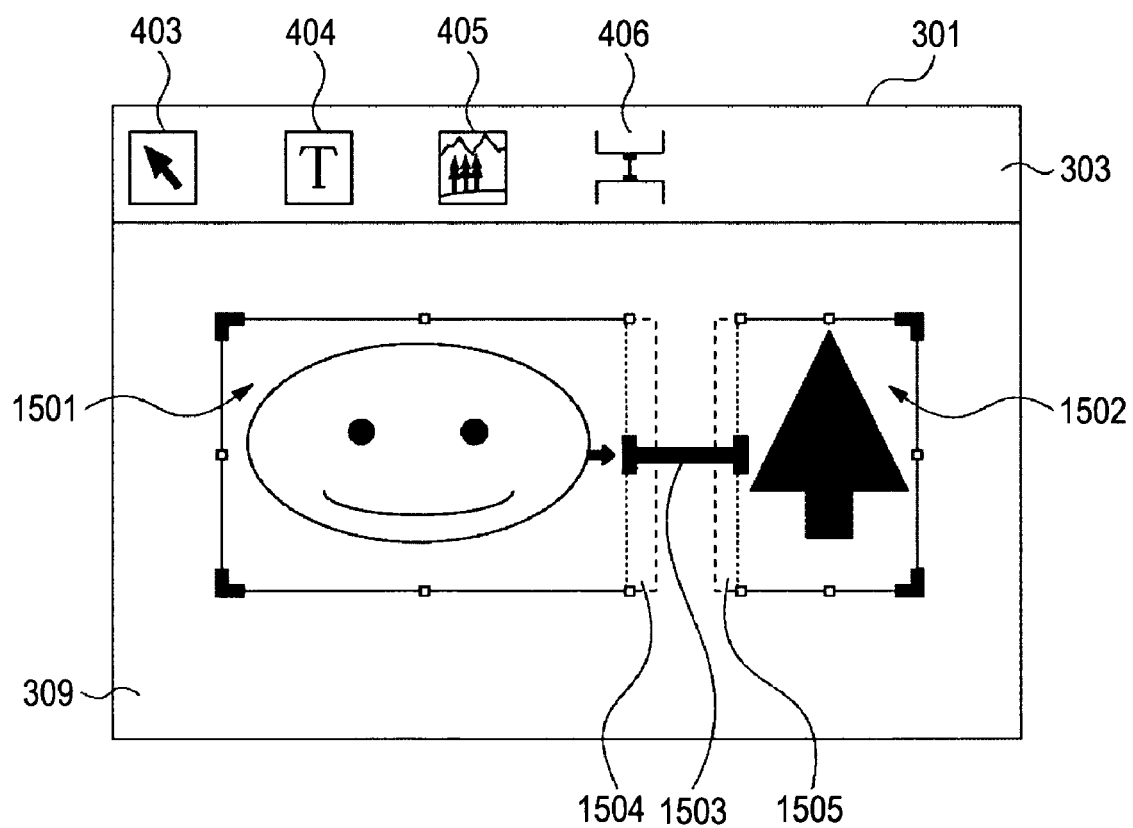
FIG. 15 is a diagram illustrating an example of a result of layout using a fixed link.

FIG. 15 is a diagram illustrating a layout result obtained by a link with a fixed size according to the present embodiment.

The layout calculation is performed by the above-described method. For example, referring to FIG. 15, a case is considered in which image data elements having sizes different from the corresponding preset container sizes are inserted into containers 1501 and 1502. In this case, each container assumes that the size of the corresponding content data element is optimum. Accordingly, the container 1501 tries to extend rightward to become close to a frame 1504 with the size of the inserted image (optimum container size), whereas the container 1502 tries to extend leftward to become close to a frame 1505 with the size of the inserted image (optimum container size).

However, since the container 1501 has anchors at the left edge and the container 1502 has anchors at the right edge, the containers 1501 and 1502 cannot move. Therefore, in order to change the sizes as described above, the distance between the containers 1501 and 1502 must be reduced. However, since a link 1503 with a fixed size is set between the containers 1501 and 1502, the sizes of the containers 1501 and 1502 can only be changed such that the length of the link 1503 is maintained in the layout calculation.

As a result, the sizes of the containers 1501 and 1502 are not set to the optimum sizes corresponding to the aspect ratios of the data, but are smaller than the optimum sizes (frames 1504 and 1505), as shown in FIG. 15. In other words, since the size of the link 1503 is fixed, the sizes of the containers 1501 and 1502 cannot be optimized.

Figure 16:
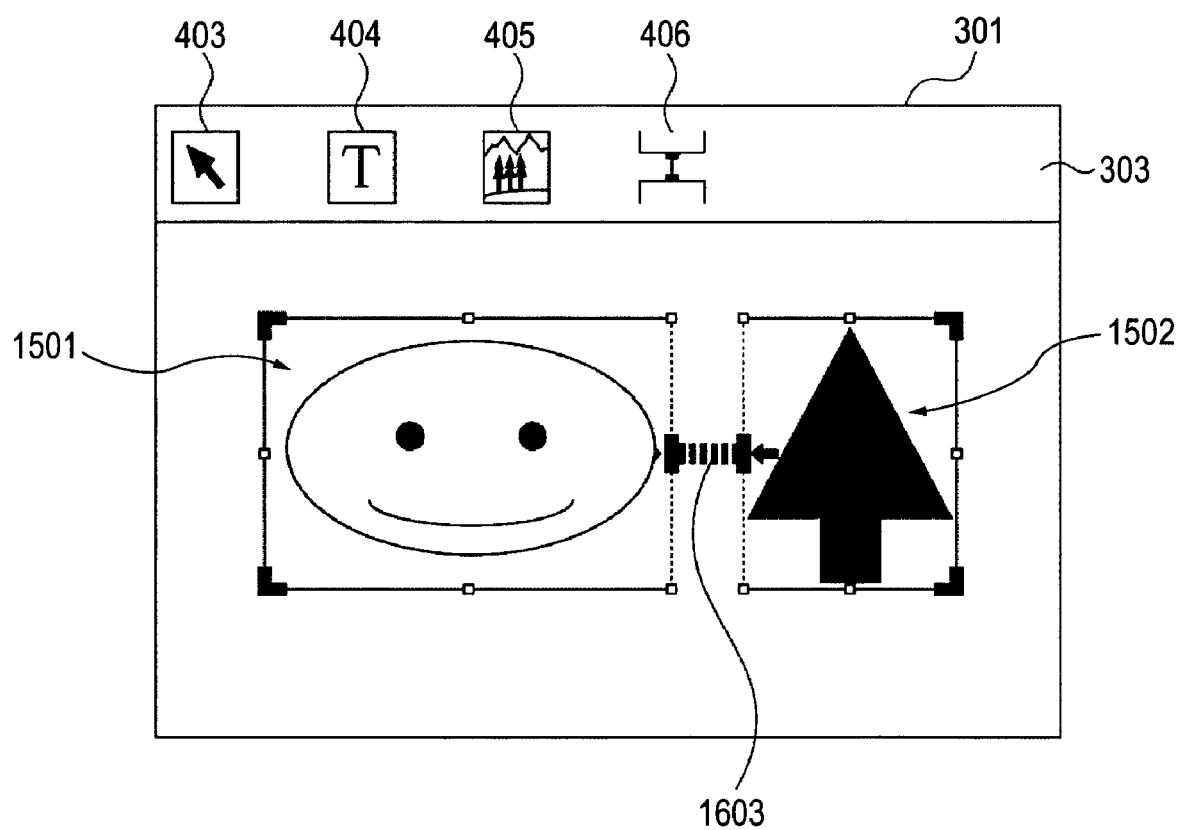
FIG. 16 is a diagram illustrating an example of a result of layout using a flexible link.

FIG. 16 is a diagram corresponding to FIG. 15 illustrating the case in which the link has a flexible size.

In this case, a link 1603 with a flexible size is set between the containers 1501 and 1502. Accordingly, when the sizes of the containers 1501 and 1502 are to be changed, the link size can be reduced to make the sizes of the containers 1501 and 1502 larger than those shown in FIG. 15.

Accordingly, containers having the optimum sizes corresponding to the sizes of the inserted data elements or the sizes close to the sizes of the inserted data elements (optimum sizes) can be set. FIG. 16 shows the result of this, and the size of the flexible link 1209 shown in FIG. 12 is changed to that of the flexible link 1603 after the layout calculation. In this case, the containers 1501 and 1502 have the optimum sizes (sizes corresponding to the data sizes). The above-described structure is the basic structure to which the present invention is applied.

Setting Inter-Page Link

Figure 17:
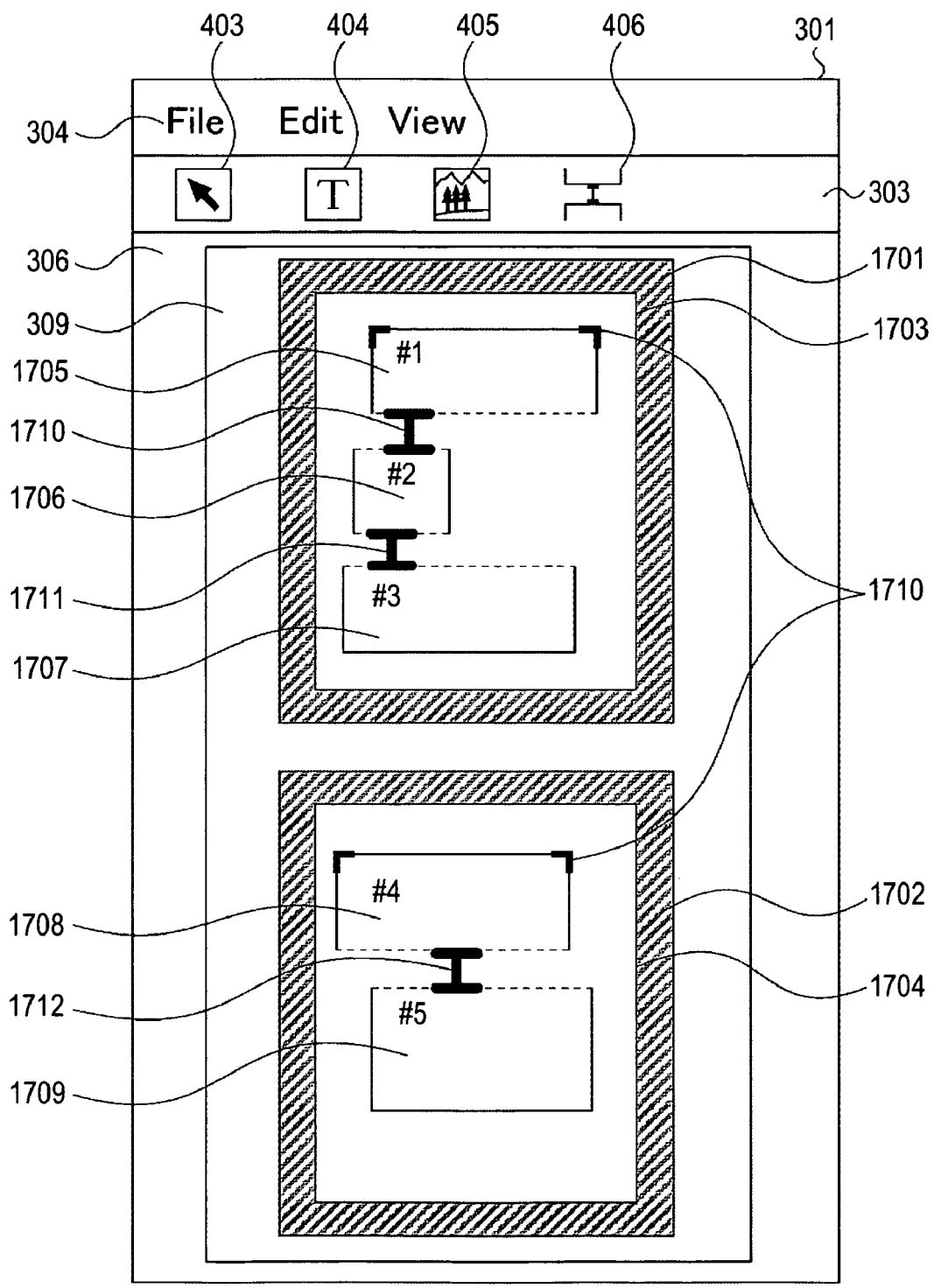
FIG. 17 is a diagram illustrating an example of a document template including a plurality of pages according to the embodiment.

FIG. 17 illustrates a layout design of a document template having a plurality of pages.

Similar to FIG. 3, the application window 301, the tool bar 303, the menu items 304, and the work area 306 are shown in FIG. 17. The document template 309 includes two pages 1701 and 1702. The pages 1701 and 1702 have page margin guides 1703 and 1704, respectively, which correspond to the margin guide 310 shown in FIG. 3.

Containers 1705, 1706, and 1707 are placed on the page 1701 in the document template 309, and containers 1708 and 1709 are placed on the page 1702 in the document template 309. A link 1710 is set between the containers 1705 and 1706, a link 1711 is set between the containers 1706 and 1707, and a link 1712 is set between the containers 1708 and 1709. Anchors 1710 are set on the containers 1705 and 1708. The information set on the document template 309 by the user is recognized by the processor 135 and is stored in the memory 136 in the format shown in, for example, FIGS. 25 and 31.

Figure 18:
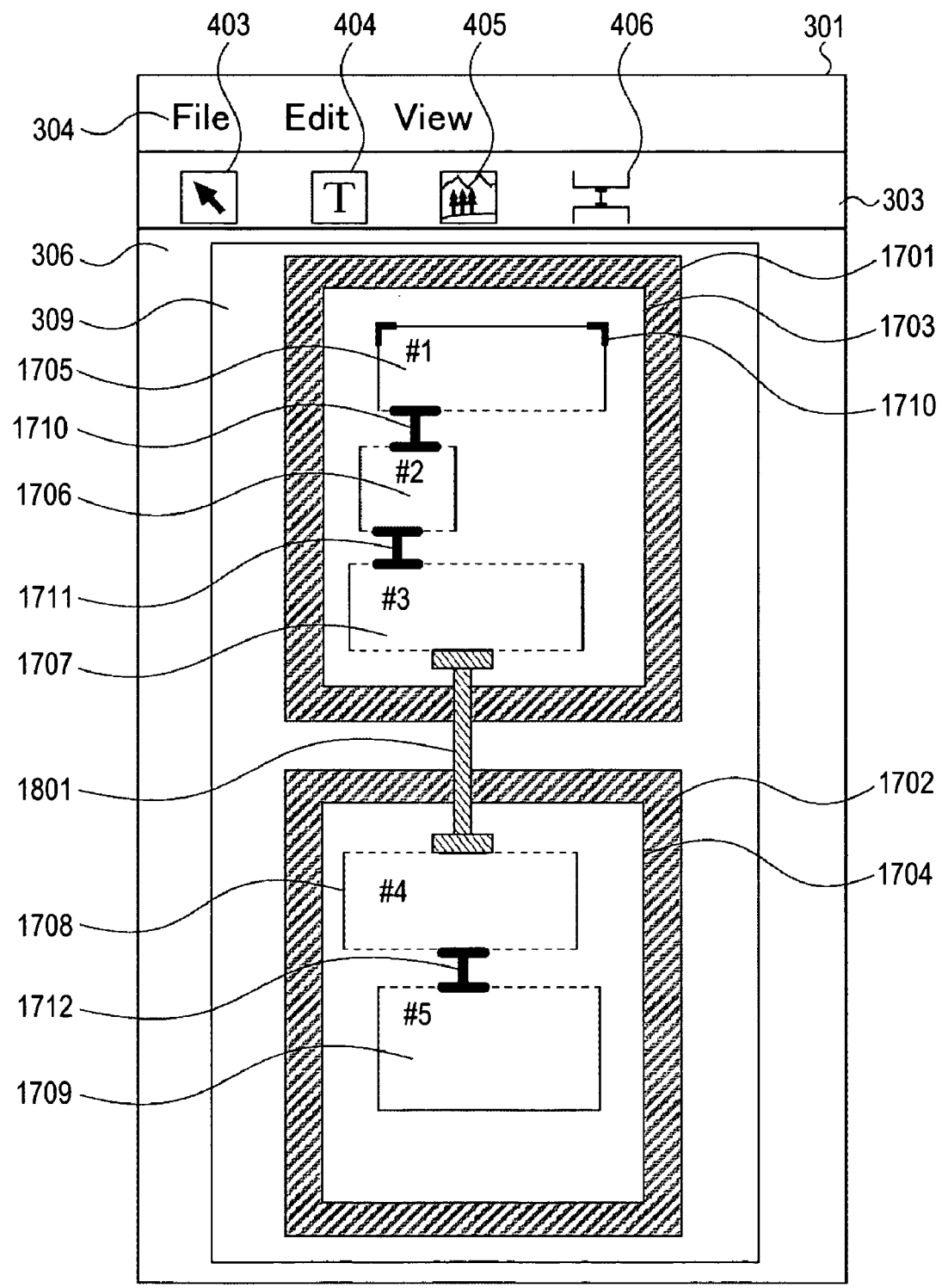
FIG. 18 is a diagram illustrating an example of a layout design including an inter-page link that extends over different pages according to the embodiment.

FIG. 18 illustrates a display unit showing a layout design in which an inter-page link that extends over two pages is set. FIG. 18 differs from FIG. 17 in that an inter-page link 1801 is set between the containers 1707 and 1708, and the anchors 1710 set on the container 1708 are removed. Other settings are the same as those shown in FIG. 17. The inter-page link 1801 has an attribute different from that of a normal link between containers, and is therefore displayed differently so that the inter-page link can be distinguished from normal links.

The inter-page link will be described below. Although the process of layout adjustment shown in FIG. 9 can be affected by a normal link between containers, the layout adjustment cannot be affected by an inter-page link in the current state. However, if containers associated with each other by an inter-page link are arranged on the same page region as a result of a moving process or an inter-page process, which will be described below, the attribute of the inter-page link is changed to a normal link attribute that affects the layout adjustment.

Accordingly, a link attribute that affects the layout adjustment to which the attribute of the inter-page link is changed must be set in advance. Therefore, when a predetermined operation is performed for the inter-page link, the user interface 103 of the layout editing application 121 displays a dialog window shown in FIG. 38 for setting the attribute of the inter-page link.

Figures 37, 38:
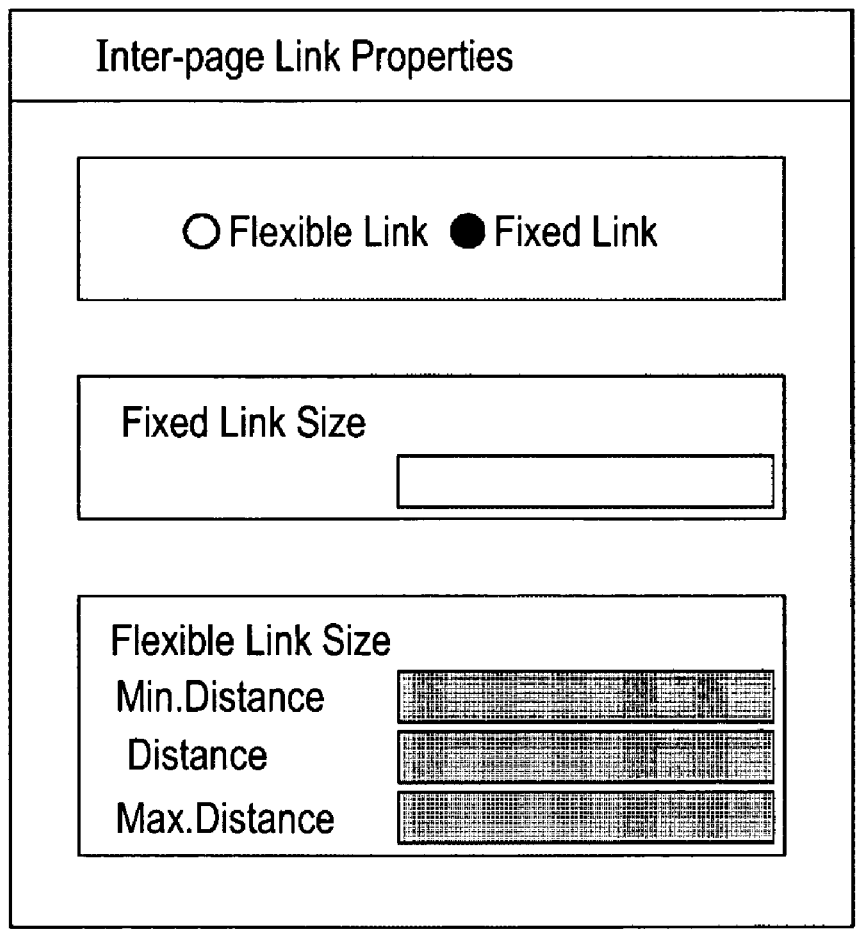
FIG. 37 is a diagram illustrating a result of the process for setting the container attribute.
FIG. 38 is a diagram illustrating a dialog window for setting an inter-page link.

In FIG. 38, it is selected whether the inter-page link is to become a fixed link or a flexible link if the attribute thereof is changed to a normal link attribute that affects the layout adjustment. When the fixed link is selected, a fixed size is set. When the flexible link is selected, a maximum size, a minimum size, and a reference size are set, similar to FIG. 14. When the moving process or the inter-page process, which will be described below, is performed and containers associated with each other by an inter-page link are arranged on the same page region, the inter-page link is changed to a link with the settings shown in FIG. 38 that affects the layout adjustment. Since the fixed link is selected in FIG. 38, the display is set such that the maximum size, the minimum size, and the reference size for the flexible link cannot be input. Although the dialog window shown in FIG. 38 is displayed by a predetermined process in the present embodiment, the dialog window may also be displayed automatically when an inter-page link is set.

Figure 19:
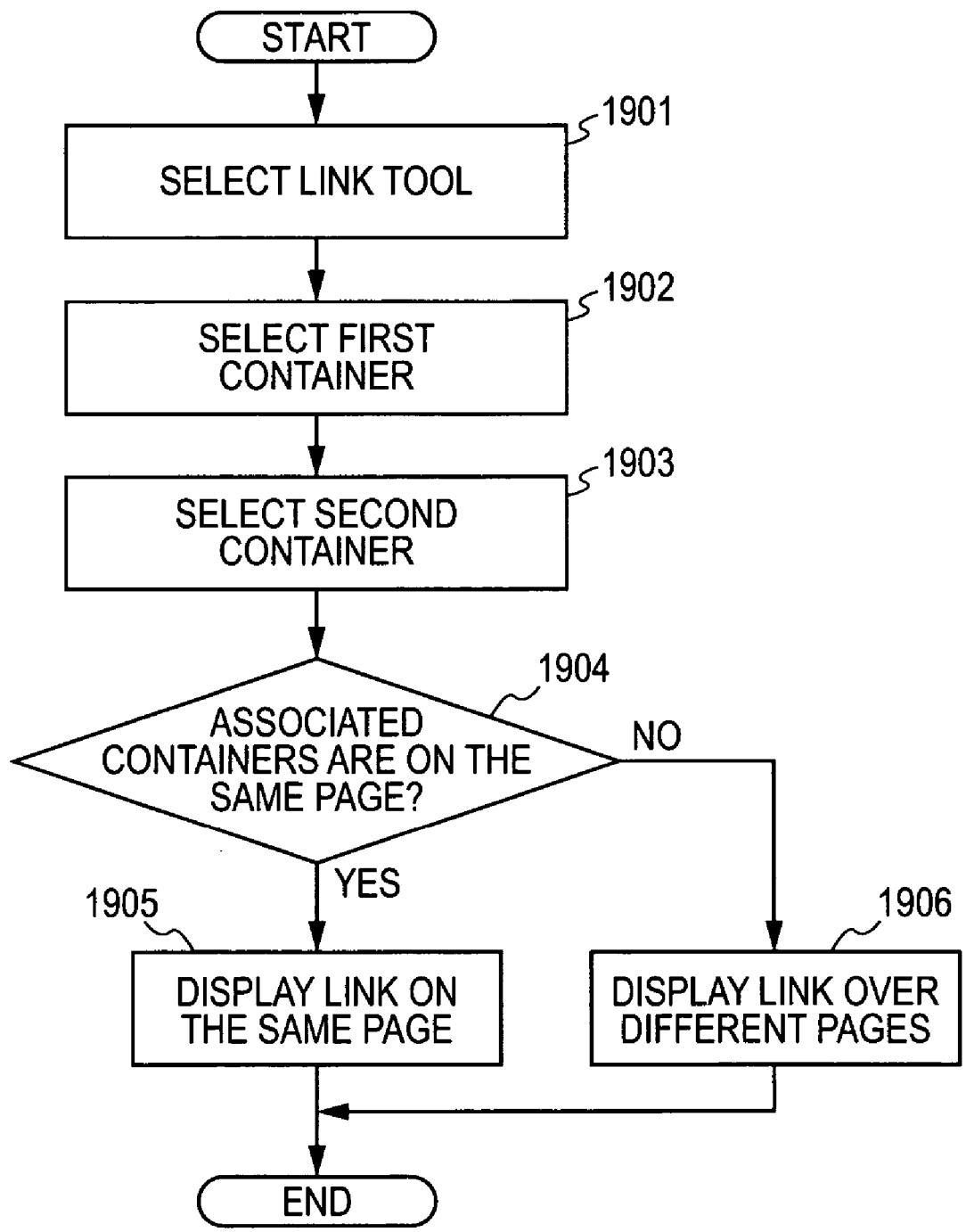
FIG. 19 is a flowchart of a process for setting and displaying a link according to the embodiment.

FIG. 19 is a flowchart of a process for setting an inter-page link. In the process shown in the flowchart, various calculations and information input/output operations are performed under the control of the processor 135 in the host computer.

When the layout editing application 121 recognizes that the link tool button 406 is selected by the mouse or the like, the layout editing application 121 sets the link tool 406 to a selected state (step 1901).

When a container to be associated with another container by a link is selected while the link tool is selected, the layout editing application 121 recognizes the selected container (step 1902). Then, the layout editing application 121 recognizes a container to be associated with the container selected in step 1902 (step 1903). More specifically, the information of the first container selected in step 1902 is temporarily stored in the memory 136. Then, when the second container is selected, the selected container is associated with the stored container stored and a link is displayed on the document template 309. Referring to FIG. 18, it is assumed that the container 1707 on the page 1701 and the 1708 on the page 1702 are selected.

When two containers to be associated with each other by a link are selected (stored in the memory) in steps 1902 and 1903, the layout editing application 121 determines whether or not the container selected in step 1902 (the container 1707 in the present embodiment) and the container selected in step 1903 (the container 1708 in the present embodiment) are on the same page (step 1904). In detail, when each container is selected, the layout engine 105, which is included in the layout editing application 121, calculates the position of each container and stores it in the memory 136 in the format shown in FIG. 25. The layout editing application 121 refers to "predetermined page" in the memory 136 to determine whether or not the containers are on the same page. When the layout editing application 121 refers to the memory 136 and determines that the two containers (the containers 1707 and 1708 in the present embodiment) are on the same page (YES in step 1904), a normal link like the one shown in FIG. 7C is set and is shown on the display (step 1905).

When the layout editing application 121 determines that the containers associated with each other are not on the same page (NO in step 1904), an inter-page link similar to the link 1801 shown in FIG. 18 is set and is shown on the display unit (step 1906).

Figures 31, 32:
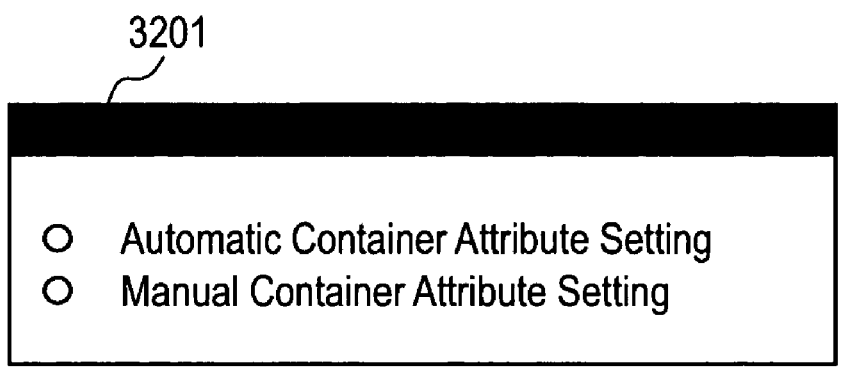
FIG. 31 is a diagram illustrating a link attribute.
FIG. 32 is a diagram illustrating a container attribute setting property according to a third embodiment.

When the link is set in step 1905 or 1906, the link information is stored in the memory 136 in the format shown in FIG. 31.

Figure 20:
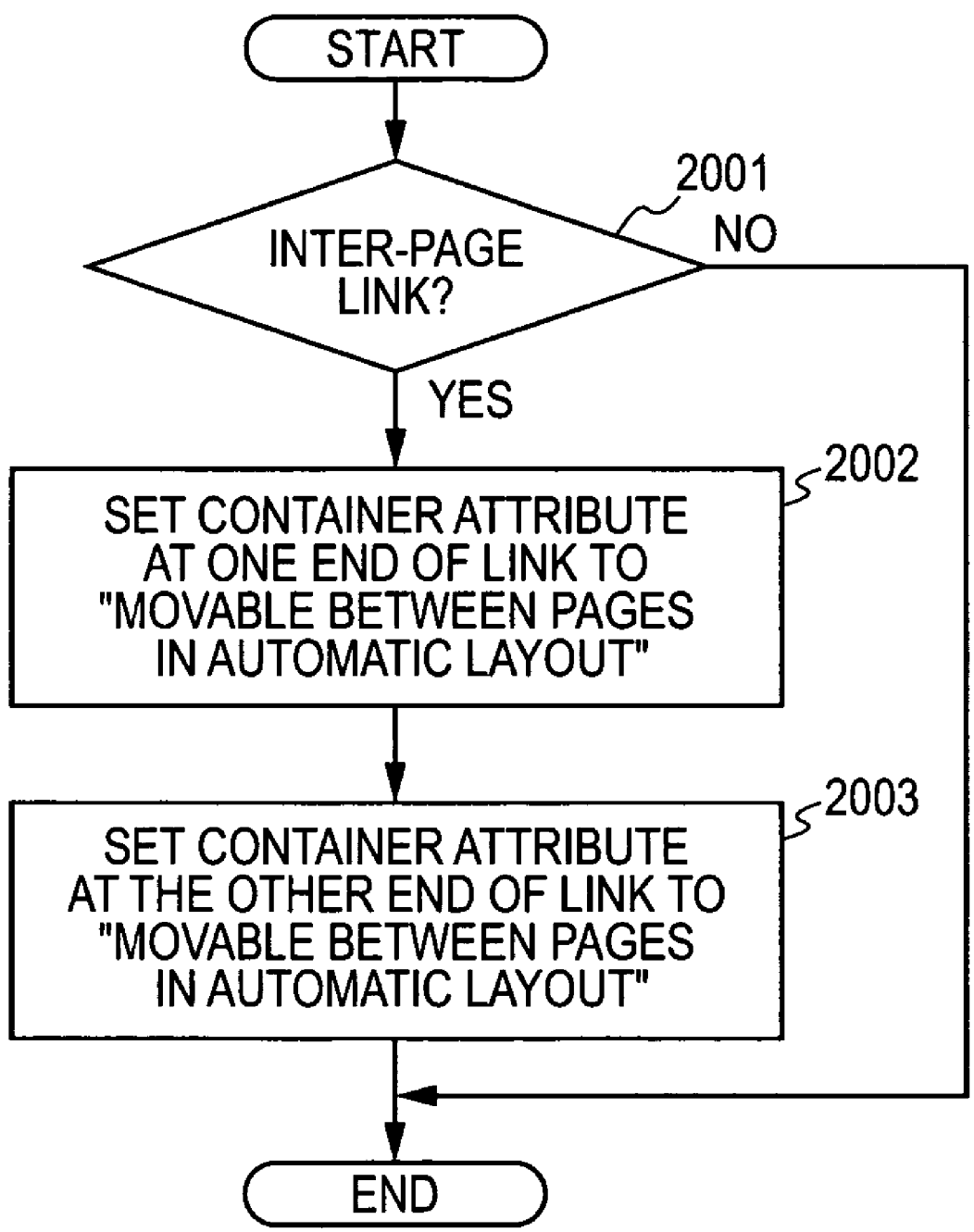
FIG. 20 is a flowchart of a process for setting a container attribute according to the embodiment.

In the present embodiment, when the inter-page link 1801 shown in FIG. 18 is set, a property dialog 3201 such as the one shown in FIG. 32 is displayed. Then, when "automatic container attribute setting" is selected, a process shown in FIG. 20 is performed. The process described below is performed by the processor 135 included in the host computer.

The layout editing application 121 determines whether or not the link set by the link-setting operation performed by the user is an inter-page link (step 2001). More specifically, when the link is set, link information is stored in the memory 136, as shown in FIG. 31. The link information is referred to in order to determine whether the link is a link that is arranged on a single page and that affects the layout adjustment (Inter-page OFF) or a link that extends over different pages (Inter-page ON). If it is determined that an inter-page link is set (Inter-page ON) (YES in step 2001), the layout editing application 121 sets the attribute of the container at one end of the link to "movable between pages in automatic layout" (step 2002). Similarly, the attribute of the container at the other end of the link is also set to "movable between pages in automatic layout" (step 2003). In FIG. 18, the attributes of the containers 1707 and 1708 are set to "movable between pages in automatic layout".

When a container is initially created, the attribute of the container is set to "not movable from the current page in layout" in the memory 136. However, when it is determined in step 2001 that an inter-page link is set, the attribute of the container at one end of the link is automatically changed to "movable between pages", and this setting is stored. The container attribute is stored as one of the container information shown in FIG. 25. In FIG. 25, "Layout Method" indicates whether the container is to be arranged in the predetermined page (immovable) or is allowed to move between pages (movable) in accordance with the content data inserted into the container (data region), and corresponds to the container attribute according to the present application. "Kind of Container" indicates whether the inserted data is text data or image data, and "Fixed/Unfixed" indicates whether the container size is fixed or flexible in accordance with the content data to be inserted therein. When the container size is unfixed, a moveable range of the container size is also stored. "Container Size" represents the current container size, and "Predetermined Page" indicates the page region in which the container is initially set. The "Set No." indicates the container set to which the container belongs. Although either "Movable" or "Immovable" is set for the "Layout Method" in FIG. 25, "Inter-page", which will be described below, can also be stored if it is set as the layout method.

In the present embodiment, when an inter-page link is set, the property dialog 3201 shown in FIG. 32 is displayed. Then, when "automatic container attribute setting" is selected, the attribute is automatically set to "movable between pages in automatic layout", as described above. However, other layout methods (container attributes) may also be set automatically when an inter-page link is set. In addition, when the automatic setting is set, the container attribute to be selected may be determined in advance by the user.

Automatic Layout Method for Inter-Page Link

Figure 21:
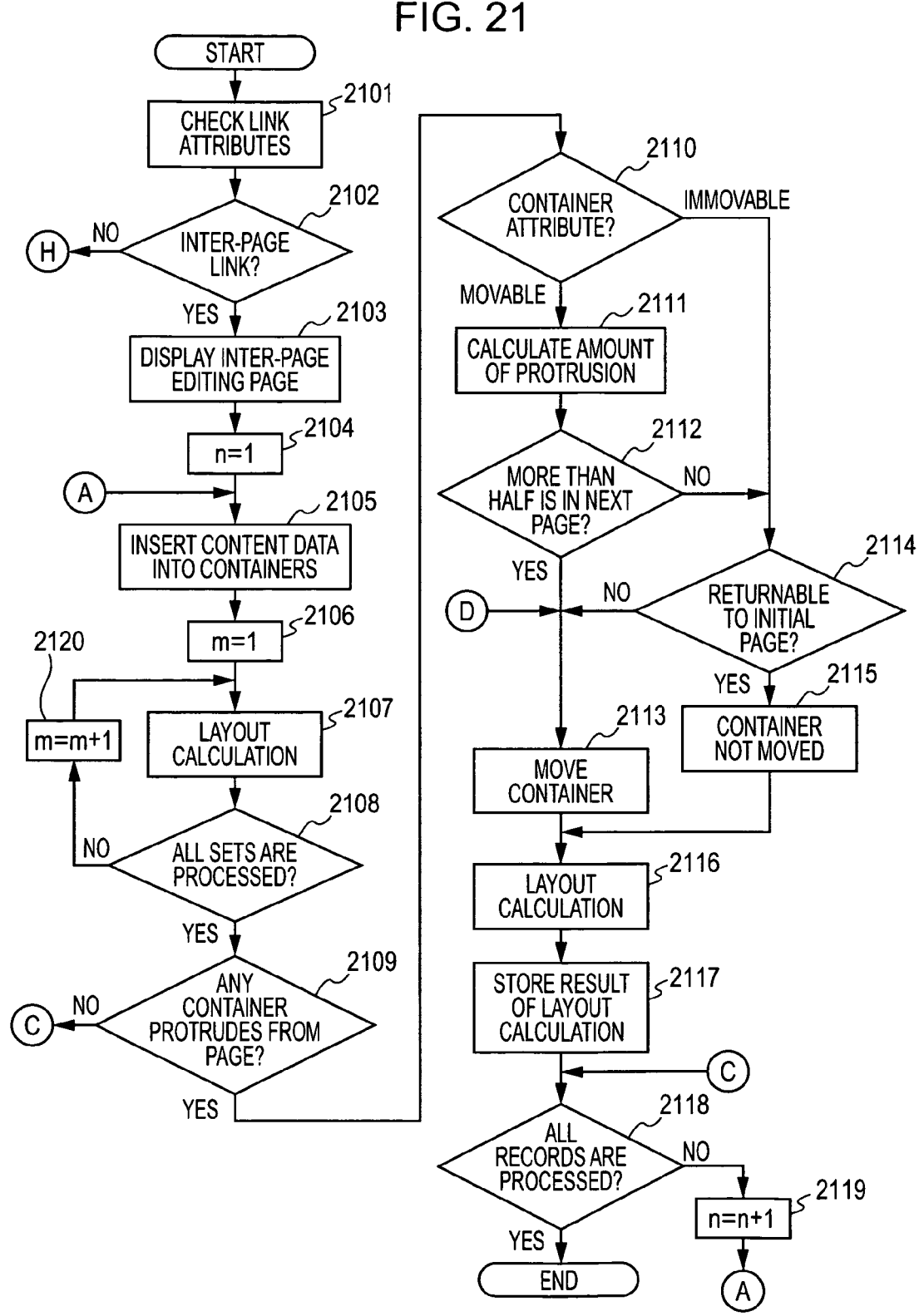
FIG. 21 is a flowchart of an automatic layout operation performed when the inter-page link is set according to the embodiment.

FIG. 21 illustrates an operational flow of a process performed when content data is inserted into a document template including an inter-page link. Each step in the process is performed by the processor 135 in the host computer.

The document template 309 shown in FIG. 18 is associated with the database 119, which is an external data source, and the containers 1705 to 1709 are associated with content data included in each record stored in the database 119.

First, the layout editing application 121 checks the attributes of all of the links arranged on the document template (step 2101). The attribute of each link is stored in the memory 136 of the host computer in the format shown in FIG. 31. Accordingly, the attribute of each link can be obtained by referring to the memory 136. FIG. 31 shows the manner in which the attributes of the links shown in FIG. 18 are stored. Referring to FIG. 31, "Associated Containers" indicates the containers associated with each other by the link. In addition, "Inter-page ON/OFF" indicates whether or not the link extends over different pages, and "Flexible/Fixed" indicates whether the link is a fixed link or a flexible link.

Figure 30:
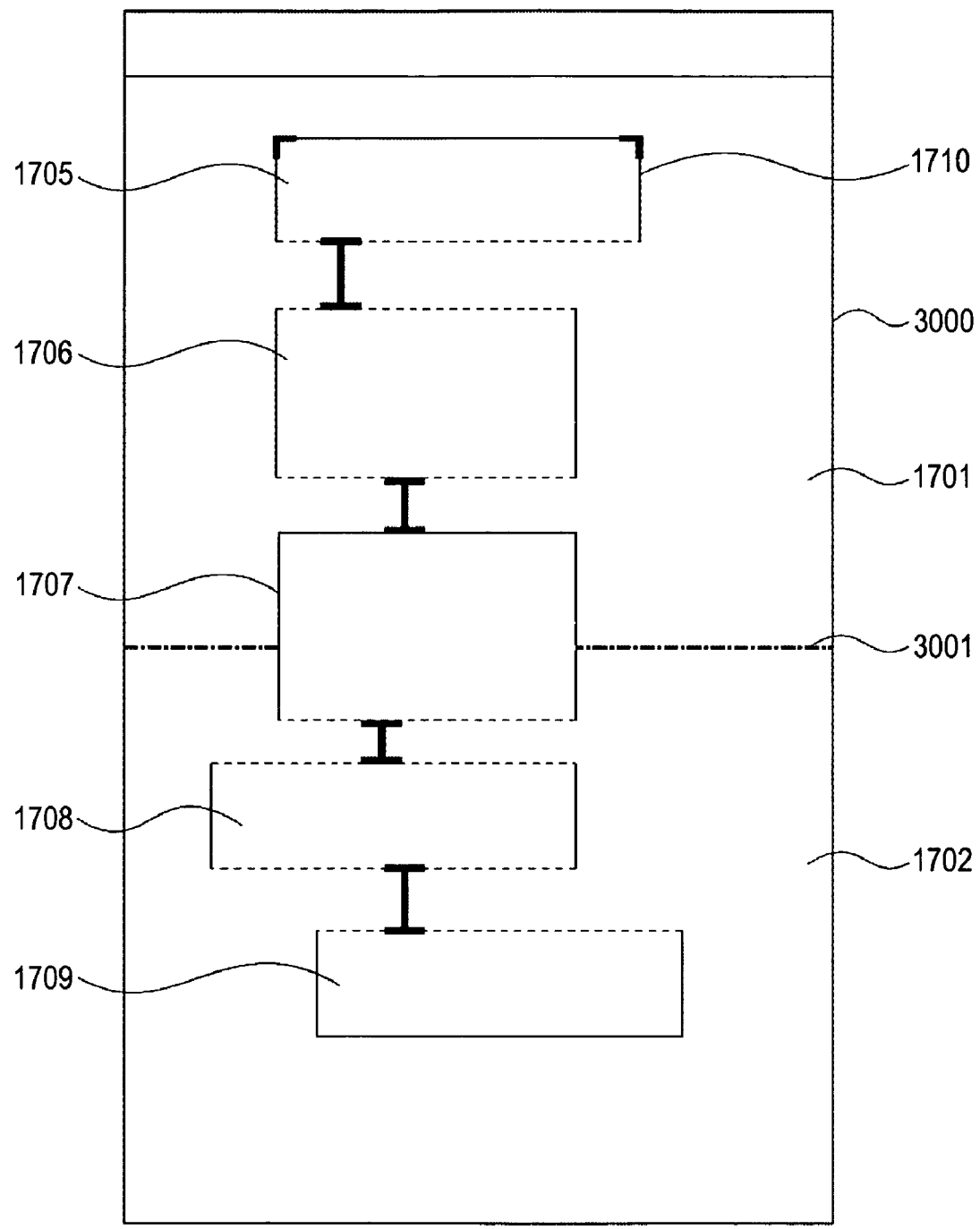
FIG. 30 is a diagram illustrating an inter-page editing page.

After the link attributes are checked in step 2101, the layout editing application 121 determines whether or not there is a link for which "inter-page ON/OFF" is set to ON, that is, whether or not there is an inter-page link (step 2102). If it is determined that there is no link for which "inter-page ON/OFF" is set to ON (NO in step 2102), a normal layout adjustment, that is, the process of the flowchart shown in FIG. 9, is performed. If it is determined that there is a link for which "inter-page ON/OFF" is set to ON (YES in step 2102), an inter-page editing page 3000 shown in FIG. 30 is displayed (step 2103).

The inter-page editing page 3000 shown in FIG. 30 will be described below. FIG. 30 corresponds to a preview mode of FIG. 18. In the display screen shown before it is changed to the inter-page editing page 3000, a gap is provided between the pages in order to show that they are different pages. For example, in FIG. 18, a gap is provided between the pages 1701 and 1702, so that the user can recognize that there are two pages on the document template 309. In comparison, in the inter-page editing page 3000, the display is changed into a format in which multiple pages can be handled in a single editing field, as shown in FIG. 30. In order to clarify the position of each page, a boundary line 3001 is displayed. More specifically, the document template including two pages shown in FIG. 18 is changed to the inter-page editing page 3000 shown in FIG. 30, in which the boundary line 3001 is displayed at the center to show that there are two pages.

Referring to the flowchart shown in FIG. 21 again, in order to insert a first record from the database 119 associated with the document template 309 that is currently being processed, the user interface 103, which is one of the components included in the layout editing application 121, initializes the record number to n=1 (step 2104). Then, the content data included in the corresponding record is inserted into the containers from the database 119 (step 2105).

When the content data is inserted in step 2105, the layout editing application 121 performs the layout calculation shown in FIG. 9 and the layout adjustment as necessary on the basis of the constraints set for each container and the size of the content data. With regard to the constraints of each container, the UI model analyzer 104, which is one of the components included in the layout editing application 121, converts the constraints of each container set by the user into the internal format that can be recognized by the layout engine 105. Therefore, the layout editing application 121 can recognize the constraint information set for each container.

The above-described layout calculation and layout adjustment are performed for one container set, which includes containers associated with each other by links, at a time.

Therefore, the layout editing application 121 initializes the container set number to m=1 (step 2106), and starts the layout calculation process from the first container set (step 2107). Detailed steps of this process are the same as those shown in FIG. 9, and explanations thereof are not repeated here. The layout adjustment of the content data inserted into each container (data region) can be performed by the layout calculation described in the present application.

The layout calculation process and the layout adjustment are performed for one container set at a time in step 2107. Accordingly, whether or not the calculation is performed for all the container sets, that is, whether or not the layout optimization calculation is performed for all the containers arranged in the currently processed document template is determined (step 2108).

If it is determined that all container sets have not been processed (NO in step 2108), m is set to m+1 to select the next container set (step 2120) and processing returns to step 2107 to perform the layout calculation process for the next container set.

If it is determined that the layout calculation is performed for all the container sets (YES in step 2108), it is determined whether or not there is a container that protrudes from the predetermined page region (step 2109). In detail, the layout engine 105, which is one of the components included in the layout editing application 121, calculates and recognizes the position of the boundary line and the position of each container. Accordingly, the positions of the boundary line and each container arranged in the document template are determined. These positions are compared with the container information stored in the memory 136, so that it can be determined whether or not there is a container that protrudes from the predetermined page.

If it is determined that there is a container that protrudes from the predetermined page region (YES in step 2109), the layout editing application 121 checks the attribute of that container (step 2110). The container attribute can be determined by referring to the container information shown in FIG. 25 that is stored in the memory 136. If it is determined that there is no container that protrudes from the predetermined page region (NO in step 2109), the process proceeds to step 2118.

If the attribute of the container determined in step 2110 indicates "movable between pages in layout", the layout editing application 121 calculates the amount of protrusion of the container from the boundary line (step 2111). An example of this calculation will be described below. Coordinate values, for example, may be used in the calculation. Referring to FIG. 30, a case is considered in which the container 1707 is placed on the boundary line 3001 as a result of layout adjustment. Here, the layout engine calculates the coordinate values of the container 1707 and the boundary line 3001. For example, the coordinates of the bottom-left corner, the bottom-right corner, the top left-corner, and the top-right corner of the container 1707 are (x=20, y=30), (x=70, y=30), (x=20, y=80), and (x=70, y=80), respectively and the coordinates of the left and right ends of the boundary line 3001 are (x=0, y=50) and (x=100, y=50), respectively. In addition, the predetermined page of the container 1707 can be determined as the page 1701 from the information shown in FIG. 25 that is stored in the memory 136, and it is recognized that the container 1707 protrudes from the predetermined page region. In the coordinate values (x, y), x indicates the position in the horizontal direction and y indicates the position in the vertical direction. In addition, the container area after the layout adjustment can be calculated as 2,500 from the coordinate values. Next, the amount of protrusion from the boundary line, that is, the amount of protrusion into the next page (page region 1702 in the present embodiment) is calculated. Since the container 1707 protrudes in the vertical direction in FIG. 30, the area below the boundary line 3001 is determined. The protruding area is calculated as 1,500 from the above-described coordinate values. Accordingly, it is determined that more than half the area of the container 1701 protrudes into the next page (page region 1702 in FIG. 18).

From the result of calculation performed in step 2111, the layout editing application 121 determines whether or not the amount of protrusion of the container into the next page is more than half (step 2112). If it is determined that the amount of protrusion into the next page is more than half (YES in step 2112), the container is moved to the next page (step 2113). In more detail, the layout engine 105 calculates the position to which the container can be moved without losing the positional relationship with other containers and places the container in the next page on the basis of the attribute set for the corresponding inter-page link as shown in FIG. 38. If it is determined that the boundary line precisely splits the container into two halves, the user may be prompted to select whether to leave the container in the current page or to move the container to the next page.

If it is determined that the amount of protrusion is less than half (NO in step 2112), the layout editing application 121 determines whether or not the container can be returned to the predetermined page (step 2114). More specifically, the container information of the containers arranged in the predetermined page is checked. Each container includes information of either a text container or an image container. Each text container has a current font size and a variable range of the font size, as shown in FIG. 25. When the current font size is compared with the variable range thereof and it is determined that the font size can be further reduced, the font size is reduced. Then, whether or not a space enough to fit the protruding container can be obtained is calculated by the layout engine 105. In addition, each unfixed container has constraints (variable range) for the container size, as shown in FIG. 25. Accordingly, the container size can also be reduced under the constraints. In addition, both the font size and the container size can be changed. In this case, whether to change only the font size, only the container size, or both the font size and the container size may be set by the user.

When the layout editing application 121 determines that the protruding container can be returned to the predetermined page (YES in step 2114), the container protruding from the boundary line remains in the predetermined page instead of being moved to the next page (step 2115). If it is determined that the container cannot be returned to the predetermined page (NO in step 2114), the container is moved to the next page in step 2113. Accordingly, the page regions in which the containers are to be arranged are determined for all the containers. Therefore, the layout editing application 121 executes the layout calculation and the layout adjustment again to optimize the layout in each region (step 2116). The process performed in step 2116 is similar to that of the flowchart of FIG. 9. At this time, if the containers associated with each other by the inter-page link are arranged in the same page region as a result of the above-described moving process, the attribute of the inter-page link is changed to the link attribute set in FIG. 38 and the following layout adjustment is performed on the basis of the link attribute set in FIG. 38. When the attribute of the inter-page link is changed to that of a normal link that affects the layout adjustment, the display of the link is also changed. An example will be given later.

Then, the layout editing application 121 stores the layout positions of the containers determined by the layout adjustment performed in step 2116 in the memory 136 of the host computer (step 2117).

Then, the layout editing application 121 determines whether or not all of the records have been processed (step 2118). If it is determined that not all of the records have been processed (inserted) (NO in step 2118), the layout editing application 121 increments the current record number (step 2119) and returns to step 2105. If it is determined that all of the records have been processed (inserted) (YES in step 2118), the process shown in FIG. 21 is ended.

To facilitate understanding of the process of the flowchart shown in FIG. 21, an example will be described with reference to FIGS. 18 and 30. With respect to the inter-page link, it is assumed that the fixed link is selected in the setting dialog shown in FIG. 38 and the fixed link size is set to "3".

In FIG. 18, the inter-page link 1801 is set between the containers 1707 and 1708. When "automatic container attribute setting" is set in the property dialog 3201 shown in FIG. 32, "movable between pages in layout" is automatically set for the attributes of the containers 1707 and 1708. Since the link 1801 for which "inter-page ON/OFF" is set to ON in the link attribute is arranged on the document template 309 in FIG. 18, the inter-page editing page 3000 shown in FIG. 30 is displayed. The above-described steps correspond to steps 2101 to 2103 in FIG. 21.

Next, the content data included in the record that is being processed is inserted into the containers from the database, and the layout adjustment based on the layout calculation shown in FIG. 9 is performed. As a result, the container 1707, for example, is placed on the boundary line 3001. In this case, it is recognized that the container 1707 protrudes from the predetermined page 1701 from the container information (see FIG. 25) and the positional relationship between the container 1707 and the boundary line. Therefore, the container attribute of the container 1707 (whether or not the container can be moved to the next page region 1702) is checked and the amount of protrusion into the next page 1702 is calculated.

If more than half of the container 1707 protrudes into the next page, the step of moving the container 1707 to the next page is performed. If more than half of the container 1707 remains in the predetermined page 1701, it is determined whether or not the container 1707 can be placed in the current page 1701. The current information of the containers 1705 and 1706 placed on the page 1701 are stored in the memory 136 in the format shown in FIG. 25. Although the font size in the container 1705 cannot be reduced any further, the font size in the container 1706 is currently "10" and can be reduced to "8". Therefore, the font size in the container 1706 is reduced stepwise. If it is determined that the entire region of the container 1707 can be placed in the page 1701 as a result of reduction of the font size, the container 1707 is not moved to the page 1702. If the container 1707 cannot be placed in the page 1701 even if the font size is reduced, the container 1707 is moved to the page 1702, which is the next page. If the containers arranged in the page region 1701 can be changed, they may be reduced within the variable range. Alternatively, both the font size and the container size may be changed. The above-described steps correspond to steps 2104 to 2115.

Thus, the page regions in which the containers are to be arranged are determined for all the containers. Therefore, the layout adjustment based on the layout calculation shown in FIG. 9 is performed again. At this time, if the container 1707 is moved into the page region 1702, the containers 1707 and 1708 associated with each other by the inter-page link 1801 are arranged on the same page region 1702. Therefore, the inter-page link 1801 is changed to a normal link that affects the layout calculation and the layout adjustment (fixed link, fixed link size "3") in accordance with the settings shown in FIG. 38. Accordingly, the layout calculation and the layout adjustment are performed on the basis of the normal link.

Figure 22:
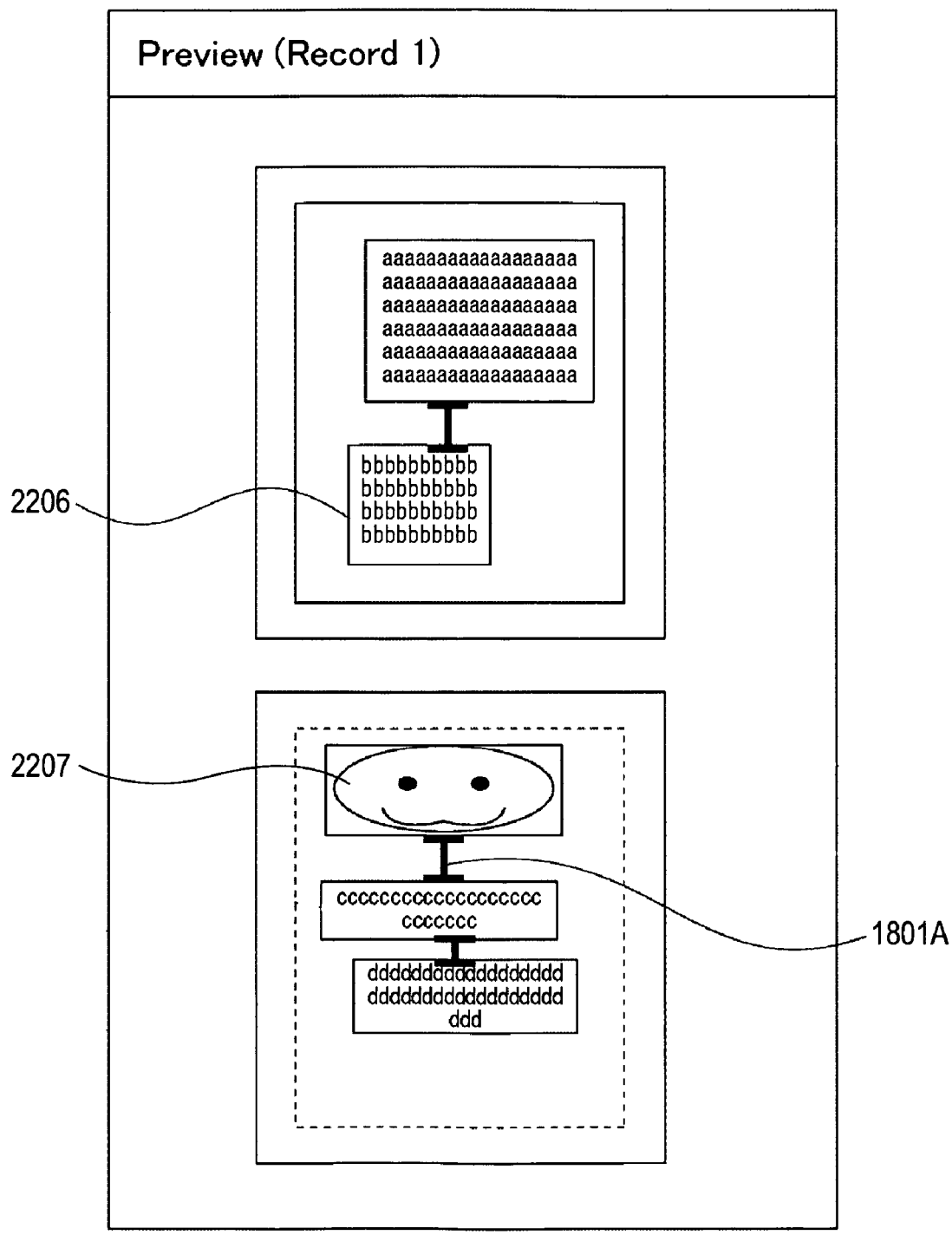
FIG. 22 is a diagram illustrating a result of layout in which a container is moved to another page according to the embodiment.

FIG. 22 shows the result of layout adjustment based on the layout calculation when the container 1707 is moved from the page 1701 to the page 1702. The inter-page link 1801 shown in FIG. 18 has been set between containers 2206 and 2207. However, since the containers 2206 and 2207 are arranged on the same page as a result of the above-described moving process, the inter-page link 1801 is changed to a fixed link (link size "3") set in FIG. 38. As a result, a fixed link with the link size "3" is set between the containers 2206 and 2207. Although the inter-page link is shown differently from normal links that affect the layout calculation and layout adjustment in FIG. 18, the display of the link is changed as shown by 1801A in FIG. 22 since the link attribute is changed to that of a link that affects the layout adjustment.

The layout adjustment is finished by the above-described steps, and the result is stored in the memory 136 of the host computer. Then, the above-described steps are repeated until all the records are inserted. In addition, the result of layout is displayed on the document template shown in FIG. 18.

Although not shown in the operation flow in FIG. 21, if any of the layout optimization rules is violated, the calculation is performed again to avoid violation of the rules, as described above with reference to step 0904.

According to the present embodiment, the attributes of the containers associated with each other by links that extend over different pages are set automatically. Therefore, the process performed when a plurality of inter-page links are set can be simplified. In addition, if content data is inserted into a container having the automatically set attribute and more than half of the container protrudes into the next page as a result, that container is automatically moved to the next page. In addition, if less than half of the container protrudes into the next page, it is determined whether or not the container can be arranged in the predetermined page and the result of determination is used to determine whether or not to move the container to the next page. Therefore, a balanced layout can be obtained over a plurality of pages. In the present embodiment, one-half of the container is used as a threshold for determining whether or not to move the container to the next page. However, the present invention is not limited to this, and a value (or a percentage) set by the user may also be used as the threshold.

Second Embodiment

In the first embodiment, "automatic container attribute setting" is selected in the property dialog 3201 shown in FIG. 32. In the present embodiment, the case in which the attributes of containers associated with each other by an inter-page link are manually set will be described. Processes of the present embodiment are basically similar to those of the above-described first embodiment. Therefore, only differences from the first embodiment will be described below.

Figure 23:
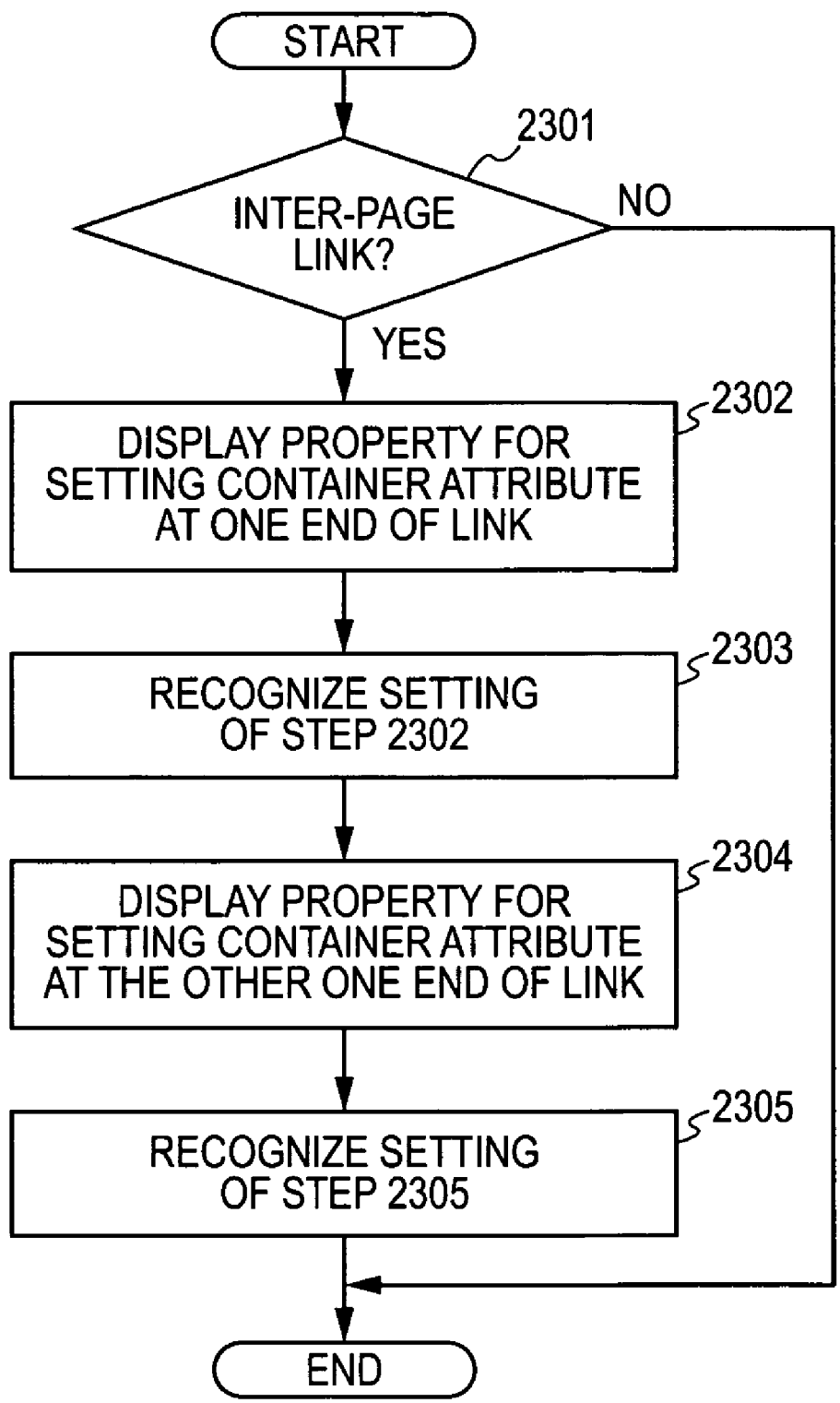
FIG. 23 is a flowchart of another process for setting the container attribute according to the embodiment.
Figure 26:
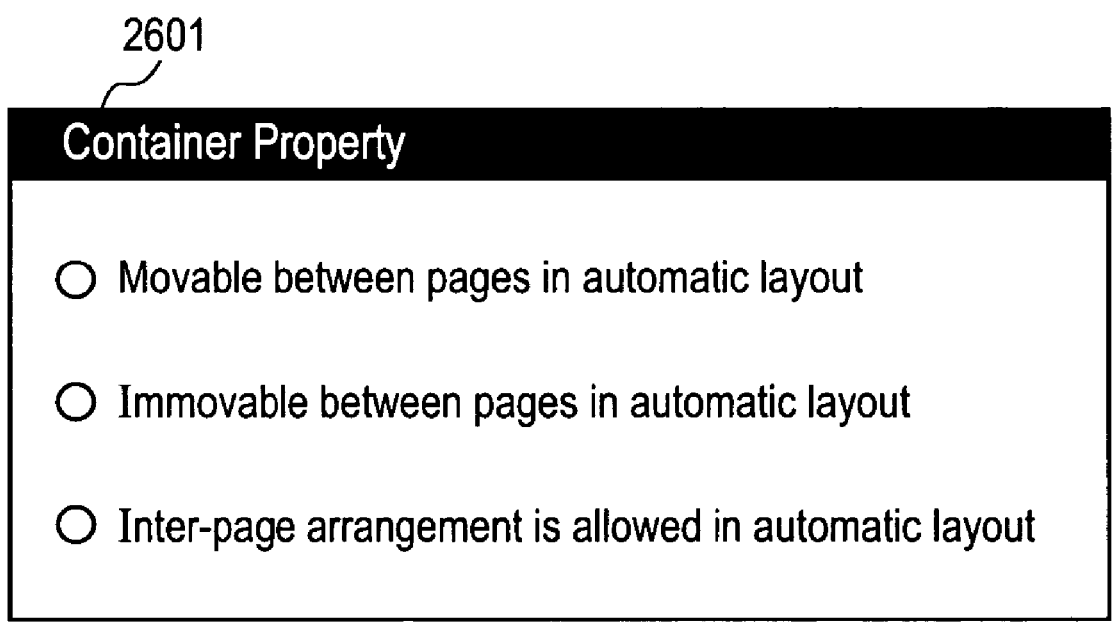
FIG. 26 is a diagram illustrating a property setting dialog for setting the container attribute.

In the present embodiment, when an inter-page link 1801 shown in FIG. 18 is set, the property dialog 3201 shown in FIG. 32 is shown on a display unit. When "manual container attribute setting" is selected by a mouse or the like, a property dialog 2601 such as the shown in FIG. 26 is presented on the display unit, so that the user can set the attributes of the containers. FIG. 23 illustrates a flowchart of this process. Each step of this process is performed by the processor 135 in the host computer.

The layout editing application 121 determines whether or not the link set by the link-setting operation performed by the user is an inter-page link (step 2301). If it is determined that an inter-page link is set (YES in step 2301), the layout editing application 121 displays the property dialog 3201 shown in FIG. 32 for setting the attribute of the container at one end of the link. Then, if "manual container attribute setting" is selected in the property dialog 3201, the property dialog 2601 shown in FIG. 26 is displayed (step 2302).

The layout editing application 121 recognizes the container attribute selected by the user in the property dialog 2601 of FIG. 26 displayed in step 2302 and stores the selected container attribute in the memory 136 of the host computer (step 2303). In more detail, the user designates a container attribute in the property dialog 2601 of FIG. 26 using a pointing device, such as a mouse. Then, the selected container attribute is recognized by the processor 135 via the I/O interface 143 and the recognized information is stored in the memory 136. The selection using the mouse or the like is performed by a process similar to the above-described process.

Next, the layout editing application 121 displays the property dialog 2601 of FIG. 26 for setting the attribute of the container at the other end of the link (step 2304). The container attribute selected by the user in the property displayed in step 2304 is recognized, and a step similar to step 2303 is performed (step 2305). Accordingly, the container attributes can be set as desired by the user. Also in the present embodiment, a fixed link is selected in the setting dialog shown in FIG. 38 for the inter-page link.

Figure 24A:
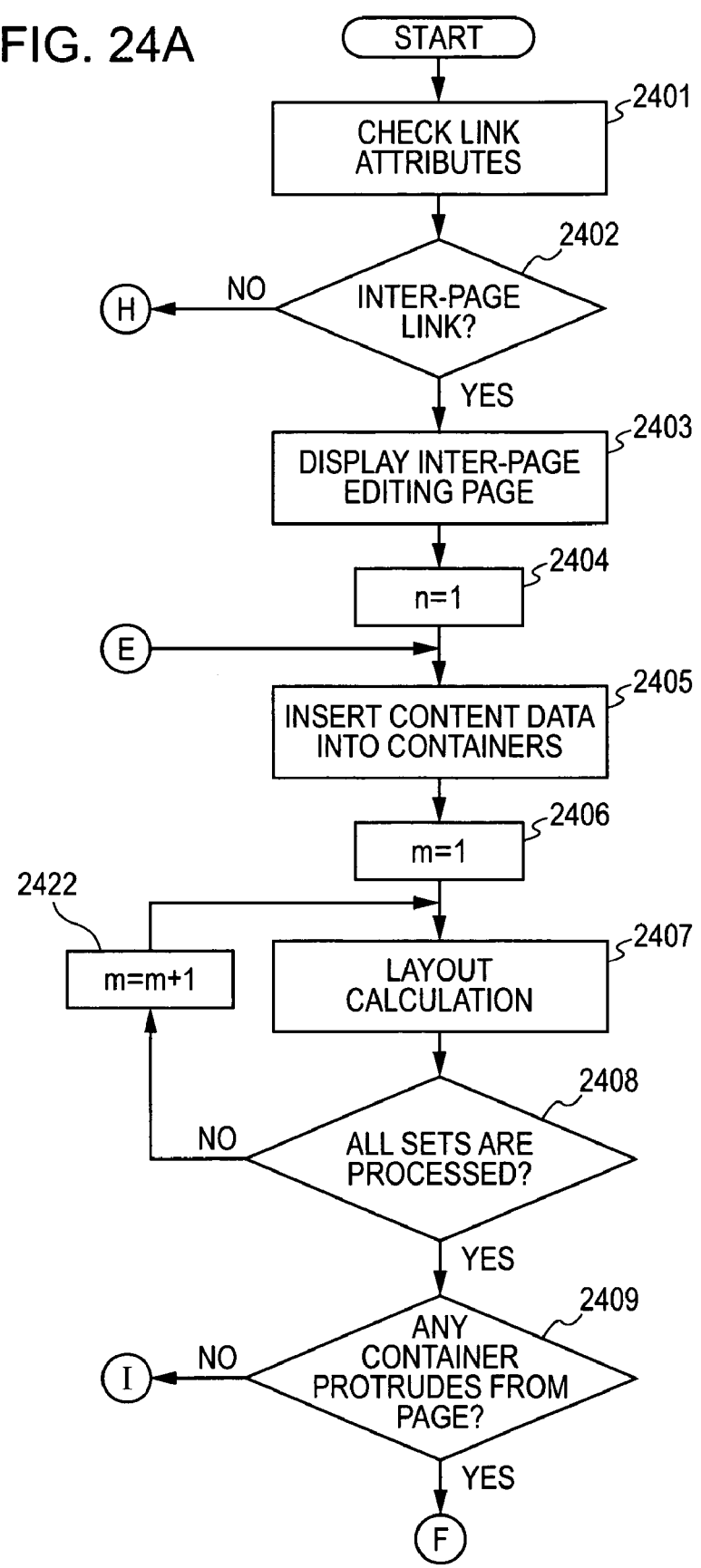
FIGS. 24A and 24B illustrate a flowchart of an automatic layout operation according to a second embodiment of the present invention.
Figure 24B:
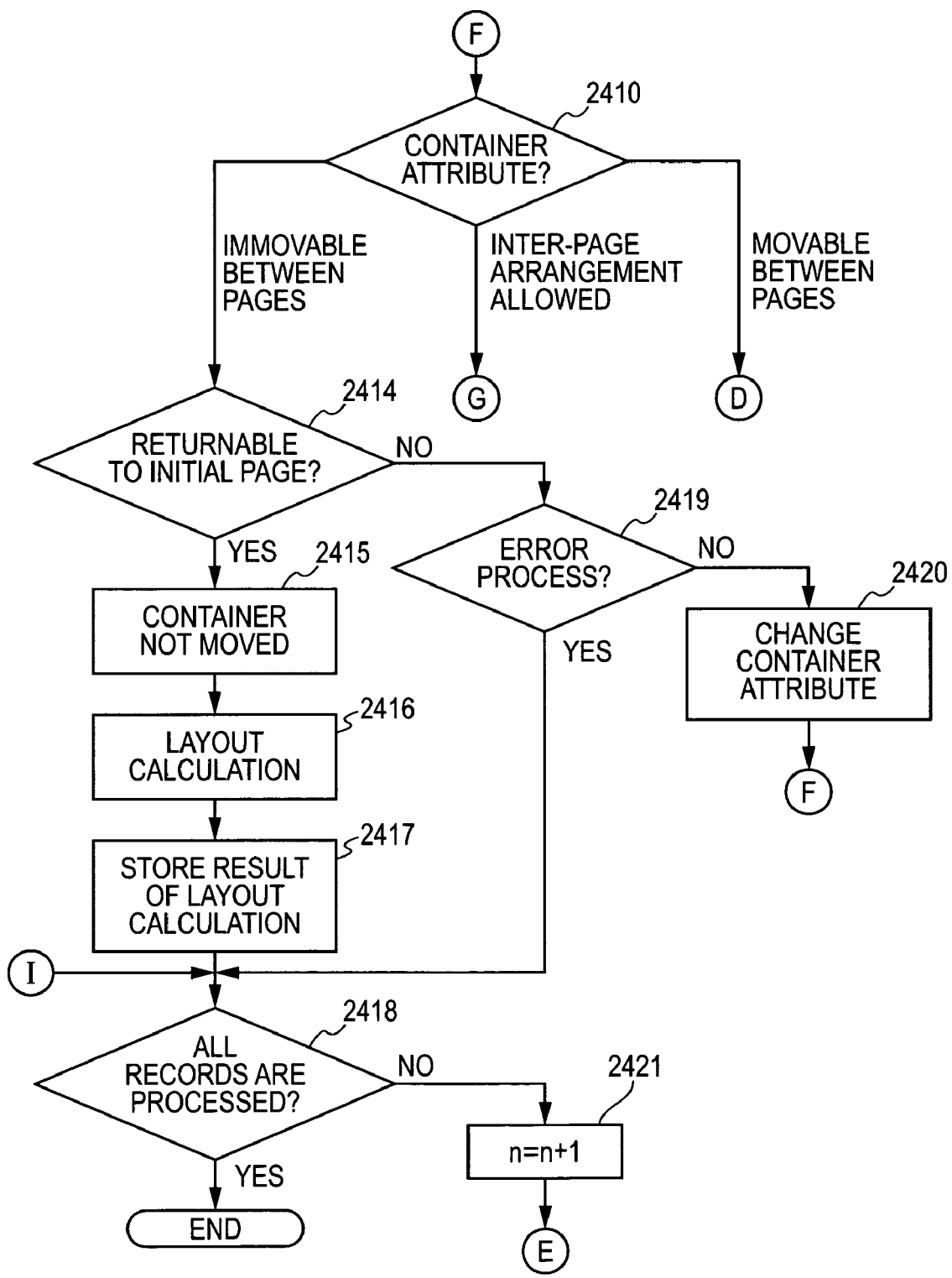

The flow of the layout process according to the present embodiment is shown in FIGS. 24A and 24B. Each step in this process is performed by the processor 135 in the host computer. Steps 2401 to 2409 and 2422 (FIG. 24A) are similar to steps 2101 to 2109 and 2120 (FIG. 21), and therefore only step 2410 and the following steps (FIG. 24B) will be described here.

The layout editing application 121 checks the attribute of the container protruding from the predetermined page region in the inter-page editing page 3000 (step 2410). In more detail, the layout engine recognizes the position of each container and the position of the boundary line 3001 in the inter-page editing page 3000. For example, the coordinates of the boundary line 3001, the coordinates of each container, and "predetermined page" in the container information shown in FIG. 25 that is stored in the memory 136 are recognized to determine whether or not there is a container that protrudes from the predetermined page region into another page region across the boundary line. If it is determined that there is a container that protrudes from the predetermined page, the layout editing application 121 recognizes the layout method (container attribute) in the container information stored in the memory 136 to perform step 2410.

If it is determined in step 2410 that the attribute of the container is "movable between pages in automatic layout", the container can be moved to the page region in which the container at the other end of the inter-page link is placed. The steps performed in this case are similar to step 2113 and the following steps in FIG. 21, and detailed explanations thereof are not repeated here.

Figure 28:
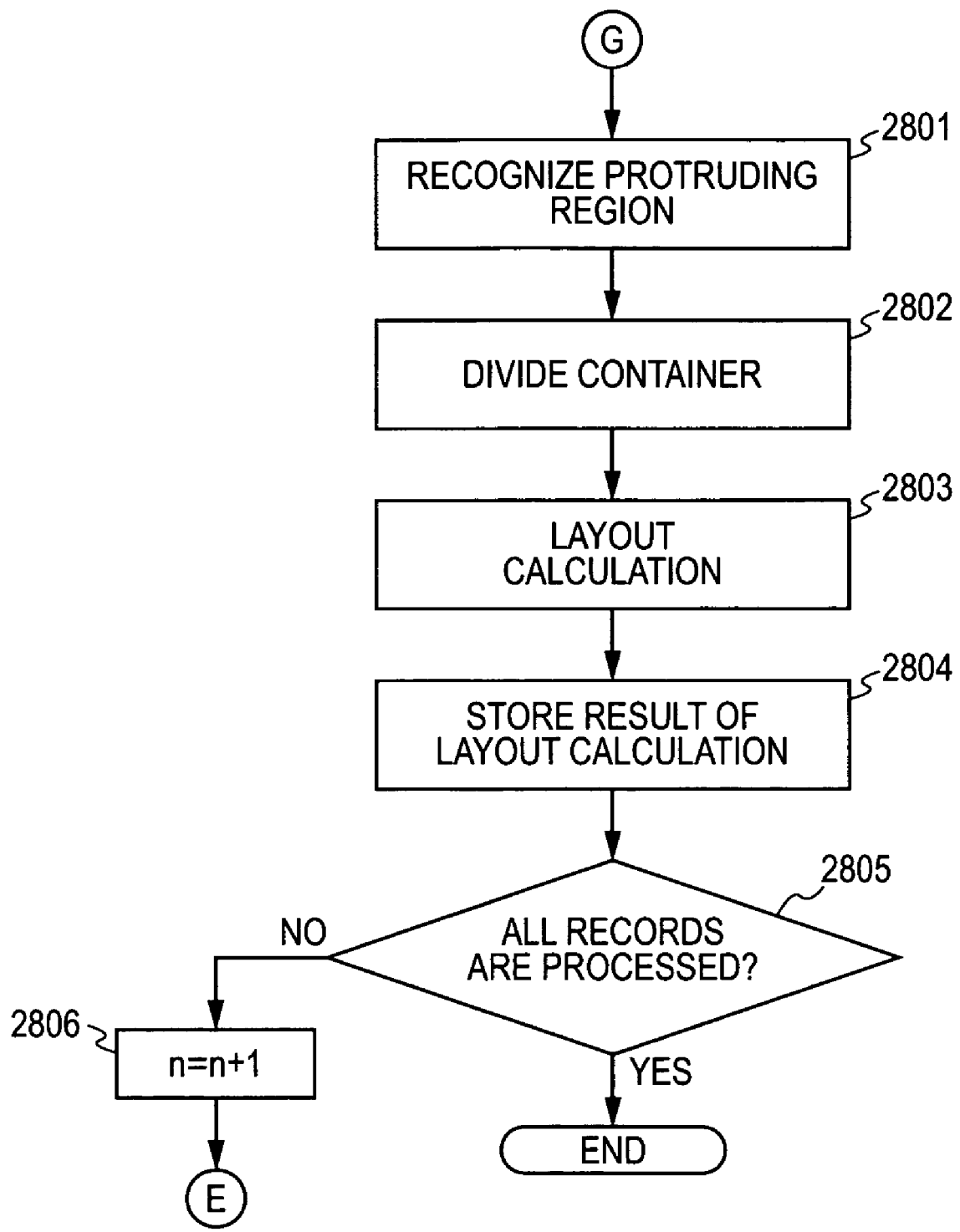
FIG. 28 is a flowchart of an automatic inter-page arrangement process.

If it is determined in step 2410 that the container attribute is "inter-page arrangement is allowed in automatic layout", a process shown in FIG. 28 is performed. The process shown in FIG. 28 will be described in detail below.

If it is determined in step 2410 that the container attribute is "immovable between pages in automatic layout", the container remains in the predetermined page. However, since the container is currently placed on the boundary line or is moved completely into a different page beyond the boundary line, it must be determined whether or not the container can return to the predetermined page (step 2414). The determination performed in step 2414 is similar to that performed in step 2114 of FIG. 21, and detailed explanations thereof are not repeated here. If it is determine that the container can return to the predetermined page (YES in step 2414), the movement of the container is canceled and the container remains in the predetermined page (step 2415). Since the page regions in which the containers are to be arranged are determined for all the containers in step 2415, the layout editing application 121 executes the layout calculation and the layout adjustment shown in FIG. 9 again (step 2416).

If it is determined that the protruding container cannot return to the predetermined page (NO in step 2414), the layout editing application 121 displays a UI for prompting the user to select whether or not to perform an error process (step 2419). If the layout editing application 121 recognizes that the error process is to be performed for the current record (YES in step 2419), the process proceeds to step 2418. If the layout editing application 121 recognizes that the error process is not to be performed (NO in step 2419), the property of FIG. 26 is displayed again to change the attribute of the protruding container (step 2420). Then, the selected container attribute is recognized and the process returns to step 2410.

Steps 2416 to 2418 and 2421 are similar to steps 2116 to 2119 in FIG. 21, and explanations thereof are not repeated here.

To facilitate understanding of the process of the flowchart shown in FIGS. 24A and 24B, an example will be described with reference to FIGS. 18 and 30. With respect to the inter-page link, it is assumed that the fixed link is selected in the setting dialog shown in FIG. 38 and the fixed link size is set to "3".

In FIG. 18, the inter-page link 1801 is set between the containers 1707 and 1708. Accordingly, the property dialog 3201 of FIG. 32 is displayed to set the container attribute. When "manual container attribute setting" is selected, the property dialog 2601 of FIG. 26 is displayed. Here, a case is considered in which the attribute of the container 1707 is set to "immovable between pages in automatic layout" and the attribute of the container 1708 is set to "movable between pages in automatic layout". Since the link 1801 for which the "inter-page ON/OFF" is set to ON in the link attribute is arranged on the document template in FIG. 18, the inter-page editing page 3000 is displayed. The above-described steps correspond to steps 2401 to 2403 in FIGS. 24A and 24B.

Next, the content data included in the record that is being processed is inserted into the containers from the database, and the layout calculation and the layout adjustment are performed. As a result, the container 1707 is placed on the boundary line 3001, as shown in FIG. 30, and it is determined that the container 1707 protrudes from the predetermined page. Then, when it is determined that the container attribute is "immovable between pages in automatic layout", it is determined whether or not the container 1707 can return to the predetermined page.

The current information of the containers 1705 and 1706 arranged in the page 1701 are stored in the memory 136 in the format shown in FIG. 25. The font size in the container 1705 cannot be reduced. However, the font size in the container 1706 can be reduced to "8", and therefore the font size is reduced stepwise from the current font size "10". For example, if the layout editing application 121 determines that the container 1707 can be arranged in the page 1701 by reducing the font size to "9", it is determined that the container 1707 can return to the page 1701, which is the predetermined page. If the layout editing application 121 determines that the container 1707 cannot be arranged in the page 1701 even if the font size is reduced to "8", an unfixed container is searched for from the page 1701. Referring to FIG. 25, it is determined that the containers 1705 and 1706 arranged in the page 1701 are unfixed. Accordingly, the containers are reduced within the variable range if possible. Although the container 1705 cannot be reduced any further, the current size of the container 1706 is "vertical: 5, horizontal: 5" according to FIG. 25, and the variable range of the size of the container 1706 is "vertical: 3 to 8, horizontal: 5 to 8". Therefore, the size of the container 1706 can be reduced. Accordingly, the size of the container 1706 is reduced stepwise. For example, if the layout editing application 121 determines that the container 1707 can be arranged in the page 1701 by reducing the size of the container 1706 to "vertical: 4, horizontal: 6", the container 1707 is arranged in the page 1701, which is the predetermined page. In the present embodiment, the font size is changed first, and then the container size is changed. However, the present invention is not limited to this, and the container size may be reduced first.

Thus, the page regions in which the containers are to be arranged are determined for all the containers, and accordingly the layout calculation and the layout adjustment according to FIG. 9 are performed again so that the containers 1705, 1706, and 1707 have the optimum sizes and are fitted in the page 1701. Similarly, the layout of the page 1702 is also changed since the container 1705 has returned to the page 1701, and accordingly the layout calculation and the layout adjustment are performed again. The result of this is shown in FIG. 27. Although the setting of the inter-page link 1801 is given in FIG. 38, the inter-page link 1801 is deleted since the containers 1707 and 1708 associated with each other by the inter-page link 1801 are arranged on different pages.

If it is determined that the container 1707 cannot be arranged in the predetermined page even when the font size and the container size are reduced, it is selected whether the layout process for the next record is to be performed as the error process or the layout process for the current record is to be performed again after changing the attribute of the container 1707.

The layout adjustment is finished by the above-described steps, and the result is stored in the memory 136 of the host computer. Then, the above-described steps are repeated until all the records are inserted.

Next, the flow of the process performed when the attribute of the container on the boundary line is "inter-page arrangement is allowed in automatic layout" will be described with reference to FIG. 28.

If the layout editing application 121 refers to the memory 136 and determines in step 2410 that the attribute of the container on the boundary line 3001 is "inter-page arrangement is allowed in automatic layout", the container is divided along the boundary line 3001. More specifically, first, the protruding region in the next page is recognized (step 2801). Then, the layout editing application 121 divides the container on the basis of the protruding region recognized in step 2801 (step 2802), and performs the layout calculation and the layout adjustment again for the pages in which the divided portions of the container are arranged (step 2803). One of the divided portions of the container is arranged in the same page as the container with which the divided container is associated by the inter-page link. Therefore, the attribute of the inter-page link is changed to the attribute set in FIG. 38, and the layout adjustment is performed on the basis of the attribute set in FIG. 38.

The following steps 2804 to 2806 are similar to steps 2117 to 2119 in FIG. 21, and explanations thereof are not repeated here. The recognition of the protruding region (step 2801) and the step of dividing the container (step 2802) will be described in detail later.

Figure 29:
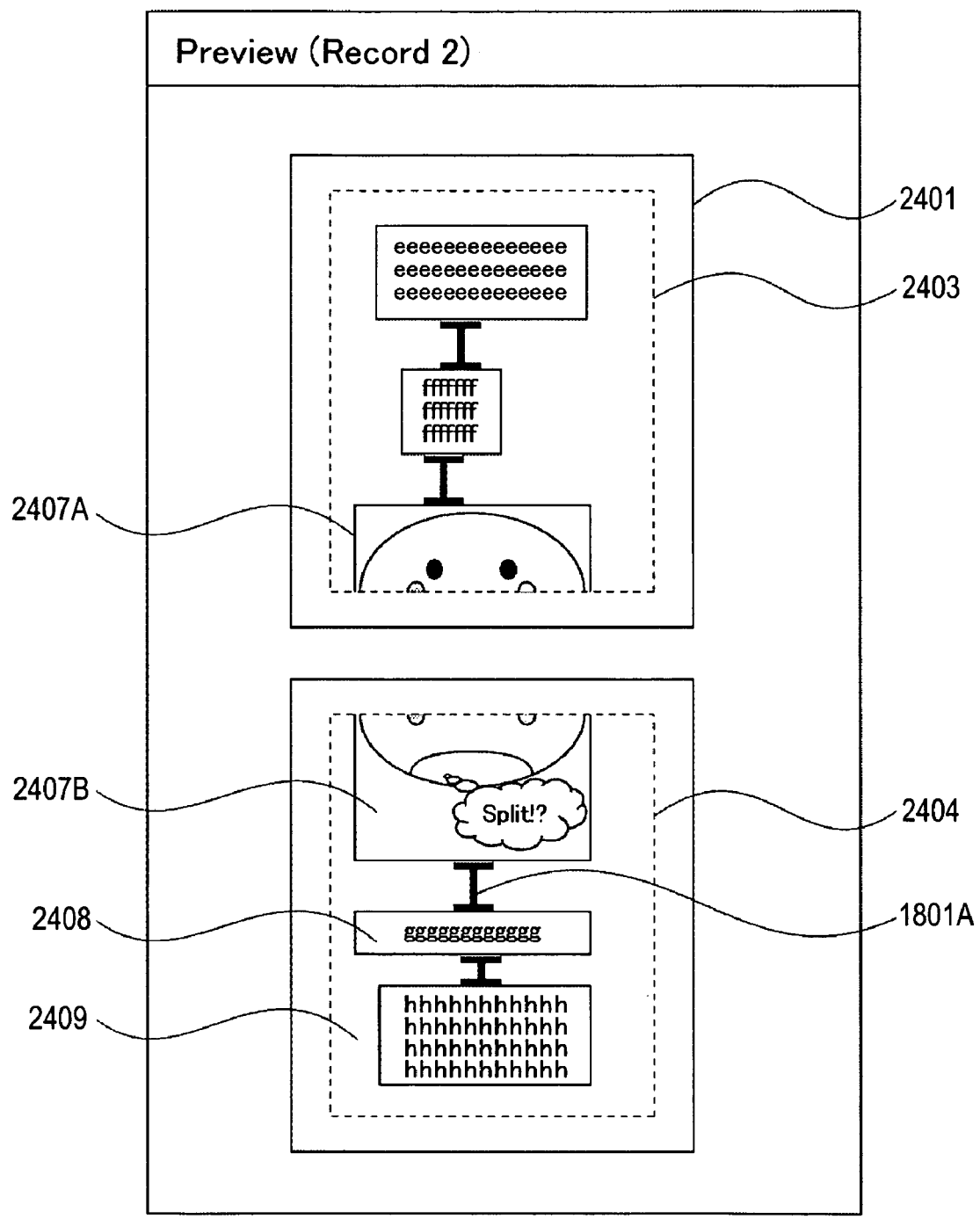
FIG. 29 is a diagram illustrating a result of inter-page arrangement of a container.

To facilitate understanding of the process of the flowchart shown in FIG. 28, an example will be described with reference to FIGS. 18, 29, and 30. Here, a case is considered in which it is determined in step 2410 (FIG. 24B) that the container attribute is set to "inter-page arrangement is allowed in automatic layout". With respect to the inter-page link, it is assumed that the fixed link is selected in the setting dialog shown in FIG. 38 and the fixed link size is set to "3".

When the attribute of the container 1707 on the boundary line is determined as "inter-page arrangement is allowed in automatic layout", the amount of protrusion of the container is recognized. The amount of protrusion may be recognized by, for example, checking the coordinates in the inter-page editing page shown in FIG. 30 with the layout engine 105.

For example, it is assumed that the coordinates of the bottom-left corner, the bottom-right corner, the top-left corner, and the top-right corner of the container 1707 are (x=20, y=30), (x=70, y=30), (x=20, y=80), and (x=70, y=80), respectively, and the coordinates of the left and right ends of the boundary line 3001 are (x=0, y=50) and (x=100, y=50), respectively. In the coordinate values (x, y), x indicates the position in the horizontal direction and y indicates the position in the vertical direction. Accordingly a region of the container 1707 above the boundary line 3001 with the left end (x=0, y=50) and the right end (x=100, y=50), that is, a region defined by a top-left point (x=20, y=80), a top-right point (x=70, y=80), a bottom-left point (x=20, y=50), and a bottom-right point (x=70, y=50) is the region that remains in the page 1701. A region other than this region, that is, a region defined by a top-left point (x=20, y=50), a top-right point (x=70, y=50), a bottom-left point (x=20, y=30), and a bottom-right point (x=70, y=30) is recognized as the protruding region to be moved into the next page 1702. The protruding region recognized as described above is stored in the memory 136, and then the inter-page editing page shown in FIG. 30 is switched to the normal page shown in FIG. 17.

The step of dividing the container is performed as shown in FIG. 17. To provide a detailed explanation, a result of automatic layout in which the inter-page arrangement of the container is allowed is shown in FIG. 29.

First, the container 1707 to be divided is copied, and the copied container data is stored in the memory 136. In the current state, the container 1707 protrudes from a region 2403, which corresponds to the region 1703 in FIG. 18. Accordingly, clipping is performed such that the protruding region recognized and stored in the memory 136 is deleted. More specifically, only a region 2407B (FIG. 29) in the container 1707 that is determined as the protruding region is deleted by clipping. Then, the copied container 1707 is read out from the memory 136 and is pasted in a region 2404, which corresponds to the region 1704 in FIG. 18. Since the pasted container 2407 protrudes upward from the region 2404, clipping is performed such that the protruding region is deleted on the basis of the protruding region stored in the memory 136. More specifically, in the copied container 2407, a region 2407A protrudes upward (toward a page 2401) from the region 2404, and therefore only the region 2407A is deleted by clipping. Accordingly, the container 2407 is divided. The copied data is pasted such that the horizontal position thereof is the same as that in the predetermined page (the position of the container 2407A in the present embodiment) and the predetermined positional relationship is maintained (the containers 2408 and 2409 are arranged vertically with respect to the container 2407B).

Thus, the page regions in which the containers are to be arranged in the document template are determined for all the containers including the divided containers 2407A and 2407B, and accordingly the layout calculation and the layout adjustment of FIG. 9 are performed again. Since the containers 2407B and 2408 that are associated with each other by the inter-page link are arranged on the same page, the inter-page link 1801 is changed to a fixed link 1801A with a link size of "3" as set in the dialog of FIG. 38. Although the inter-page link is shown differently from normal links that affect the layout calculation and layout adjustment in FIG. 18, the display of the link is changed as shown by 1801A in FIG. 29 since the link attribute is changed to that of a link that affects the layout adjustment.

The layout editing application 121 performs the layout adjustment on the basis of the link 1801A.

The thus obtained result is stored in the memory 136 of the host computer. Then, the above-described steps are repeated until all the records are inserted, and the layout result is displayed on the document template shown in FIG. 18. In the process shown in FIG. 28, the container is divided along the boundary line. Therefore, if the container is completely moved into the next page beyond the boundary line when the content data is inserted, the dividing process is not performed but a moving process similar to that shown in FIG. 21 is performed.

Although not shown in the operation flow in FIG. 28, if any of the layout optimization rules is violated, the calculation is performed again to avoid violation of the rules, as described above with reference to step 0904 (FIG. 9).

As described above, according to the second embodiment, the container attribute is set by the user. Accordingly, if a container protrudes from the predetermined page when the contents are inserted, the automatic layout process is performed on the basis of the container attribute set by the user. Accordingly, a balanced layout can be obtained in accordance with the user's intention.

Third Embodiment

In the first and second embodiments, the layout adjustment is performed taking the attributes of the containers associated with each other by an inter-page link into account. In a third embodiment, referring to FIG. 33, a method for setting attributes of containers that are associated with containers at the ends of an inter-page link by normal links that affect the layout calculation and layout adjustment will be described.

Figure 35:
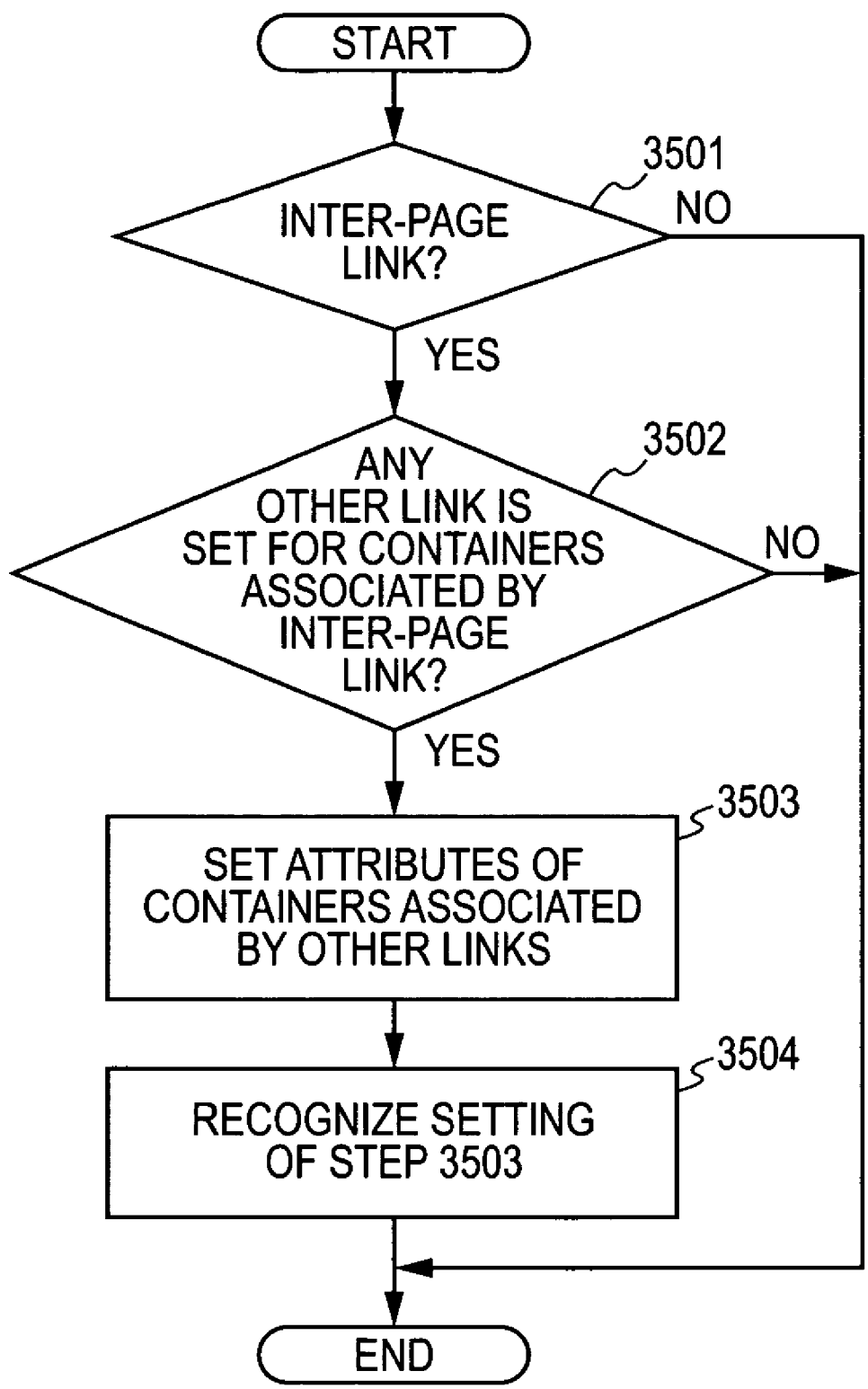
FIG. 35 is a flowchart of a process for setting a container attribute according to the third embodiment.

FIG. 35 illustrates a flowchart of a process of setting attributes of containers (1706, 3301, 1709, and 3304 in FIG. 33) that are associated with containers (1707 and 1708 in FIG. 33) at the ends of an inter-page link. The process is performed by the processor 135 in the host computer.

Figure 33:
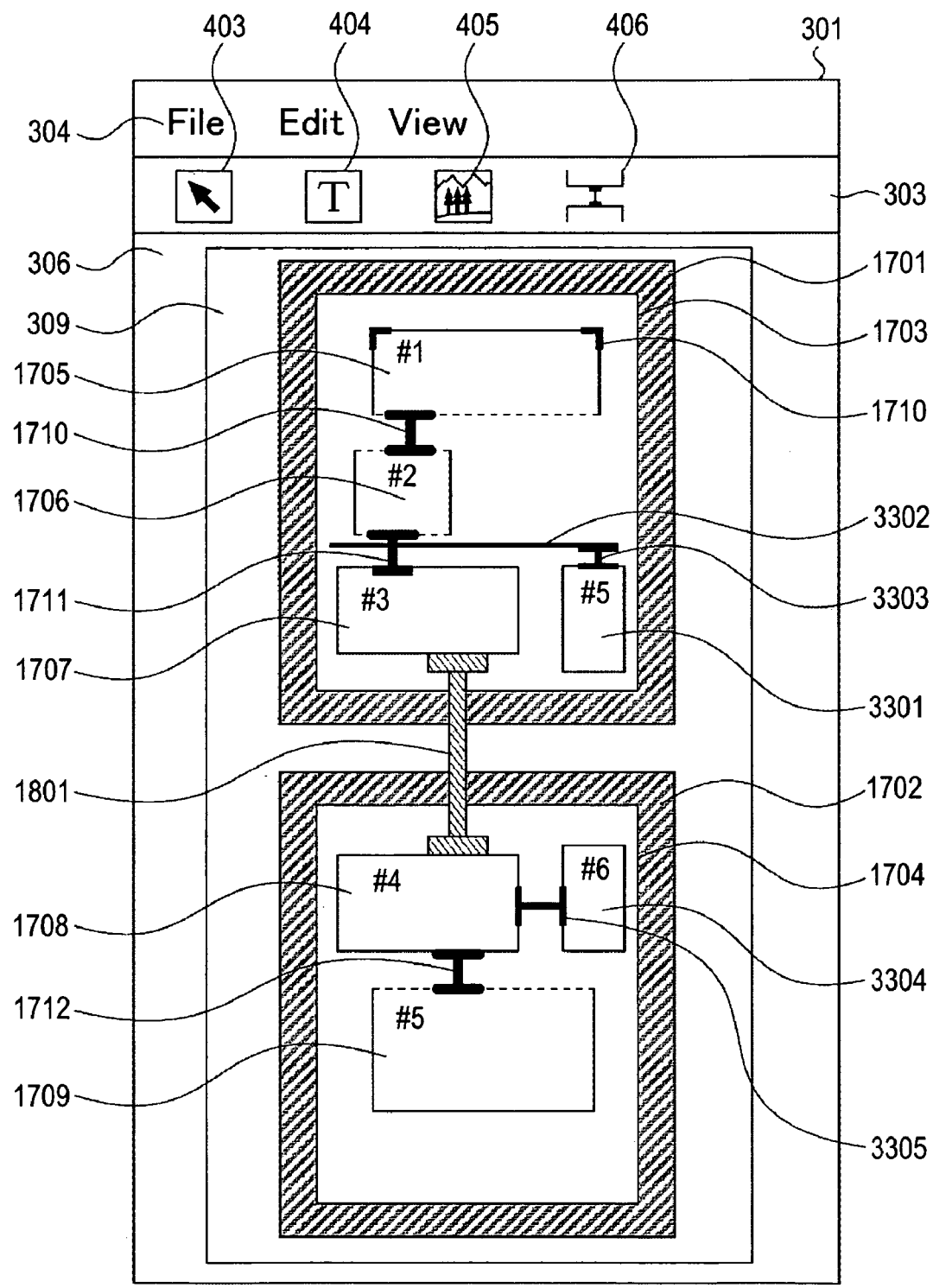
FIG. 33 is a diagram illustrating a document template according to the third embodiment.

The layout editing application 121 determines whether or not the link set by the link-setting operation performed by the user is an inter-page link (step 3501). Similar to step 2001 in the first embodiment, the determination in step 3501 can be performed by referring to the link attributes (FIG. 34 in the present embodiment) stored in the memory 136. If it is determined in step 3501 that an inter-page link (link 1801 in FIG. 33) is set (YES in step 3501), the layout editing application 121 sets the attribute of containers at the ends of the inter-page link (container 1707 in FIG. 33) as described in the first or second embodiment. Then, it is determined whether or not any other link is set for the containers at the ends of the inter-page link (step 3502). The layout editing application 121 can also perform the determination in step 3502 by referring to the link attributes of FIG. 34 that are stored in the memory 136. Referring to FIG. 33, the containers at the ends of the inter-page link are the containers 1707 and 1708, and links 1711, 1712, 3303, and 3305 are set for the containers 1707 and 1708. Accordingly, it is determined that other links are set for the containers at the ends of the inter-page link (YES in step 3502). Then, the layout editing application 121 sets the attributes of containers associated with the containers at the ends of the inter-page link by other links determined in step 3502 (step 3503). Step 3503 will be described in more detail later. The layout editing application 121 recognizes the settings of step 3503 (step 3504) and ends the process. Then, similar to the first or second embodiment, the layout adjustment is performed in accordance with the insertion of the content data.

Figure 36:
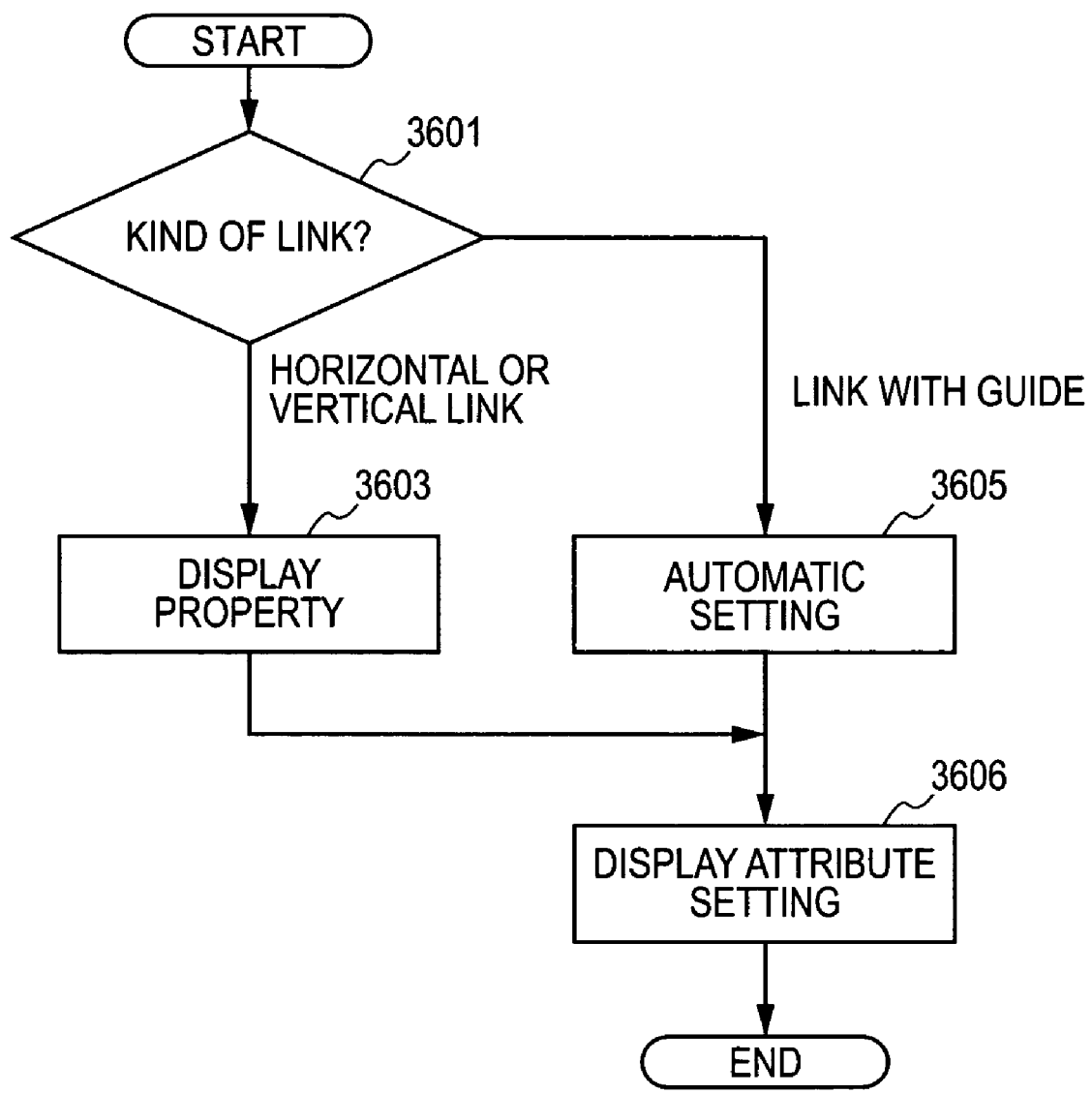
FIG. 36 is a flowchart of a process for setting a container attribute on the basis of a link according to the third embodiment.

FIG. 36 illustrates the detailed process performed in step 3503. The layout editing application recognizes the kinds of the other links recognized in step 3502 (step 3601). For links that simply associate containers with each other, the property shown in FIG. 26 is displayed for setting the attributes of the containers (containers 1706, 1709, and 3304 in FIG. 33) that are associated with the containers at the ends of the inter-page link by the links (step 3603). If it is determined in step 3601 that a link with a guide is set, the attribute of the corresponding container is automatically changed in accordance with the attribute of the container connected to the inter-page link (step 3605). For example, referring to FIG. 33, the container 1707 connected to the inter-page link is associated with the container 3301 via a guide. Therefore, the attribute of the container 3301 is set in accordance with the attribute of the container 1707. In more detail, the attribute of the container 1707 stored in the memory 136 is referred to in order to set the attribute of the container 3301. Then, the layout editing application 121 displays a property similar to a property 3701 shown in FIG. 37 that indicates that the attribute is set in the above-described manner (step 3606).

To facilitate understanding of the process shown in FIG. 36, a detailed example will be described with reference to FIG. 33. First, the case in which the attribute of the container 1706 that is directly associated with the container 1707 at an end of the inter-page link by a vertical link is set is considered. In this case, there is a possibility that the container 1707 will move to a different page as a result of the layout adjustment performed as described in the first or second embodiment. Accordingly, the property dialog 2601 shown in FIG. 26 is displayed so that whether the container 1706 associated with the container 1707 is to move to another page together with the container 1707 or to remain in the predetermined page (1701) can be set. Next, the container 3301 that is associated with the container 1707 using a guide function is considered. The guide function will be described next. The guide function affects the layout adjustment, similar to the above-described links and anchors. For example, the vertical positions of the containers 1707 and 3301 arranged in the horizontal direction, as shown in FIG. 33, can be adjusted. In addition, when a plurality of containers arranged in the vertical direction are associated with each other by links with guides, horizontal positions of the containers can be adjusted. More specifically, referring to FIG. 33, the containers 1707 and 3301 are arranged in the horizontal direction. When the layout position of the container 1707 is shifted in the vertical direction as a result of the layout adjustment, the layout position of the container 3301 is also changed in the vertical direction in accordance with the shift of the container 1707. Accordingly, if the attribute of the container 3301, which is associated with the container 1707 via the guide, is set in accordance with the attribute of the container 1707, when a process of moving the container 1707 to a different page, causing the container 1707 to remain in the predetermined page, or dividing the container 1707 is performed according to the first or second embodiment, a similar process is performed for the container 3301. For example, if the container 1707 is moved from the page 1701 to the page 1702, the container 3301 is also moved to the page 1702 together with the container 1707. Next, the container 3304 that is directly associated with the container 1708 by a horizontal link is considered. In this case, the property dialog 2601 shown in FIG. 26 is displayed for setting the attribute of the container 3301. Then, the setting selected by the user is recognized and the layout adjustment is performed.

According to the process of the third embodiment, when, for example, the container 1707 connected to the inter-page link is moved from the page region 1701 to the page region 1702 in FIG. 33, the layout process of the containers associated with the container 1707 is performed on the basis of the attribute settings set by the user in association with the layout of the container 1707. Therefore, a balanced layout adjustment can be obtained over the entire document.

Even if the container attributes are set as described above, there may be a case in which the layout process based on the set container attributes cannot be performed depending on the content data inserted into the containers. In such a case, the error process is performed or the layout calculation and the layout adjustment are performed again after changing the container attributes or various settings on the template.

In the above-described first to third embodiments, container attributes are set in advance. However, a container attribute may also be set at the time when it is determined that a container at an end of an inter-page link will protrude from the predetermined page as a result of insertion of the content data and the layout adjustment. In addition, in the above-described embodiments, container attributes are set automatically when an inter-page link is set. However, even when an inter-page link is not set, a container attribute may be set for each container in advance. In such a case, when a container protrudes into another page as a result of insertion of the content data, the container may be moved to another page or be arranged over different pages in accordance with the set attribute.

Figure 39:
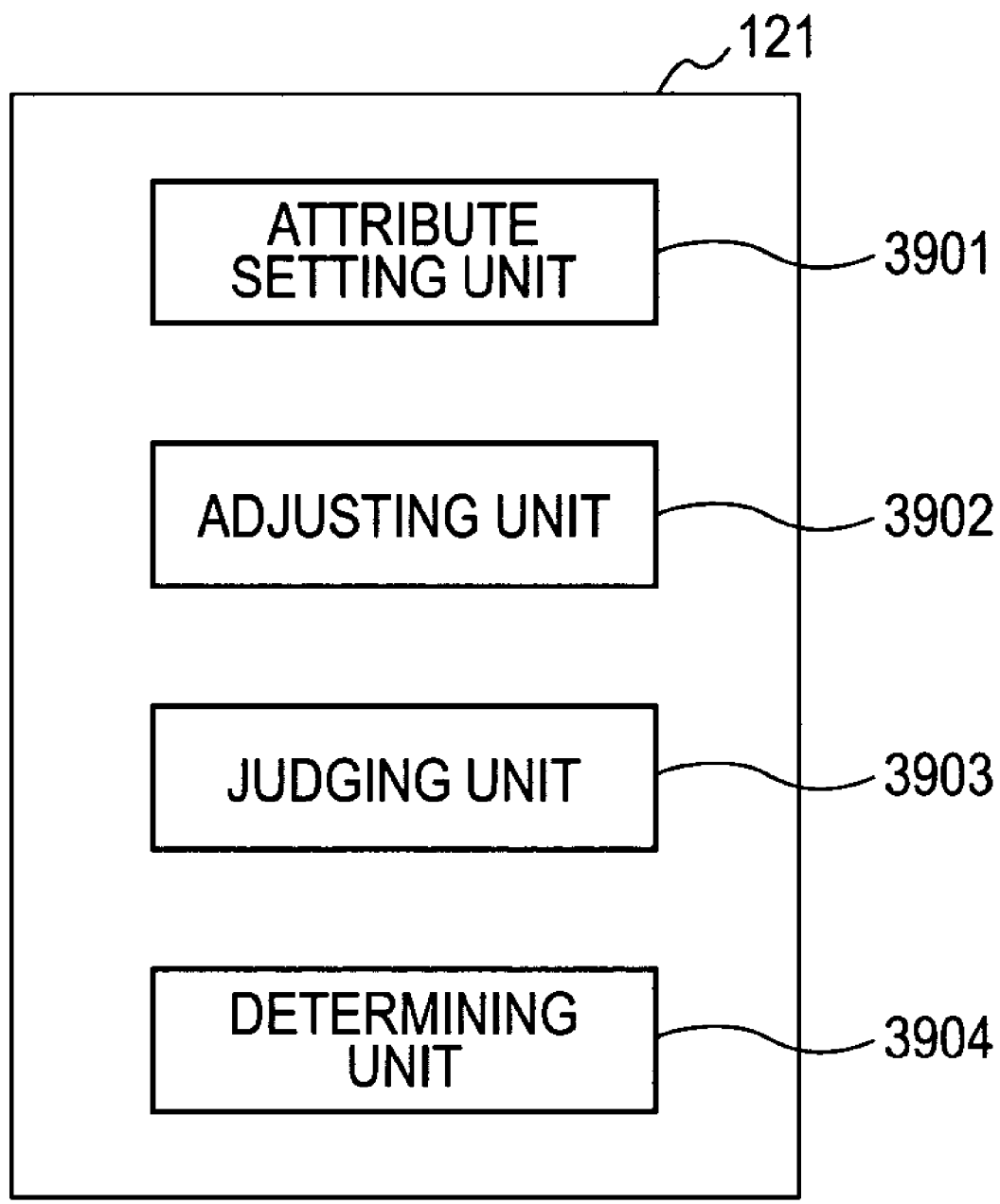
FIG. 39 is a block diagram illustrating the functional structure of a layout editing process performed by a layout editing application.

The functional structure of the above-described automatic layout system (the layout editing application 121) is illustrated in FIG. 39.

Referring to FIG. 39, the layout editing application 121 dynamically changes a layout of a template having a plurality of data regions in accordance with content data inserted into the data regions. An attribute setting unit 3901 sets an attribute of a data region associated with another data region by a link. An adjusting unit 3902 adjusts the layout of the data regions in accordance with the content data inserted into the data regions. A judging unit 3903 judges whether or not the data region associated with another data region by the link protrudes from a predetermined page region on the basis of the layout of the data regions adjusted by the adjusting unit 3902. If the judging unit 3903 judges that the data region protrudes from the predetermined page region, a determining unit 3904 determines a page region in which the data region is to be arranged on the basis of the attribute of the data region set by the attribute setting unit 3901. When the attribute of the data region set by the attribute setting unit 3901 allows the data region to be arranged over different page regions, the determining unit 3904 determines that the data region is to be divided and arranged in a plurality of pages. The determining unit 3904 determines that the data region is to be arranged either in a previous page region or in a following page region of the previous page region based on the attribute of the data region set in the attribute setting unit 3901.

The present invention may also be achieved by supplying a system or an apparatus with a storage medium (or recording medium) which stores program code of a software program for implementing the functions of the above-described embodiments and causing a computer (or a central processing unit (CPU) or a microprocessor unit (MPU)) of the system or the apparatus to read and execute the program code stored in the storage medium.

In such a case, the program code itself which is read from the storage medium provides the functions of the above-described embodiments. In addition, the functions of the above-described embodiments may be achieved not only by causing the computer to read and execute the program code but also by causing an operating system (OS) running on the computer to execute some or all of the process on the basis of instructions of the program code.

In addition, the functions of the above-described embodiments may also be achieved by writing the program code read from the storage medium to a memory of a function extension board inserted in the computer or a function extension unit connected to the computer and causing a CPU of the function extension board or the function extension unit to execute some or all of the process on the basis of instructions of the program code.

Furthermore, the functions of the above-described embodiments may also be achieved by distributing the program code of the software program for implementing the functions of the above-described embodiments via a network, storing the program code in a storage device, such as a hard disk and a memory, or in a storage medium, such as a Compact Disc Rewritable (CD-RW) of a system or an apparatus, and causing a computer (or a CPU or a MPU) of the system or the apparatus to read and execute the program code stored in the storage device or the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A layout processing method, performed by a layout apparatus having a processor, for changing a layout of a template having a plurality of data regions in accordance with content data inserted into the data regions, the layout processing method comprising:
   a displaying step of displaying a setting screen by connecting a first data region arranged in a first page and a second data region arranged in a second page by a link;
   an attribute setting step of setting a dividing attribute to divide the first data region into two regions in accordance with an instruction received via the setting screen displayed in the displaying step;
   an adjusting step of adjusting a size and a position of the data regions in accordance with the content data inserted into the data regions;
   a determining step, performed by the processor, of determining whether the first data region protrudes from the first page based on the size and the position of the data regions adjusted in the adjusting step; and
   an arranging step, performed by the processor, of generating a first dividing data region and a second dividing data region by dividing the first data region into the two regions, and arranging the first dividing data region in the first page and the second dividing data region in the second page, if it is determined in the determining step that the first data region protrudes from the first page and the dividing attribute is set for the first data region,
   wherein the arranging step generates the first and the second dividing data regions from the first data region based on a protrusion amount that the first data region is determined to protrude from the first page.

2. The layout processing method according to claim 1, wherein, when the first and second dividing data regions are arranged in the arranging step, the adjusting step of adjusting the size and the position of the data regions is performed again.

3. The layout processing method according to claim 1, wherein a result of the adjusting step is displayed on a display unit.

4. A layout apparatus for changing a layout of a template having a plurality of data regions in accordance with content data inserted into the data regions, the layout processing apparatus comprising:
   a processor including:
      a displaying unit configured to display a setting screen by connecting a first data region arranged in a first page and a second data region arranged in a second page by a link;
      an attribute setting unit configured to set a dividing attribute to divide the first data region into two regions in accordance with an instruction received via the setting screen displayed by the displaying unit;
      an adjusting unit configured to adjust a size and a position of the data regions in accordance with the content data inserted into the data regions;
      a determining unit configured to determine whether the first data region protrudes from the first page based on the size and the position of the data regions adjusted by the adjusting unit; and
      an arranging unit configured to generate a first dividing data region and a second dividing data region by dividing the first data region into two regions, and arranging the first dividing data region in the first page and the second dividing data region in the second page, if the determining unit judges determines that the first data region protrudes from the first page, and the dividing attribute is set for the first data region,
      wherein the arranging unit is configured to generate the first and the second dividing data region from the first data region based on the protrusion amount of the first data region determined to protrude from the first page.

5. The layout processing apparatus according to claim 4, wherein, when the first and second dividing data regions are arranged by the arranging unit, the adjusting unit is configured to adjust the layout again.

6. The layout processing apparatus according to claim 4, wherein a result by the adjusting unit is displayed on a display unit.

7. A computer-readable storage medium having stored thereon a layout processing program for causing a layout processing apparatus including a processor to change a layout of a template having a plurality of data regions in accordance with content data inserted into the data regions, the layout processing program is executed by the processor to perform:
   a displaying step of displaying a setting screen by connecting a first data region arranged in a first page and a second data region arranged in a second page by a link;
   an attribute setting step of setting a dividing attribute to divide the first data region into two regions in accordance with an instruction received via the setting screen displayed in the displaying step;

an adjusting step of adjusting a size and a position of the data regions in accordance with the content data inserted into the data regions;

a judging determining step, performed by the processor, of determining whether the first data region protrudes from predetermined the first page based on the size and position of the data regions adjusted in the adjusting step; and an arranging step, performed by the processor, of generating a first dividing data region and a second dividing data region by dividing the first data region into the two regions, and arranging the first dividing data region in the first page and the second dividing data region in the second page, if it is determined in the determining step that the first data region protrudes from the first page, and the dividing attribute is set for the first data region, wherein the arranging step generates the first and second dividing data regions from the first data region based on protrusion amount that the first data region is determined to protrude from the first page.

8. The computer-readable storage medium according to claim 7, wherein, when the first and second dividing data regions are arranged in the arranging step, the adjusting step of adjusting the size and the position of the data regions is performed again.

9. The computer-readable storage medium according to claim 7, wherein a result of the adjusting step is displayed on a display unit.

* * * * *